United States Patent

Kobayashi et al.

[11] Patent Number: 5,878,204
[45] Date of Patent: Mar. 2, 1999

[54] DISK CONTROLLING METHOD AND APPARATUS FOR TRANSFERRING A RECORD FROM A DISK TO A HOST VIA AN INTERMEDIATE BUFFER

[75] Inventors: Tohru Kobayashi; Shoichi Murano; Jun Ishikawa; Jun Katayama, all of Kawasaki, Japan

[73] Assignee: Fujitsu Limited, Kawasaki, Japan

[21] Appl. No.: 759,149

[22] Filed: Dec. 2, 1996

Related U.S. Application Data

[62] Division of Ser. No. 284,003, Aug. 1, 1994, Pat. No. 5,613,066.

[30] Foreign Application Priority Data

Oct. 1, 1993 [JP] Japan ................................... 5-246650

[51] Int. Cl.$^6$ .................................................. G06F 13/00
[52] U.S. Cl. ............................. 395/182.07; 395/182.03
[58] Field of Search ........................ 395/183.18, 182.07, 395/182.05, 182.03, 182.01, 185.01, 183.2, 182.09, 182.1, 183.01, 183.09, 183.1

[56] References Cited

U.S. PATENT DOCUMENTS

| | | | |
|---|---|---|---|
| 5,210,860 | 5/1993 | Pfeffer et al. | 395/575 |
| 5,390,186 | 2/1995 | Murata et al. | 371/10.1 |
| 5,459,856 | 10/1995 | Inoue | 395/440 |
| 5,463,767 | 10/1995 | Joichi et al. | 395/183.13 |

FOREIGN PATENT DOCUMENTS

| | | |
|---|---|---|
| 55-53758 | 4/1980 | Japan . |
| 58-112123 | 7/1983 | Japan . |
| 59-111558 | 6/1984 | Japan . |
| 61-62920 | 3/1986 | Japan . |
| 62-78623 | 4/1987 | Japan . |
| 62-176373 | 8/1987 | Japan . |
| 62-271153 | 11/1987 | Japan . |
| 63-37454 | 2/1988 | Japan . |
| 6188677 | 4/1989 | Japan . |
| 1195769 | 8/1989 | Japan . |
| 56-143054 | 11/1991 | Japan . |
| 423143 | 1/1992 | Japan . |

OTHER PUBLICATIONS

Microsoft Press Computer Dictionary—Second Edition—p. 39 and p. 271.
Computer System and Network Security; Gregory B. White, Eric A. Fisch and Udo W. Pooch; CRC Press; Chapter 2—pp. 9–10.

Primary Examiner—Robert W. Beausoliel, Jr.
Assistant Examiner—Norman M. Wright
Attorney, Agent, or Firm—Greer, Burns, & Crain, Ltd

[57] ABSTRACT

A disk controlling apparatus creates sense data indicating the contents of an error and writes it into an intermediate buffer provided within the disk controlling apparatus together with the record normally read when a key portion or a data portion constituting a record is not normally read. The disk controlling apparatus searches the intermediate buffer for desired record, reads and informs an error while taking the sense data into consideration for each record. The disk controlling apparatus stores a write address in a memory at the time of writing data, and when data are normally written the write address is eliminated from the memory, while holding the address when data are not normally written. At the time of reading data, if the address which agrees with the read address is stored in the memory, the disk controlling apparatus reports an error to a host apparatus. The disk controlling apparatus further calculates the busy ratio indicating the rate at which each channel adapters is used for I/O processing, and data is transmitted and received to and from the host apparatus through the channel adapter which has the lowest busy ratio.

4 Claims, 42 Drawing Sheets

FIG. 23

| PATH GROUP | CA | BUSY RATIO | NUMBER OF I/O PROCESSING TIMES |
|---|---|---|---|
| (HOST 1) | | | |
| | | | |
| | | | |
| | | | |
| (HOST 2) | | | |
| | | | |
| | | | |
| | | | |

FIG. 33

PATH GROUP TABLE

| | DEV 0 | DEV 1 | DEV 2 | ... | DEV N | DEV N+1 | DEV N+2 |
|---|---|---|---|---|---|---|---|
| CA 0 | 1 | 0 | 0 | | 1 | 0 | 0 |
| CA 1 | 0 | 1 | 1 | | 0 | 0 | 0 |
| CA 2 | 1 | 0 | 1 | | 0 | 0 | 0 |
| CA 3 | 0 | 1 | 0 | | 0 | 0 | 0 |
| CA 4 | 0 | 1 | 0 | | 1 | 1 | 1 |
| CA 5 | 1 | 0 | 0 | | 1 | 1 | 1 |
| CA 6 | 0 | 0 | 1 | | 0 | 1 | 0 |
| ... | | | | | | | |
| CA n | 1 | 0 | 0 | | 0 | 0 | 0 |

GPT

FIG.35

| CH (PATH) | CH0 | CH1 | CH2 | CH3 | CH4 | | | | | ADT |
|---|---|---|---|---|---|---|---|---|---|---|
| DEV # ACCESSIBLE FROM CH0 | DEV0 | DEV1 | · | · | · | | | | | |
| DEV # ACCESSIBLE FROM CH1 | DEV0 | DEV1 | · | · | · | | | | | |
| DEV # ACCESSIBLE FROM CH2 | DEV0 | DEV1 | · | · | · | | | | | |
| DEV # ACCESSIBLE FROM CH3 | DEV0 | DEV1 | · | · | · | | | | | |
| PATH GROUP DEV0 | CA0 | CA1 | · | · | | | | | | |
| PATH GROUP DEV1 | CA0 | CA1 | · | · | | | | | | |
| PATH GROUP DEV2 | CA0 | CA1 | · | · | | | | | | |
| PATH GROUP DEV3 | CA0 | CA1 | · | · | | | | | | |

| BIT | |
|---|---|
| 0 | LOG REQUEST (AT THE TIME OF ON, REQUEST ERROR LOG) |
| 1 | REQUEST DISPLAY |
| 2 | UNRECOVERABLE TROUBLE IN CA PATH |
| 3 | UNRECOVERABLE TROUBLE IN INTERNAL PATH |
| 4 | OPERABLE TROUBLE IN INTERNAL PATH |
| 5 | DETECTION OF ABNORMALITY IN PATH GROUP (CHANGE IN STATE OF ONLY A PART OF PATHS) |
| 6 | TROUBLE IN HOST APPARATUS |
| 7 | RSV |

FIG. 39

| CA PATH | CA0 | CA1 | CA2 | CA3 | CA4 | · · | · | · |
|---|---|---|---|---|---|---|---|---|
| PHYSICAL DA ACCESSIBLE FROM CA0 | DA0 | DA1 | · | · | · | · · | · | · |
| PHYSICAL DA ACCESSIBLE FROM CA1 | DA0 | DA1 | · | · | · | · · | · | · |
| PHYSICAL DA ACCESSIBLE FROM CA2 | DA0 | DA1 | · | · | · | · · | · | · |
| DEV # ACCESSIBLE FROM CA0 | DEV0 | DEV1 | · | · | · | · · | · | · |
| DEV # ACCESSIBLE FROM CA1 | DEV0 | DEV1 | · | · | · | · · | · | · |
| DEV # ACCESSIBLE FROM CA2 | DEV0 | DEV1 | · | · | · | · · | · | · |
| DEV # ACCESSIBLE FROM CA3 | DEV0 | DEV1 | · | · | · | · · | · | · |

PST1

| CA PATH | CA0 | CA1 | CA2 | CA3 | CA4 | · · | · | · |
|---|---|---|---|---|---|---|---|---|
| PHYSICAL DA INACCESSIBLE FROM CA0 | DA0 | DA1 | · | · | · | · · | · | · |
| PHYSICAL DA INACCESSIBLE FROM CA1 | DA0 | DA1 | · | · | · | · · | · | · |
| PHYSICAL DA INACCESSIBLE FROM CA2 | DA0 | DA1 | · | · | · | · · | · | · |
| DEV # INACCESSIBLE FROM CA0 | DEV0 | DEV1 | · | · | · | · · | · | · |
| DEV # INACCESSIBLE FROM CA1 | DEV0 | DEV1 | · | · | · | · · | · | · |
| DEV # INACCESSIBLE FROM CA2 | DEV0 | DEV1 | · | · | · | · · | · | · |
| DEV # INACCESSIBLE FROM CA3 | DEV0 | DEV1 | · | · | · | · · | · | · |

PST2

FIG. 40

PATH GROUP TABLE

| | CA0 | CA1 | ... |
|---|---|---|---|
| PATH GROUP DEV0 BEFORE DETECTION OF ERROR | CA0 | CA1 | ... |
| PATH GROUP DEV1 BEFORE DETECTION OF ERROR | CA0 | CA1 | ... |
| PATH GROUP DEV2 BEFORE DETECTION OF ERROR | CA0 | CA1 | ... |
| PATH GROUP DEV3 BEFORE DETECTION OF ERROR | CA0 | CA1 | ... |

GPT1

| PATH GROUP DEV0 AFTER DETECTION OF ERROR | CA0 | CA1 | ... |
|---|---|---|---|
| PATH GROUP DEV1 AFTER DETECTION OF ERROR | CA0 | CA1 | ... |
| PATH GROUP DEV2 AFTER DETECTION OF ERROR | CA0 | CA1 | ... |
| PATH GROUP DEV3 AFTER DETECTION OF ERROR | CA0 | CA1 | ... |

GPT2

DISK CONTROLLING METHOD AND APPARATUS FOR TRANSFERRING A RECORD FROM A DISK TO A HOST VIA AN INTERMEDIATE BUFFER

This is a divisional of application Ser. No. 08/284,003 filed on Aug. 1, 1994, now U.S. Pat. No. 5,613,066.

BACKGROUND OF THE INVENTION

1. Field of the Invention

The present invention relates to a disk controlling apparatus and a disk controlling method and, more particularly, to a disk controlling apparatus which is provided with a channel adapter serving as an interface between the disk controlling apparatus and a host apparatus, a device adapter serving as an interface between the disk controlling apparatus and an I/O device, and a resource manager for controlling the resource management as a whole and the processing operations, and a disk controlling method by the disk controlling apparatus.

2. Description of the Related Art

Information processing apparatuses have recently been needed to enhance processing efficiency. For example, in a magnetic disk controlling apparatus, if a plurality of interface processing such as a channel interface processing and a device interface processing are executed by one processor, the procedure inevitably becomes sequential, so that there is a limitation to the processing efficiency. In addition, in such a disk controlling apparatus provided with only one processor, when a change or addition of a function is necessary, the whole structure must be changed. To solve such a problem, in a recent disk controlling apparatus, various modules each having one function are combined by a common bus, and a desired function as a whole is executed by combining appropriate modules. Each module is provided with a processor, and executes the function allotted thereto in accordance with a microprogram corresponding to the function.

According to the disk controlling apparatus having such a structure, since it is possible to disperse processing to the respective modules, processing efficiency is enhanced. In addition, when a change or addition of a function is necessary, it is possible to construct a new disk controlling apparatus easily by adding a new module or changing the corresponding module.

FIG. 1 shows the structure of an I/O subsystem (magnetic disk subsystem). In FIG. 1, the reference numeral 1 represents a host apparatus (CPU), 2a, 2b channel devices, 3 a magnetic disk controlling apparatus as an I/O subsystem, and 4a to 4d magnetic disk apparatuses as I/O devices. In the I/O subsystem, the reference numerals 5a, 5b represent a plurality of host interface devices (channel adapters) each serving as an interface between the I/O subsystem and a host apparatus, 6a, 6b a plurality of subordinate interface devices (device adapters), 7 a general controller (resource manager) for controlling the resource management as a whole and the entire processing operations, 8 a table storage portion for storing various tables which are necessary for the management of the resources, and 9 an internal bus for connecting the channel adapters 5a, 5b, the device adapters 6a, 6b and the resource manager 7 so as to enable the transmission and the reception of data between each other.

Data are written on each track of the magnetic disk apparatus in accordance with a CKD format. FIG. 2 is an explanatory view of the CKD format. Each track has areas divided by gaps, and an index mark is attached to the head of the track. The symbol HA represents a home address area subsequent to the index mark, and the address of the track is written therein. A plurality of records R0, R1, R2 ... each of which is composed of a count area C, a key area K and a data area D are written in the area subsequent to the home address region HA. In the counter area C, a track address CCHH (CC: Cylinder address, HH: head number), a record number R and the lengths of the subsequent key area and data area), etc. are written. Accordingly, by designating the track address and the record number, it is possible to designate each record. Although a key for retrieval is written in the key area K, this is not essential. User data are written in the data area D.

In the I/O subsystem having the above-described structure, data are written and read out in the following manner. In the following explanation, the I/O subsystem is assumed to be a magnetic disk controlling apparatus DCU. FIG. 3 is an explanatory view of a sequence for a data writing operation.

When a seek command SK is produced by the channel devices (CH) 2a and 2b, the magnetic disk controlling apparatus (DCU) 3 queues the command in a command queue without permitting the seeking operation of the magnetic disk apparatuses 4a to 4d. Thereafter, an operation end signal is supplied to the channel devices CH as if the seeking operation were finished. Since a positioning time and a rotation waiting time are necessary in a magnetic disk apparatus, a plurality of positioning commands such as a seek command and a set sector command are queued up and the commands in the queue are consecutively executed when a search ID command is received, thereby increasing the processing speed.

When the channel device CH receives the seek operation end signal, it issues a set sector command SS. The magnetic disk controlling apparatus DCU queues the set sector command, and an operation end signal is supplied to the channel devices CH as if the set sector operation were finished.

When the channel device CH receives the set sector operation end signal, it issues a search ID command SID. The magnetic disk controlling apparatus DCU so controls a magnetic disk apparatus DEV as to consecutively execute seek and set sector operations and issues a retry signal so as to separate the channel device CH from the magnetic disk controlling apparatus DCU during the operation. In this manner, the channel device CH is temporarily separated from the magnetic disk controlling apparatus DCU, so that the channel device CH can execute another service or the like to another magnetic disk controlling apparatus. When the channel device CH receives a command request signal from the magnetic disk controlling apparatus DCU after the channel device CH is separated in accordance with the retry signal, the channel device CH supplies again the latest command that it has issued.

When the seek and set sector operations are finished, the magnetic disk apparatus DEV supplies an operation end signal, and in accordance with the operation end signal, the magnetic disk controlling apparatus DCU supplies a command request signal to the channel device CH. When the channel device CH receives the command request signal, the channel device CH reissues the latest command, i.e., the search ID command SID, that it has issued. When the magnetic disk controlling apparatus DCU receives the search ID command SID, the magnetic disk controlling apparatus DCU so controls the magnetic disk apparatus DEV as to execute the search ID operation, and when the search ID operation is finished, the magnetic disk apparatus DEV supplies an operation end signal to the channel device CH. The channel device CH which has received the command request signal, it reissues the latest command, i.e, a write command WD, that it has issued. In accordance with the write command WD, the magnetic disk controlling apparatus DCU so controls the magnetic disk apparatus DEV as to execute the data write operation, and supplies a retry signal to the channel device CH so as to separate the channel device CH from the magnetic disk controlling apparatus DCU during the data writing operation.

When the data write operation is finished, the magnetic disk apparatus DEV supplies a data write operation end signal to the magnetic disk controlling apparatus DCU, and in accordance with the operation end signal, the magnetic disk controlling apparatus DCU supplies a command request signal to the channel device CH. When the channel device CH receives the command request signal, the channel device CH reissues the latest command, i.e., the write command WD, that it has issued. When the magnetic disk controlling apparatus DCU receives the write command WD, the magnetic disk controlling apparatus DCU immediately transfers the write operation end signal to the channel device CH, thereby completing a series of writing operations.

FIG. 4 is an explanatory view of another sequence for a data writing operation. This sequence is the same as that shown in FIG. 4 except that a retry signal is not transferred to the channel device CH at the time of data writing operation. FIG. 5 is an explanatory view of a sequence for a data reading operation. This sequence is the same as that shown in FIG. 3 except that the write command WD is replaced by a read command RD.

At the time of such data writing operation and data reading operation, the magnetic disk controlling apparatus (I/O subsystem) 3 internally executes the following transfer control (synchronous transfer control) in synchronism with a command.

① When the channel adapter 5a receives commands (seek command, set sector command) from the channel device 2a, it informs the resource manager 7 of the reception of the commands, and the resource manager 7 queues the commands. ② When the resource manager 7 receives the information of the reception of a search ID command from the channel adapter 5a, the resource manager 7 supplies a retry request to the channel device 2a through the channel adapter 5a and instructs the predetermined device adapter 6a to execute the seek and set sector operations. When the operations are finished, the resource manager 7 requests a command from the channel device 2a through the channel adapter 5a. ③ When the resource manager 7 receives the search ID command from the channel device 2a, it instructs the device adapter 6a to execute the search ID operation, and when the search ID operation is finished, it informs the channel device 2a of the end of the search ID operation through the channel adapter 5a. ④ When the search ID operation is finished, the resource manager 7 informs the channel adapter 5a of the device adapter 6a to and from which the data is transmitted and received, and informs the device adapter 6a of the channel adapter 5a to and from which the data is transmitted and received. ⑤ Thereafter, the channel adapter 5a supplies data directly to the designated device adapter 6a, which writes the data into a magnetic disk at the time of writing. At the time of reading, the device adapter 6a supplies the data read out of the magnetic disk directly into the channel adapter 5a, which transfers the data to the channel device 2a.

In such a synchronous transfer control system, a searching operation is executed in the following manner. FIG. 6 is an explanatory view of a search operation. In the case of a search ID operation, only the count area C in the record is searched so as to judge whether or not the record number agrees with the designated record number. If the answer is in the negative, the key area K and the data area D are skipped and the next count area C is read out. In this way, the searching operation is repeated until the record number agrees with the designated record number.

In the case of a search key operation, the count area C is read so as to discern the key position, and the key area K is then searched so as to judge whether or not the key portion agrees with the designated key portion. If the answer is in the negative, the data area D is skipped and the next count area C is read out. In this way, the searching operation is repeated until the key portion agrees with the designated key portion.

As described above, in the searching operation in synchronous transfer control, since the key area K and the data area D are skipped in the case of a search ID operation, it is possible to search for the required record without any error which is caused by a flaw produced in the key area or the data area. Similarly, in the case of a search key operation, since the data area D is skipped, it is possible to search for the required key without any error which is caused by a flaw produced in the data area.

In the synchronous transfer control system, a data reading operation is executed in the following manner. FIG. 7 is an explanatory view of a read CKD (READ COUNT KEY DATA) operation. When a CKD command is produced from the channel 2a, the channel adapter 5a instructs the device adapter 6a to read the count area C. If the reading operation is normally executed, the device adapter 6a transmits a signal NE (Normal End) to the channel adapter 5a. The channel adapter 5a which has received the signal NE instructs the device adapter 6a to read the key area K and when the channel adapter 5a receives a signal NE of the reading operation, it instructs the device adapter 6a to read the data area D. If there is a flaw in the data area D which obstructs normal data reading, the device adapter 6a detects an error and informs the channel adapter 5a of the error by creating sense data. The channel adapter 5a then transmits the error status and the sense data to the channel device 2a. In this way, in simultaneous transfer control, when a read error caused by a flaw in the area to be read is detected, the channel adapter 5a is immediately informed of the error status and the sense data.

The simultaneous transfer control system, however, suffers from a problem that since data is transferred synchronously by the channel adapter and the device adapter in the above-described manner, the data transfer speed is slow. To solve this problem, an asynchronous transfer control system is proposed. This control system adopts an intermediate buffer so as to transfer data asynchronously by the channel adapter and the device adapter, thereby increasing the transfer speed. FIG. 8 shows the structure of an I/O subsystem for realizing asynchronous transfer control. This I/O subsystem is the same as that shown in FIG. 1, except that an intermediate buffer 10 is provided. The same numerals are provided for the elements which are the same as those shown in FIG. 1.

In the asynchronous transfer control system, after the end of a set sector operation, the device adapters 6a, 6b read in advance the record (CKD format data) in the subsequent one or two tracks from the magnetic disks 4a to 4d and stores the record in the intermediate buffer 10. The channel adapters 5a, 5b search the intermediate buffer 10 for the required data on the basis of a search ID, search key or read command and transfers the required data to the host apparatuses 2a, 2b.

FIG. 9 is an explanatory view of the operation of writing record from the magnetic disk to the intermediate buffer 10. When the set sector operation is finished, the device adapters 6a, 6b immediately read the record (CKD format data) in a predetermined range from the positioned sector and write the records into the intermediate buffer 10 without inserting any gap (see FIG. 9A). If all the records in a predetermined range are written into the intermediate buffer 10 in this manner, it is possible to read the required record by searching the key area K without any trouble. It is because the device adapters 6a, 6b cannot decide which of the count area C, the key area K and the data area D is required by a processing command (search command, read command) that all the CKD format data are written into the intermediate buffer 10.

There is no problem when it is possible to write all the records in a predetermined range into the intermediate buffer 10 in this manner, but when a read error is caused by a flaw in the data area D or the like, as shown in FIG. 9B, the device adapters 6a, 6b stop reading, so that the subsequent records are not stored in the intermediate buffer 10. In this situation, the search ID operation and the search key operation, which are possible in the synchronous transfer control system, are impossible. In other words, an asynchronous transfer control system must have similar functions to those of a synchronous transfer control system. No conventional asynchronous transfer control system has those functions.

Problems in asynchronous transfer control

As described above, in the conventional asynchronous transfer control system, it is impossible to write all the records in a predetermined range into the intermediate buffer 10 when a read error is caused due to a flaw in a data area or a key area, so that the search ID operation and the search key operation, which are possible in the synchronous transfer control system, are impossible and it is impossible to search for a required record or key portion.

Problems caused by a trouble in the head at the time of writing

A write head sometimes gets out of order during the execution of a write key data (Write Key Data) command. For example, the write head may get out of order in the course of the movement to the subsequent data portion (data area) after the normal end of the operation of writing data to a key portion (key area). Such a trouble leads to a problem in the guaranty of data. In other words, since it is possible to read such data without any trouble, the CPU deals with the record with a new key portion and the old data portion.

Problems in a dynamic path recombination system

A recent large computer system is generally composed of a plurality of central processing units (CPU). In such a system, common use of data and communication of data among a plurality of CPUs are necessary. For this purpose, an I/O device subsystem including an external storage unit used in the system is required to be provided with a multiplicity of host interfaces. To meet this demand, the I/O subsystem (magnetic disk control apparatus) is provided with a multiplicity of channel adapters, and these channel adapters are connected to the CPUs. A multiplicity of I/O devices are connected to the I/O subsystem. Since data for one file are written into and read from an I/O device as a unit, the I/O device is sometimes called a file device, and the I/O subsystem a file controller.

In such a system, when frequently accessing a file device connected to one file controller, access is concentrated on one channel adapter of the file controller, so that the busy ratio of that channel adapter becomes high. As a result, the response to access is slow, thereby lowering the performance. To prevent the performance from being lowered, a method of providing a plurality of access paths between a host apparatus and one file controller so as to disperse access and lower the busy ratio of a path (channel adapter) may be adopted. A further improved method (dynamic path recombination) is proposed in which data is transferred through a path different from the path which is accessed. In a dynamic path recombination system, the host apparatus registers in advance the paths to which the host apparatus is connected into the file controller (path groups are produced). When the positioning of the head to a required record is finished (e.g., a search ID operation is finished) and the operation end is reported to the host apparatus, a resource manager searches for the channel adapters to which the host apparatus is connected. In other words, the channel adapters of the same group are searched. The resource manager so controls that a vacant channel adapter in the predetermined group reports the operation end to the host adapter by interruption. In this manner, the dynamic path recombination system enables effective use of a plurality of paths (channel adapters).

In such a conventional dynamic path recombination system, however, a vacant channel adapter in the plurality of channel adapters of the same group interrupts the processing, and the busy ratio of the channel adapter (the frequency at which the channel adapter is used) not is taken into consideration. That is, a vacant path (channel adapter) in the group preset by the host apparatus at the time of start is selected as occasion demands. Therefore, if the busy ratio of the selected channel adapter (path) is very high, the use of the resource is inefficient and it is impossible to shorten the response time.

Problems in recovery control of a module having a trouble

In an I/O subsystem using a plurality of modules, a module (service adapter) for detecting a module having a trouble and recovering it is provided. When a hardware trouble is caused in a module, the service adapter detects the trouble and recovers the module. In addition, the service adapter informs the resource manager ① that the module cannot be used because it is in the process of recovery and ② that it can be operated because it has been recovered. The resource manager is informed of these pieces of information through a bus (C-BUS) which is used in common by each module. However, service adapter recovers a module through a different bus (B-BUS).

If trouble is caused in the service adapter simultaneously with trouble in a module, the service adapter can neither recover the module having the trouble nor inform the resource manager of the recovery of the module. Especially, even if the service adapter is recovered by some means and enables the recovery of the module having the trouble, the service adapter forgets the module having the trouble due to the trouble of the service adapter itself and does not recover it. This may cause a serious problem such as system failure in the worst case.

When trouble is caused in the service adapter after the end of the recovery of a module having trouble and before the service adapter informs the resource manager of the recovery of the module, the report of the recovery to the resource manager is also impossible. This also causes serious trouble such as system failure in the worst case.

Problems at the time of trouble

It is possible to inform a host apparatus of a detection error in the I/O subsystem only when there is an access from the host apparatus. An internal error (detection error by a service adapter, internal diagnosis error) which has no relation to access is reported by reporting a unit check so that sense information is reaped at the time of starting the I/O subsystem (SIO). This method is however inconvenient in that even access which has no relation to an error is influenced. In addition, since a conventional I/O subsystem has no means for positively informing a host apparatus of an error detected, it cannot be reported until the host apparatus accesses it, so that it is impossible to prevent the trouble. Furthermore, the choice of a recovery method with respect to the report error is left to the host apparatus. Therefore, the recovery instructed by the host apparatus is not necessarily the recovery which the I/O subsystem requires. A trouble in the host apparatus influences a subordinate apparatus (I/O subsystem), which, in turn, influences a path of another system. In the related art, the path is separated from the subsystem so as to prevent deleterious influence on another system. According to this method, however, the trouble in the host apparatus may be mistaken for a problem in the I/O subsystem. As a result, it takes a long time for appropriate separation of a unit having a trouble, or it is impossible to provide the host apparatus with a chance of recovery.

SUMMARY OF THE INVENTION

Accordingly, it is a first object of the present invention to eliminate the above-described problems in the related art and to increase the performance of a magnetic disk controlling apparatus as an I/O subsystem.

It is a second object of the present invention to execute the same functions as those of a synchronous transfer control system by an asynchronous transfer control system.

It is a third object of the present invention to execute a searching operation without an error by excepting the data in a data area or a key area having a flaw which causes a read error out of the data as the object of processing.

It is a fourth object of the present invention to prevent a problem in the guaranty of data from generating even when a part is normally updated and the other part is not updated in a CKD format.

It is a fifth object of the present invention to shorten the response time to access by efficiently using the resource with the busy ratio taken into consideration.

It is a sixth object of the present invention to start an I/O subsystem by safely recovering an unit having trouble by a service adapter after recovery even if a problem is caused in the service adapter.

It is a seventh object of the present invention to promptly recover an I/O subsystem by ① positively informing a host apparatus of the contents of a problem, ② informing the host apparatus of a recovery method, and ③ designating a path which is capable of using, and not to influence access which has no relation to the problem.

It is an eighth object of the present invention to recover a channel having a problem by the host apparatus itself by informing the host apparatus of the trouble.

According to the present invention, an intermediate buffer for storing a record of a CKD format which is read from the disk apparatus is provided in a disk controlling apparatus. The device adapter of the disk controlling apparatus monitors whether or not the key portion K or the data portion D is normally read when the record of the CKD format is written into the intermediate buffer. If the record is not normally read, the device adapter creates sense data on the contents of the error and writes the sense data in the area in which the key portion K or the data portion D is to be written in place of the key portion or the data portion. The device adapter also creates control information which indicates that the sense data is written in the above-described area, and writes the control information at a predetermined position of the intermediate buffer for each record. When a search command for searching an area other than the area in which the sense data is stored or a read command for reading data from that area is input from a host apparatus, the channel adapter searches for the record designated by the search command in the intermediate buffer without outputting the error due to the sense data. When a search command for searching an area in which the sense data is stored or a read command for reading data in that area is input from a host apparatus, the channel adapter judges whether or not the sense data is written in that area by reference to the control information for each record, and if the answer is in the affirmative, the channel adapter reports the sense data to the host apparatus as error information. In this manner, the first, second and third objects of the present invention are achieved.

According to the present invention, a memory for storing a write address of a disk apparatus at the time of writing data is provided in a disk controlling apparatus. The disk controlling apparatus stores the write address in the memory at the time of writing data, and when all the data of the CKD format are normally written, the disk controlling apparatus eliminates the write address from the memory. When an error is caused after a part of data are written, the disk controlling apparatus stores the write address in the memory without deleting it. The disk controlling apparatus also judges whether or not the address which agrees with the read address is stored in the memory at the time of reading data of the CKD format. If the answer is YES, the disk controlling apparatus informs the host apparatus of an error, while if the answer is NO, the disk controlling apparatus reads out the data of the CKD format at the read address. In this manner, the first and fourth objects of the present invention are attained.

According to the present invention, a memory for storing the correspondence between a host apparatus and a channel adapter to which the host apparatus is connected, and the busy ratio indicating the rate at which the channel adapter is used for I/O processing is provided. The disk controlling apparatus calculates the busy ratio of each channel adapter indicating the rate at which the channel adapter is used for I/O processing at a regular interval of time, and stores the calculated busy ratio in the memory in correspondence with each channel adapter. For the purpose of accessing a host apparatus by interruption, the disk controlling apparatus obtains the channel adapter which has the lowest busy ratio among the channel adapters which are connected to the host apparatus, and supplies an interruption signal to the host apparatus through the channel adapter obtained so as to transmit and receive data between the disk controlling apparatus and the host apparatus through that channel adapter. In this manner, the first and fifth objects of the present invention are achieved.

According to the present invention, a service adapter for detecting trouble produced in a unit and recovering the unit is provided in the disk controlling apparatus. The service adapter periodically patrols so as to judge whether or not a problem is in a unit, and when trouble is detected, the service adapter recovers the unit having the trouble. In this manner, even if trouble is produced in the service adapter before recovering a module having trouble, the service adapter can detect the module having the trouble and recover the module by the patrol after the recovery of the service adapter.

When the service adapter detects a trouble in a unit, the service adapter informs a resource manager of the unit having the trouble. The resource manager makes the unit having the trouble inoperable when it receives the information of the trouble, and makes the unit operable when it receives the information of the end of recovery. When the resource manager is not informed of the end of recovery in a preset time after the reception of the information of the trouble, the resource manager inquires the service adapter of the recovery of the unit, and the service adapter recovers the unit on the basis of the inquiry. The service adapter then informs the resource manager of the end of recovery. In this manner, even if a problem is produced in the service adapter before the end of the recovery process, the service adapter can identify the unit having the trouble on the basis of the inquiry from the resource manager and resume the recovery processing.

If notification which allows to start is not supplied to the unit having a trouble in a preset time, the unit requests the notification to the resource manager. In response to the request, the resource manager inquiries the service adapter of the recovery of the unit having the trouble. The service adapter informs the resource manager of the end of recovery in response to the inquiry, and the resource manager supplies the notification to the unit. In this manner, even if there is a problem in the service adapter before the resource manager is informed of the end of recovery, the service adapter can inform the resource manager of the end of recovery on the basis of the inquiry after the service adapter is recovered, thereby starting the unit. Thus, the sixth object of the present invention is achieved.

When a problem is detected by internal diagnosis or periodical inspection by a service adapter, the disk controlling apparatus reports the trouble information with a recovery method and the contents of the problem added thereto to a host apparatus through a channel adapter. In this case, if the trouble is in a path through which the host apparatus accesses the disk apparatus, the disk controlling apparatus reports the trouble information with information on a replaceable path which indicates a path used instead of the trouble path to a host apparatus, and if the trouble is an abnormality in a channel, the disk controlling apparatus reports the trouble information with the channel number added thereto to the host apparatus. When the host apparatus receives the trouble information, it executes recovery processing in accordance with the recovery method or the contents of the trouble, updates the contents of a path group table in accordance with the information on a replaceable path, and selects the path to be accessed in accordance with the updated path group table. The designated channel is also recovered. In this manner, the seventh and eighth objects of the present invention are achieved.

Other features and advantages of the present invention will be apparent from the following description taken in conjunction with the accompanying drawings.

BRIEF DESCRIPTION OF THE DRAWINGS

FIG. 23 is an explanatory view of a path group table;

FIG. 33 is an explanatory view of a path group table;

FIG. 35 shows the structure of an administrative table under the charge of a CPU;

FIG. 38 is an explanatory view of a control flag;

FIG. 39 is an explanatory view of the physical structure table incorporated into the trouble information;

FIG. 40 is an explanatory view of the path group table incorporated into the trouble information;

DESCRIPTION OF THE PREFERRED EMBODIMENTS (a) Schematic of present invention

Figure 1:
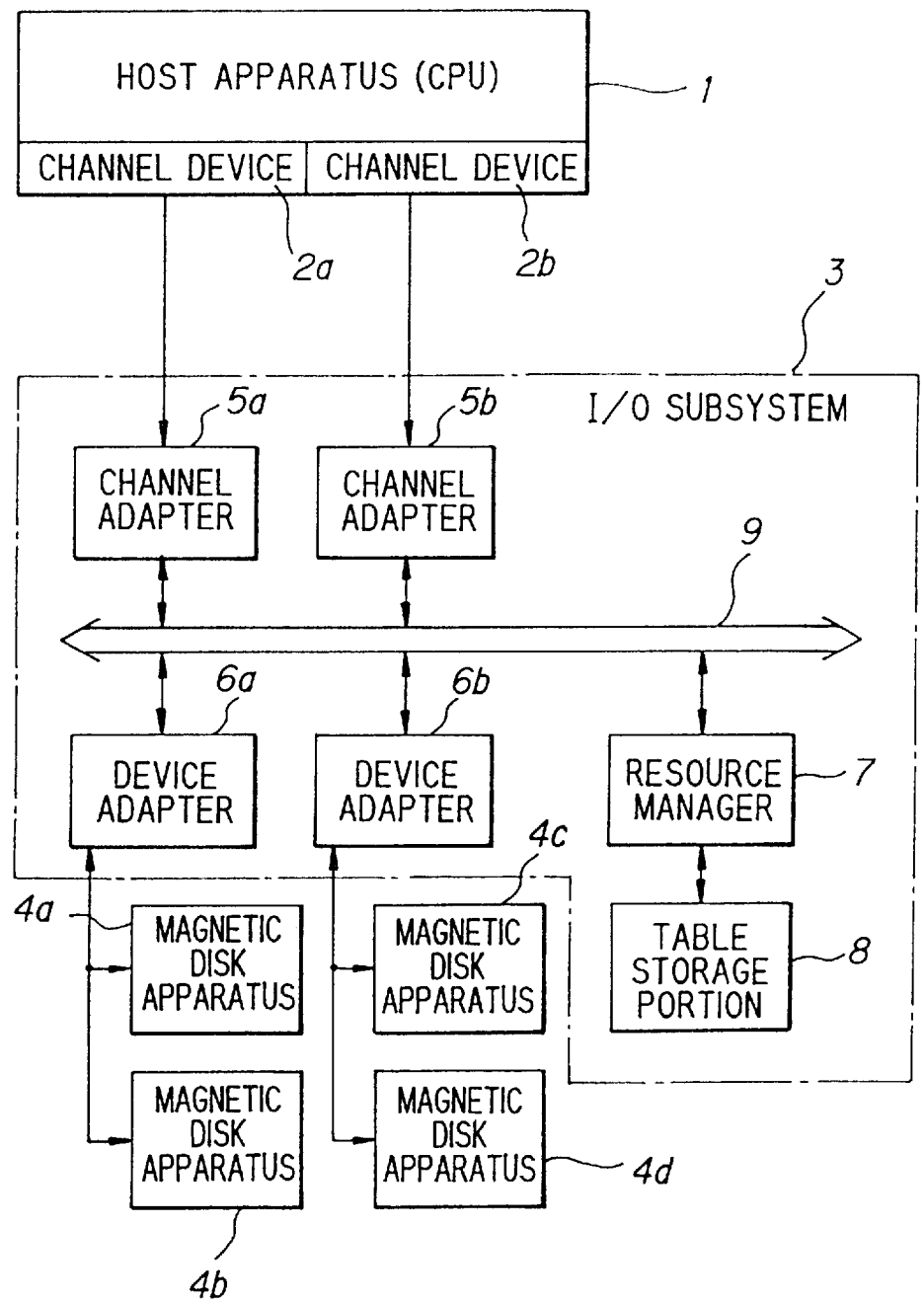
FIG. 1 shows the structure of a general I/O subsystem.
Figure 2:
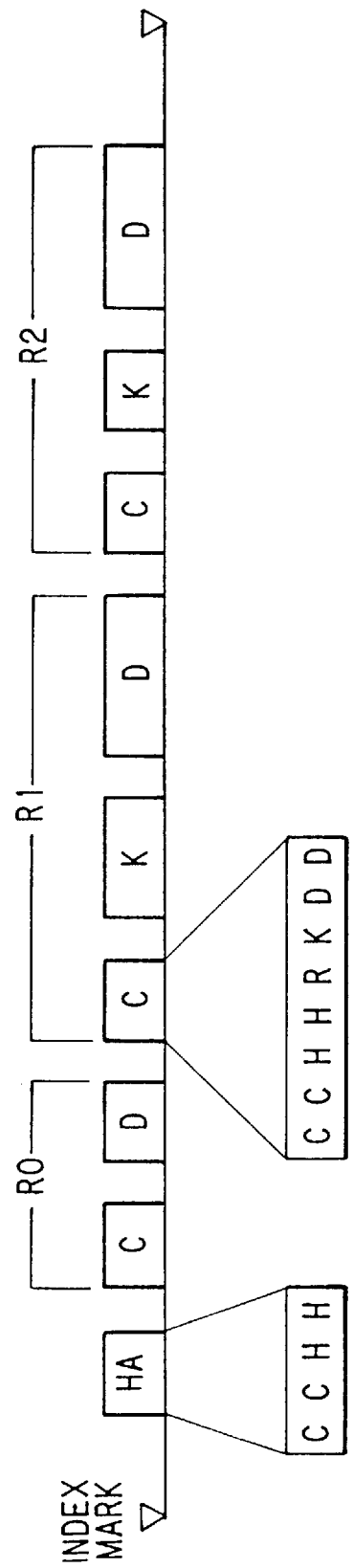
FIG. 2 is an explanatory view of a CKD format.
Figure 3:
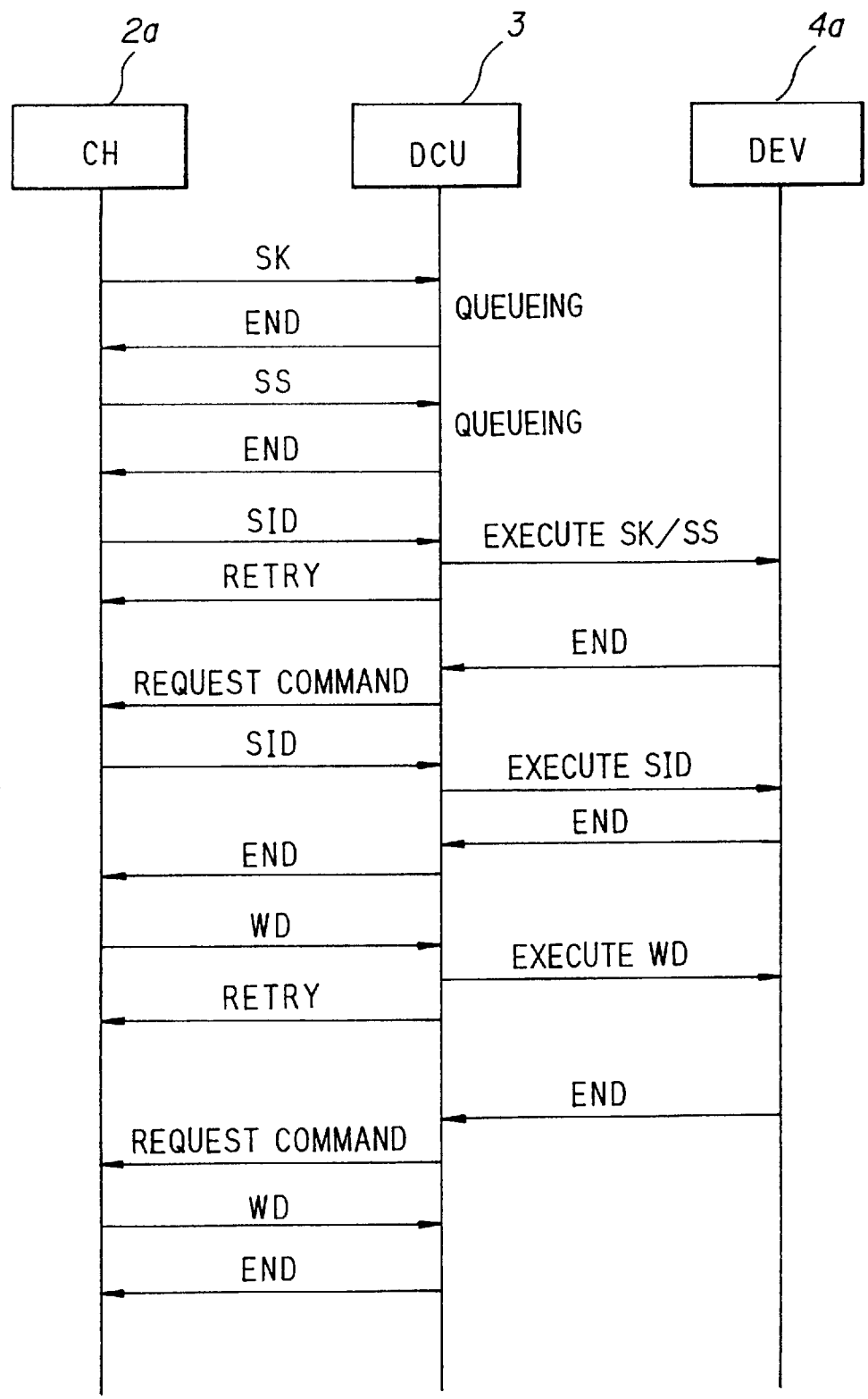
FIG. 3 is an explanatory view of the sequence for a data writing operation.
Figure 4:
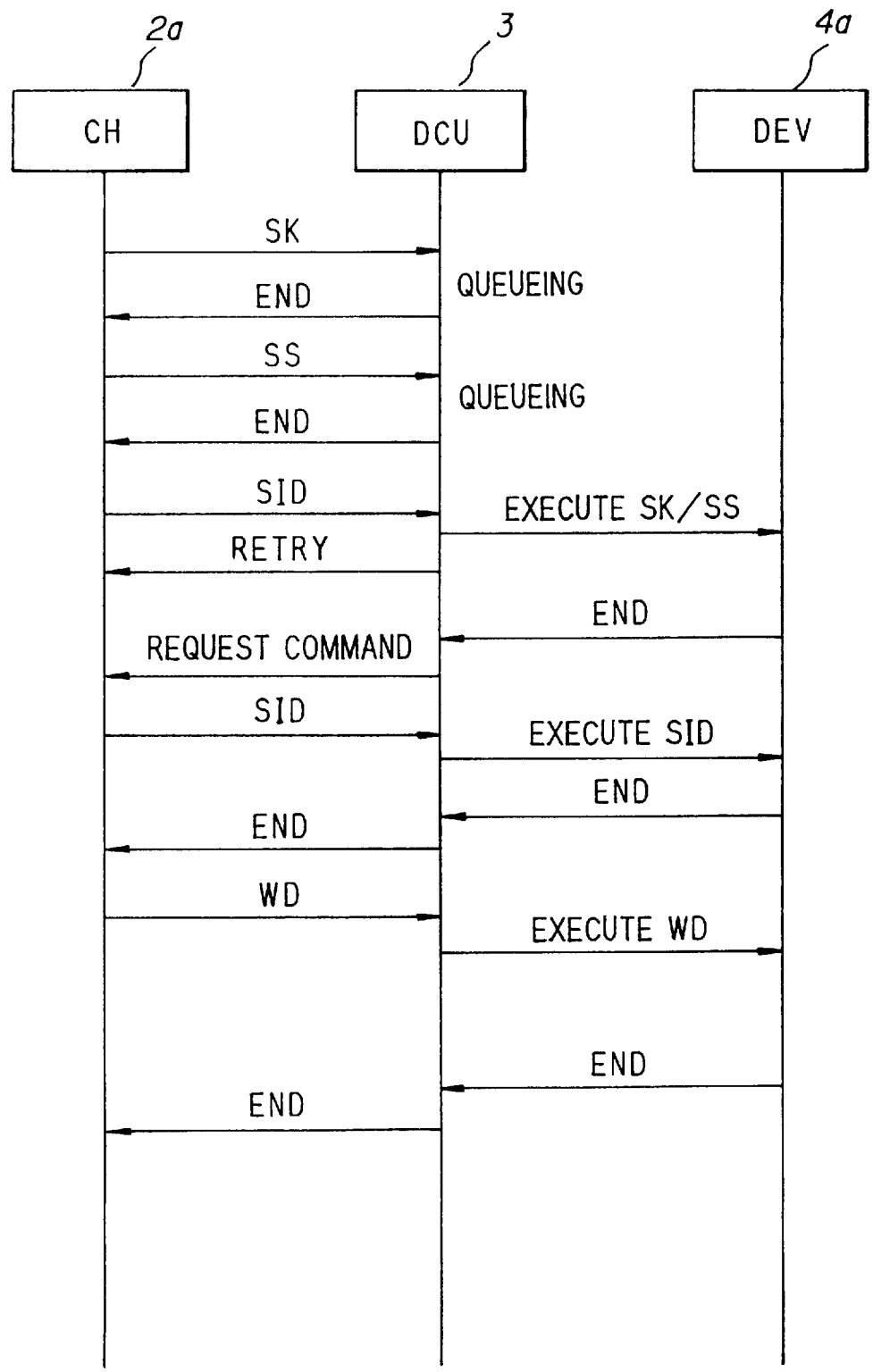
FIG. 4 is an explanatory view of another sequence for a data writing operation.
Figure 5:
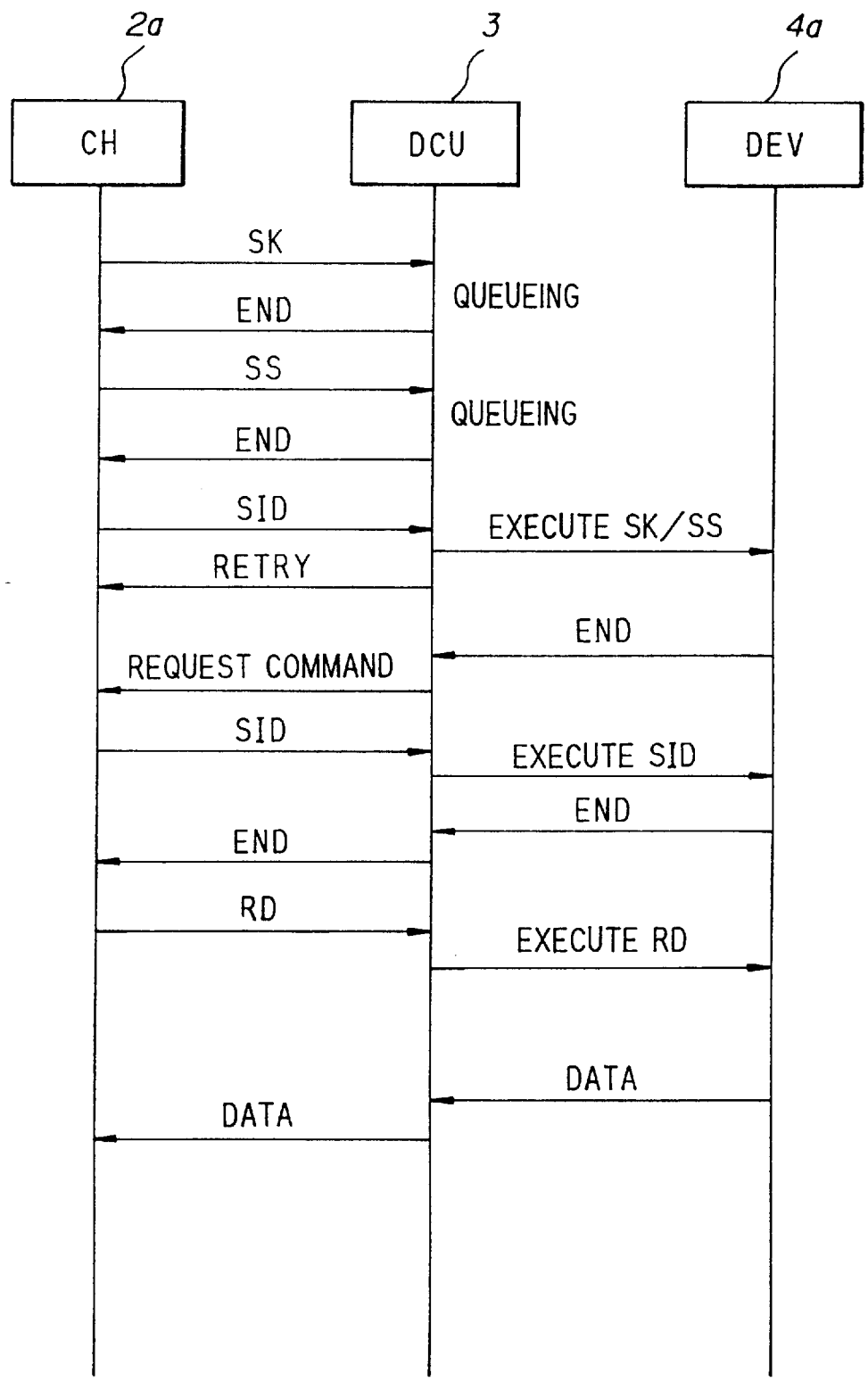
FIG. 5 is an explanatory view of a sequence for a data reading operation.
Figure 6:
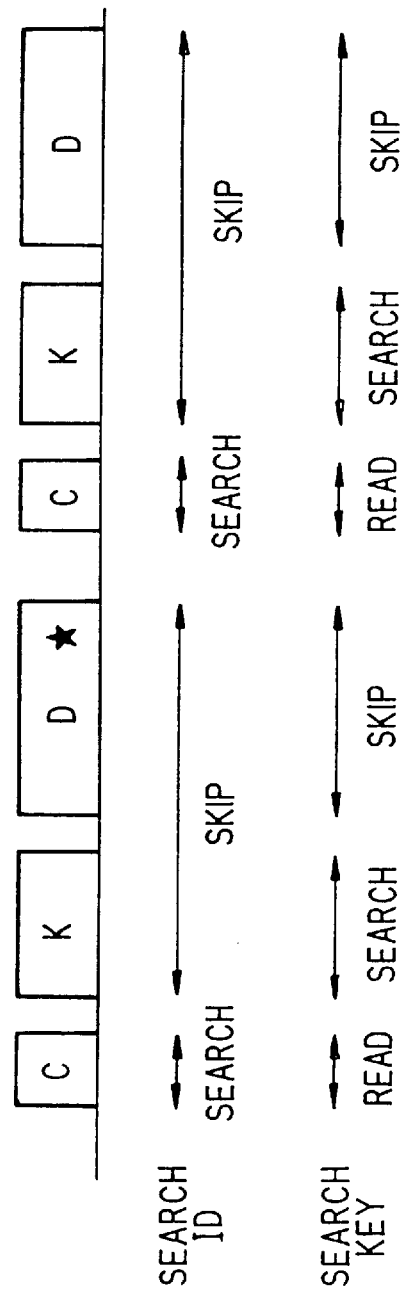
FIG. 6 is an explanatory view of a searching operation in synchronous transfer control.
Figure 7:
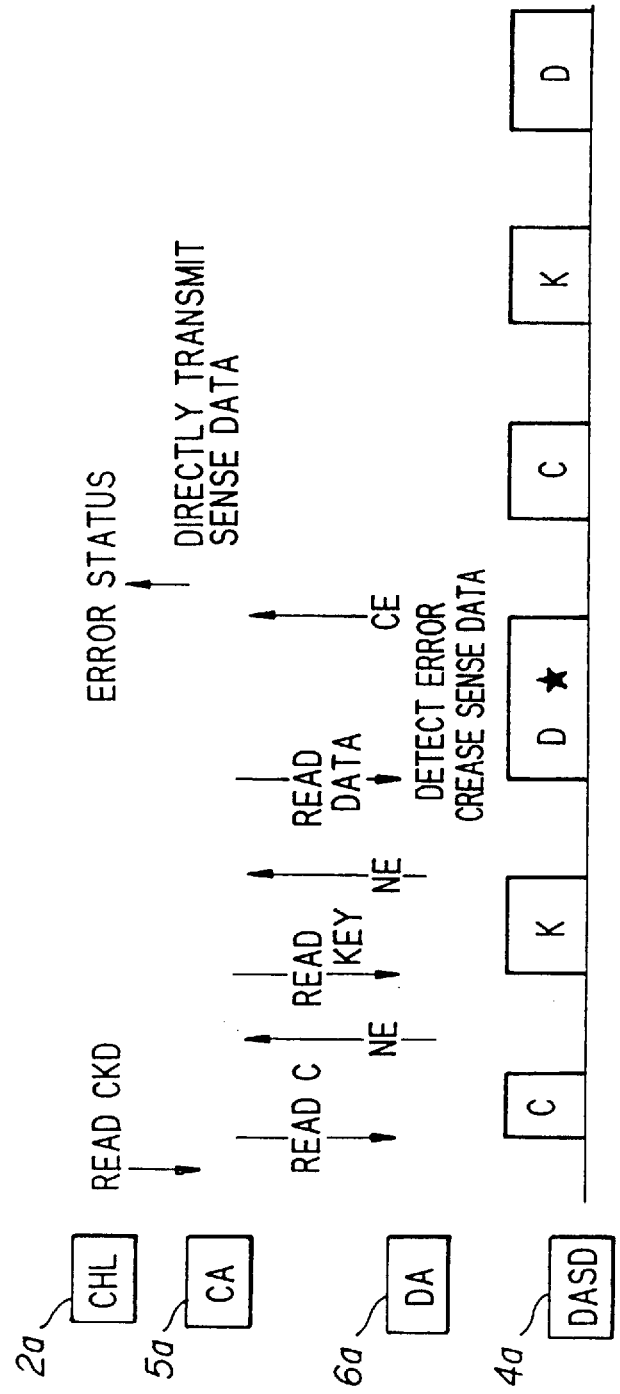
FIG. 7 is an explanatory view of a data reading operation in synchronous transfer control.
Figure 8:
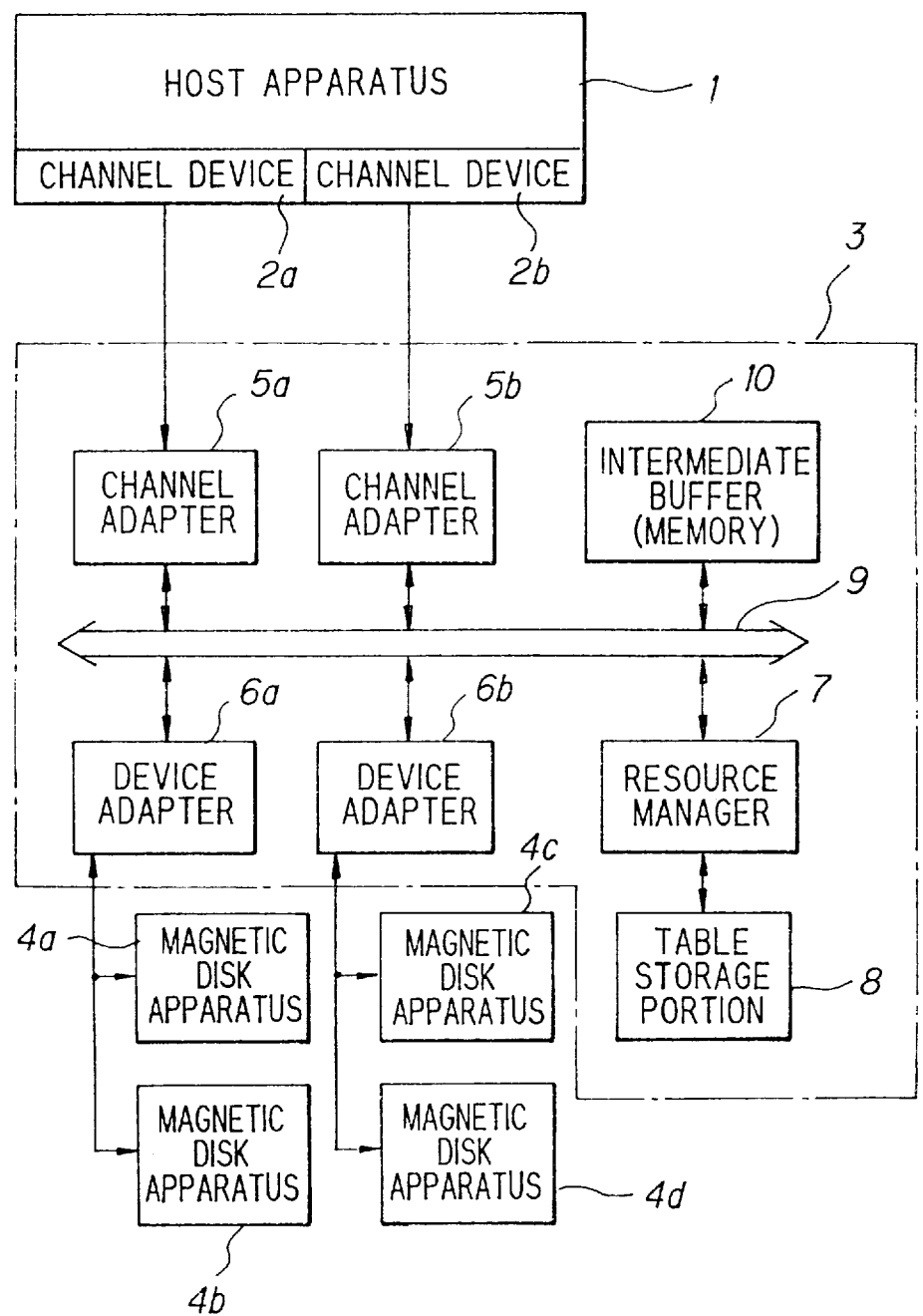
FIG. 8 shows the structure of an I/O subsystem for realizing asynchronous transfer control.
Figure 9A:
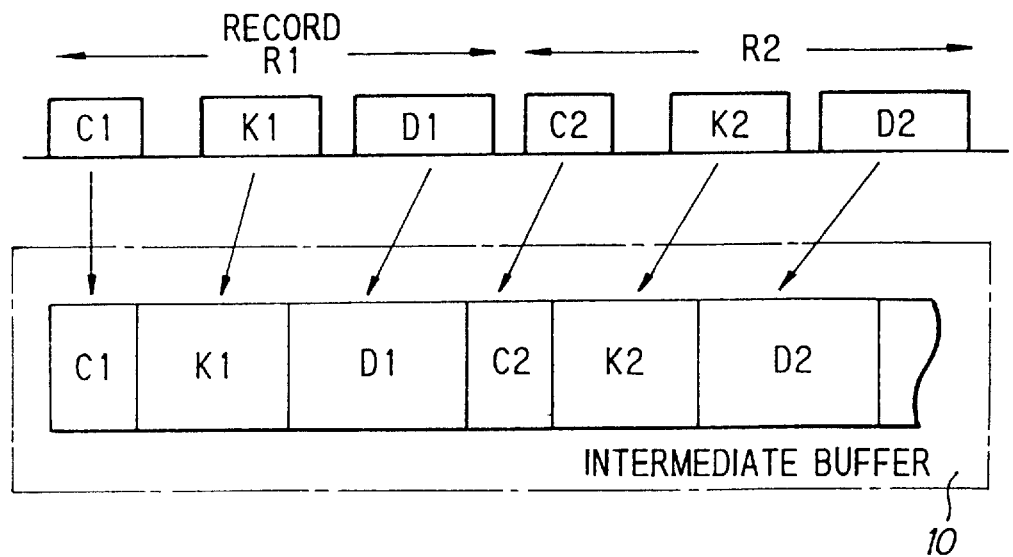
FIGS. 9A and 9B are explanatory views of the buffering operation in a conventional asynchronous transfer control system.
Figure 9B:
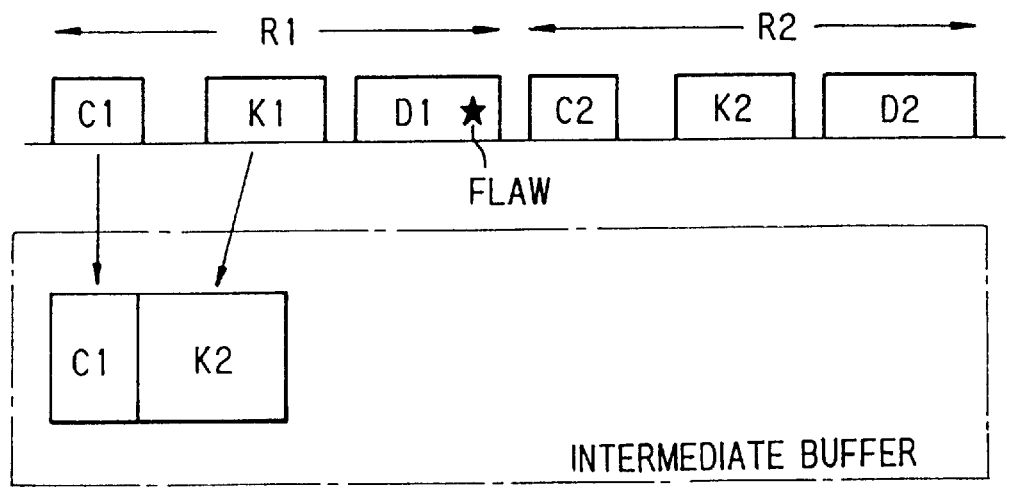
Figure 10:
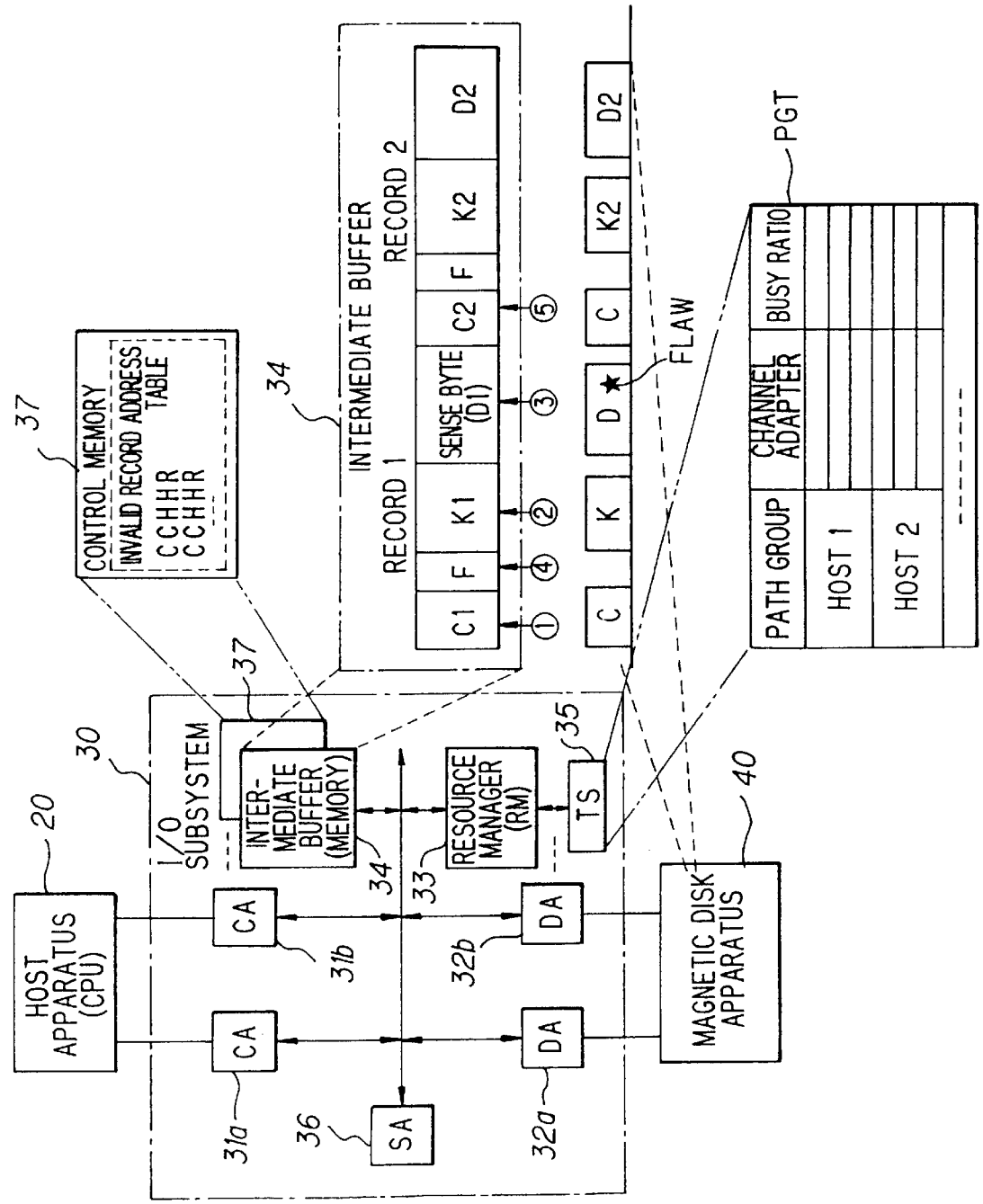
FIG. 10 schematically explains the principle of the present invention.

FIG. 10 schematically explains the principle of the present invention.

The reference numeral 20 denotes a CPU as a host apparatus, 30 an I/O subsystem such as a magnetic disk controlling apparatus, and 40 a magnetic disk apparatus as an I/O device. In the I/O subsystem 30, the reference numerals 31a and 31b represent channel adapters (CA) each serving as an interface between the host apparatus 20 and the I/O subsystem 30, 32a, 32b device adapters (DA) each serving as an interface between the I/O subsystem 30 and the magnetic disk apparatus 40, 33 a resource manager (RM) for controlling the resource management as a whole and the entire processing operations, 34 an intermediate buffer for storing the data of a CKD format which are read out of the magnetic disk apparatus 40, 35 a table storage portion (TS) for storing various tables, and 36 a service adapter for detecting trouble caused in one of the units which are connected to each other by a bus.

(a-1) Asynchronous transfer control

Immediately after positioning operations (seek operation, set sector operation) are finished, the device adapter 32a (32b) stores the data of the CKD format which are read out of the magnetic disk controlling apparatus 40 into the intermediate buffer 34. The channel adapter 31a (31b) searches for the desired data in the intermediate buffer 34 in accordance with a search ID command, and reads and transfers the data from intermediate buffer 34 to the host apparatus 20 in accordance with a read command. When the device adapter 32a (32b) reads the data of the CKD format from the magnetic disk apparatus 40 and writes the data into the intermediate buffer 34, if it is impossible to normally read a key portion K or a data portion D, the device adapter 32a (32b) executes the following processing without stopping the processing due to the error. The device adapter 32a (32b) creates sense data indicating the contents of the error, writes the sense data in the area of the intermediate buffer 34 in which the key portion or the data portion are to be written, produces control information F indicating that the sense data is written in that area, writes the sense information F at a predetermined position, and thereafter reads the subsequent data of the CKD format and writes the data into the intermediate buffer 34. In FIG. 10, an error is caused at a data portion D1 after the data is written into a count portion C1 and a key portion K1 (①, ②), so that sense data is created and written in the area in which the data portion D1 is to be written ③, and thereafter the control information F is produced and written at the predetermined position ④.

In this state, when a search command for searching an area other than the area (key area, data area) in which the sense data is stored is input from the host apparatus 20, the channel adapter 31a (31b) searches the intermediate buffer 34 for the required data without outputting the error due to the sense data. When a search command for searching an area in which the sense data is stored is input from the host apparatus 20, the channel adapter 31a (31b) judges whether or not the sense data is written in that area by reference to the control information F, and if the answer is in the affirmative, the channel adapter 31a (31b) reports the sense data to the host apparatus 20 as error information.

An asynchronous transfer control system having the above-described structure can execute the same function as a synchronous transfer control system. Therefore, even if a read error is caused by a flaw or the like produced in the data area or the key area of the magnetic disk apparatus 40, a data searching operation in the area other than the area having the flaw is possible without causing an error.

(a-2) Dynamic path recombination system

The resource manager 33 stores in the table storage portion 35 the correspondence PGT between each of a plurality of host apparatuses (CPU) 20 and each of the channel adapters (paths) 31a, 31b, . . . to which each host apparatus 20 is connected. The resource manager 33 also calculates the busy ratio indicating the frequency at which each channel adapter is used for I/O processing at a regular interval of time and stores the calculated busy ratio in the table storage portion 35 in correspondence with each channel adapter. When a predetermined host apparatus CPU is accessed by interruption after the end of the operation based on a command from the host apparatus CPU, the resource manager 33 obtains from the table storage portion 35 the channel adapter which has the lowest busy ratio among the channel adapters which are connected to the host apparatus CPU, and supplies an interruption signal to the host apparatus through the channel adapter obtained so as to transfer data through the channel adapter. According to this structure, it is possible to shorten the response time to access in a dynamic path recombination system by efficiently using the resource with the busy ratio taken into consideration.

(a-3) Control at the time of a problem in a head during writing operation

The resource manager 33 stores the write address of the magnetic disk apparatus 40 into a control memory 37 at the time of writing data, and when all the records (data of the CKD format) are normally written into the magnetic disk apparatus 40, the resource manager 33 deletes the write address. On the other hand, when a write error is caused after a part of data are written, the resource manager 33 holds the write address in the control memory 37 as an invalid record address without deleting it. When the data of the CKD format is read, the resource manager 33 judges whether or not the address which agrees with the read address is stored in the control memory 37. If the answer is YES, the resource manager 33 informs the host apparatus 20 of an error, while if the answer is NO, the resource manager 33 reads out the data of the CKD format at the read address. The control memory 37 is composed of a storage means which do not lose the contents of the memory even at the time of power failure. When the CKD data are normally written, the resource manager 33 judges whether or not the address which agrees with the write address is stored in the control memory 37, and if the answer is YES, the resource manager 33 eliminates the address from the control memory 37.

According to this structure, even if only a part of data of the CKD format are normally updated and the other part are not updated due to trouble of the head at the time of writing records, there is no problem in the guarantee of data. In addition, since the control memory 37 is composed of a non-volatile storage means, it is possible to detect an access to invalid data and inform of an error even when the power switch is turned on again after power failure. Furthermore, even when a temporary problem is caused in the head and the data at a certain address becomes invalid, if the data at this address is normally replaced, the address is eliminated from the memory and the data is treated as normal data thereafter.

(a-4) Recovery control over a module having a problem

The service adapter 36 periodically patrols so as to judge whether or not trouble is caused in a unit, and when trouble is detected, the service adapter 36 recovers the unit having the trouble. In this manner, even if trouble is produced in the service adapter 36 before recovering a module having the trouble and forgets the module having the trouble, the service adapter 36 can identify the module having the trouble and recover the module by patrol after the recovery of the service adapter 36.

When the service adapter 36 detects trouble, it informs the resource manager 33 of the unit having the trouble and simultaneously recovers the unit. After the end of recovery, the service adapter 36 informs the resource manager 33 of the end of recovery. The resource manager 33 makes the unit having the trouble inoperable when it receives the information of the trouble, and makes the unit operable again when it receives the information of the end of recovery. The resource manager 33 also monitors the time elapsed since the information of the trouble and if the resource manager 33 is not informed of the end of recovery in a preset time after the reception of the information of the trouble, the resource manager 33 inquires the service adapter 36 of the recovery of the unit, and the service adapter 36 recovers the unit on the basis of the inquiry. The service adapter 36 then informs the resource manager 33 of the end of recovery. According to this structure, even if a trouble is produced in the service adapter 36 before the end of the recovery process and forgets the fact before the occurrence of the trouble, the service adapter 36 can identify the unit having the trouble on the basis of the inquiry from the resource manager 33 after the service adapter 36 is recovered and automatically resume the recovery processing.

(a-5) Control over the information of trouble to a host apparatus

When trouble is detected by internal diagnosis or periodical patrol by the service adapter 36, the resource manager 33 reports the trouble information with ① a recovery method, ② the contents of the trouble, ③ information of an operable path, etc. added thereto to the host apparatus 20. The host apparatus 20 executes a recovery processing in accordance with the recovery method or the contents of the trouble, updates the contents of a path group table which indicates the correspondence between the I/O device and a path accessible thereto in accordance with the path information, and selects the path to be accessed in accordance with the updated path group table. In addition, when the resource manager 33 detects abnormality of the host apparatus 20, the resource manager 33 informs the host apparatus 20 of the trouble information with a channel number added thereto, and the host apparatus 20 recovers the designated channel in accordance with the trouble information. In this manner, rapid recovery is possible without influencing the access which has no relation to the trouble, and the host apparatus is capable of recovering itself when it is informed of a problem.

(b) Asynchronous transfer control method (b-1) Entire structure

Figure 11:
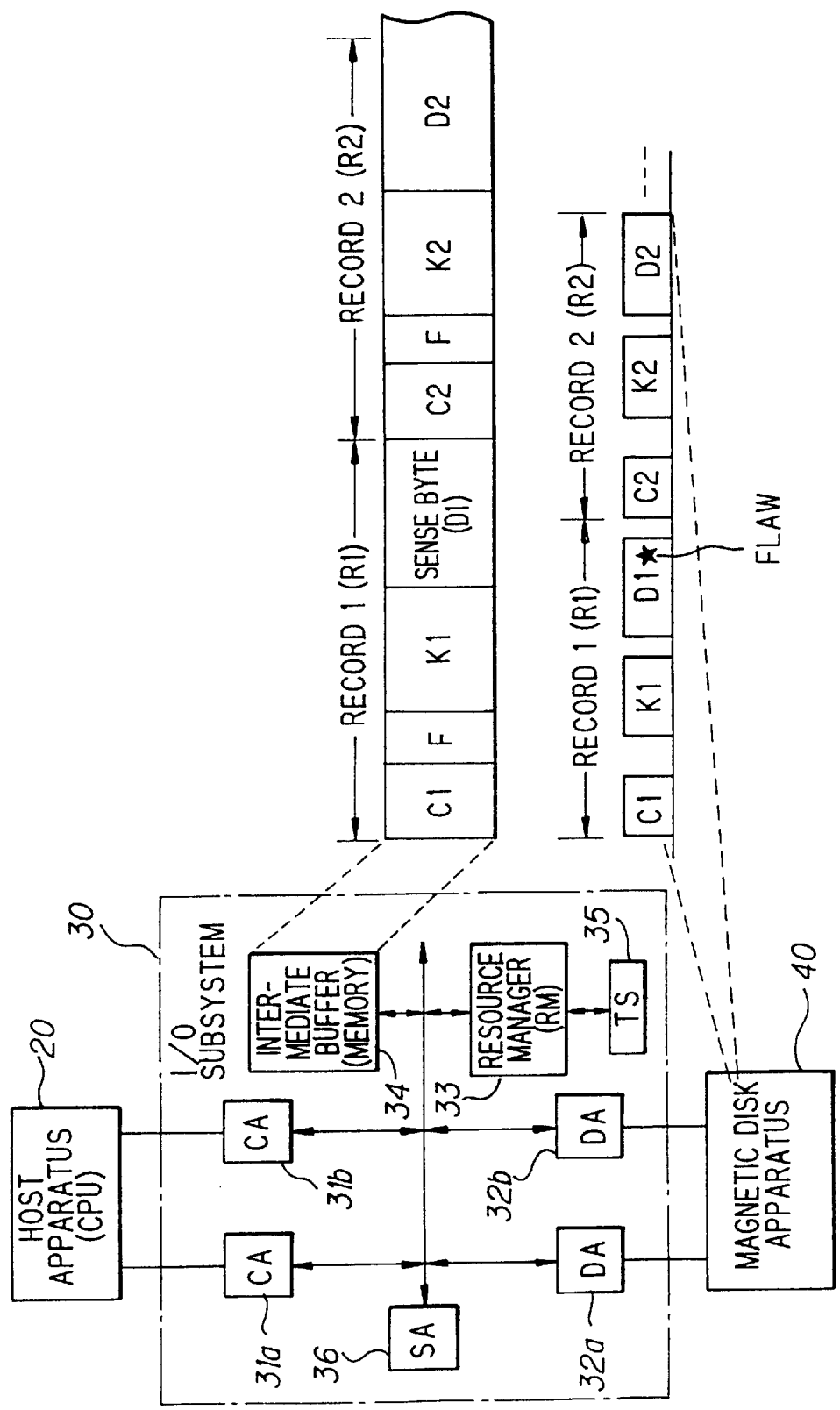
FIG. 11 shows the structure of an asynchronous transfer control method as an embodiment of a disk control method according to the present invention.

FIG. 11 shows the structure of asynchronous transfer control as an embodiment of a disk control method according to the present invention. In FIG. 11, the reference numeral 20 denotes a CPU as a host apparatus, 30 an I/O subsystem such as a magnetic disk controlling apparatus, and 40 a magnetic disk apparatus as an I/O device in which data of a CKD format are written. In the I/O subsystem 30, the reference numerals 31a and 31b represent channel adapters (CA) each serving as an interface between the host apparatus 20 and the I/O subsystem 30, 32a, 32b device adapters (DA) each serving as an interface between the I/O subsystem 30 and the magnetic disk apparatus 40, 33 a resource manager (RM) for controlling the resource management as a whole and the entire processing operations, 34 an intermediate buffer for storing the data of the CKD format which are read out of the magnetic disk apparatus 40, 35 a table storage portion (TS) for storing various tables, and 36 a service adapter for detecting a problem caused in one of the units which are connected to each other by a bus.

When no read error is caused as in a record 2 (R2), a count portion C, a control information portion F, a key portion K and a data portion D are written in the intermediate buffer 34. The control information portion F is composed of, for example, 2 bits, and ① when both the key portion K and the data portion D are normally read, the control information portion F is "00", ② when a read error is caused in the key portion K, the control information portion F is "01", ③ when a read error is caused in the data portion D, the control information portion F is "10", and ④ when a read error is caused in both portions, the control information portion F is "11".

On the other hand, if a read error is caused in the data portion D as in a record 1 (R1), a count portion C, a control information portion F ("10"), a key portion K and sense data. (sense byte) are written in the intermediate buffer 34. In other words, when a read error is caused in the data portion D, sense data of a predetermined byte indicating the contents of the error is written in place of the data portion D. In this case, the area having the size corresponding to the length (known from the count portion C) of the data portion D is secured in the intermediate buffer 34. Similarly, when a read error is caused in the key portion K, a count portion C, a control information portion F ("01"), sense data and a key portion K are written in the intermediate buffer 34. In other words, when a read error is caused in the key portion K, sense data of a predetermined byte indicating the contents of the error is written in place of the key portion K.

(b-2) Buffering process

Figure 12:
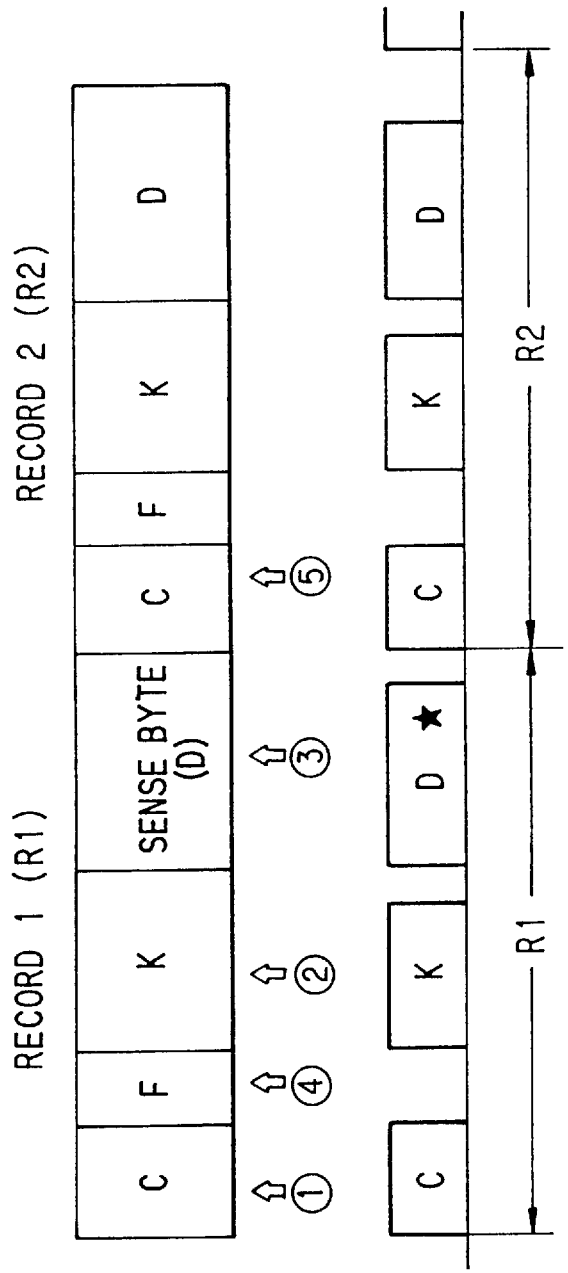
FIG. 12 is an explanatory view of the process for reading data from a disk.

FIG. 12 is an explanatory view of the buffering process for buffering data of the CKD format read from the magnetic disk apparatus 40 into the intermediate buffer 34. At the time of reading the record 1 and writing it into the intermediate buffer 34, ① the count portion C is first written. ② The key portion K is read, and when there is no read error, the key portion K is written as it is. ③ Thereafter, the data portion D is read, and whether or not there is a read error is judged. When there is a read error, sense data is created and written in place of the data portion D. ④ The control information F is then created and written in the control information area.

Figure 13:
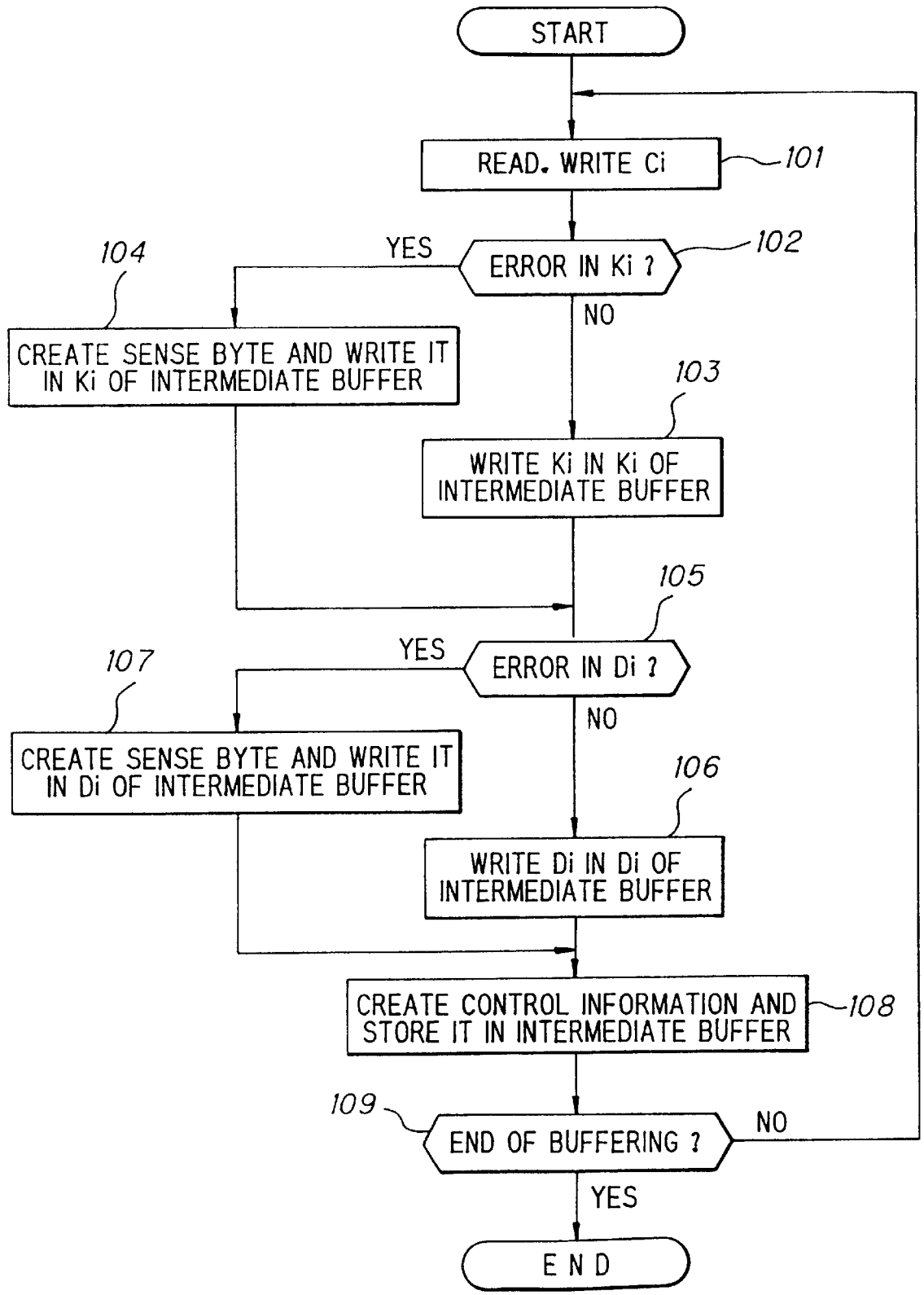
FIG. 13 is a flowchart of the buffering process for buffering data into an intermediate buffer.

FIG. 13 is a flowchart of the buffering process for buffering data into the intermediate buffer 34.

Immediately after positioning operations (seek operation, set sector operation) are finished, the device adapter 32a (32b) starts a buffering process for reading the record in a predetermined range (e.g., from an index mark to the next index mark) from the magnetic disk apparatus 40 and writing it into the intermediate buffer 34. The count portion Ci of a first record is read from the magnetic disk apparatus 40 and stores it into the intermediate buffer 34 (step 101). The key portion Ki is then read. Whether or not a read error is caused in the key portion Ki is monitored (step 102), and when there is no read error, the key portion Ki is stored in the intermediate buffer 34. On the other hand, if there is a read error, the device adapter 32a (32b) creates sense data including the contents of the error and the address at which the error is caused and writes the sense data into the intermediate buffer 34 in place of the key portion K (step 104).

Thereafter, the data portion Di is read. Whether or not there is a read error is judged (step 105), and when there is no read error, the read data portion Di is stored into the intermediate buffer 34 (step 106). On the other hand, if there is a read error, the device adapter 32a creates sense data including the contents of the error and the address at which the error is caused and writes the sense data into the intermediate buffer 34 in place of the data portion Di (step 107).

The control information Fi is then created with reference to the state in which a read error is caused in the key portion Ki and the data portion Di, and stored the control information Fi into the intermediate buffer 34 (step 108). After the control information Fi is written, whether or not all the records in a predetermined range has been buffered, for example, whether or not the next index mark is detected, is judged (step 109), and if the answer is NO, the process returns to the step 101 so as to execute the buffering of the next record, while if the answer is YES, the buffering process is finished.

(b-3) Search ID process

Figure 14:
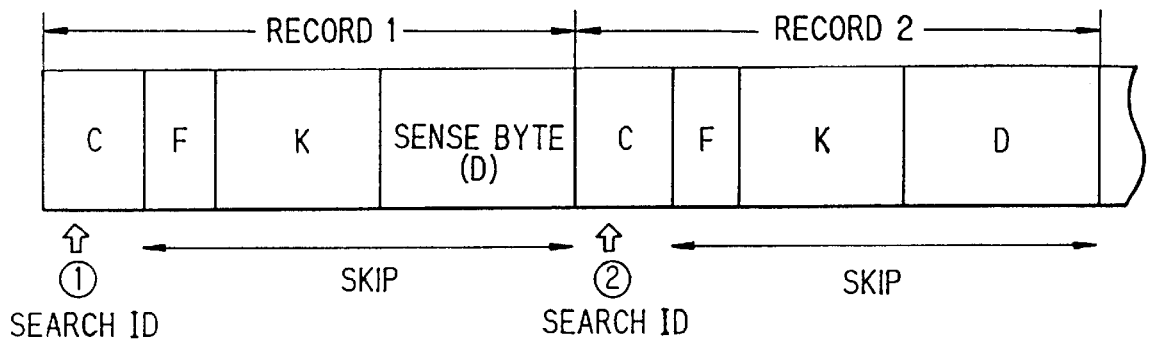
FIG. 14 is an explanatory view of a searching operation executed in accordance with a command from a host apparatus.

FIG. 14 is an explanatory view of a search ID process. When a search ID command is input from a host apparatus after the end of the buffering process, the channel adapter 31a (31b) searches only the count portions C (①②) of the intermediate buffer 33 and skips the other areas (the control information area, the key area, and the data area). As a result, even if sense data is written in the key area or the data area, it is possible to search for the desired record without ending the process due to an error.

Figure 15:
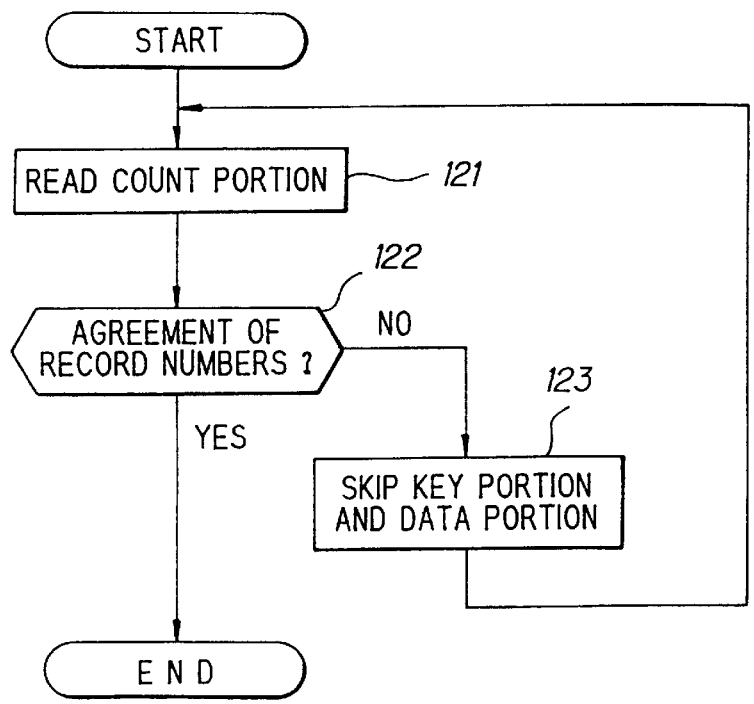
FIG. 15 is a flowchart of a search ID process.

FIG. 15 is a flowchart of a search ID process. When a search ID command is input from the host apparatus 20 after the end of the buffering process, the channel adapter 31a (31b) reads the count portion C of a first record so as to judge whether or not the record number contained in the count portion agrees with the designated record number (step 122). If the answer is in the affirmative, the channel adapter 31a (31b) finishes the searching operation, while if the answer is in the negative, the channel adapter 31a (31b) skips the key portion K and the data portion D (step 123), and reads the count portion C of the next record so as to execute a similar processing.

(b-4) Data read process

Figure 16:
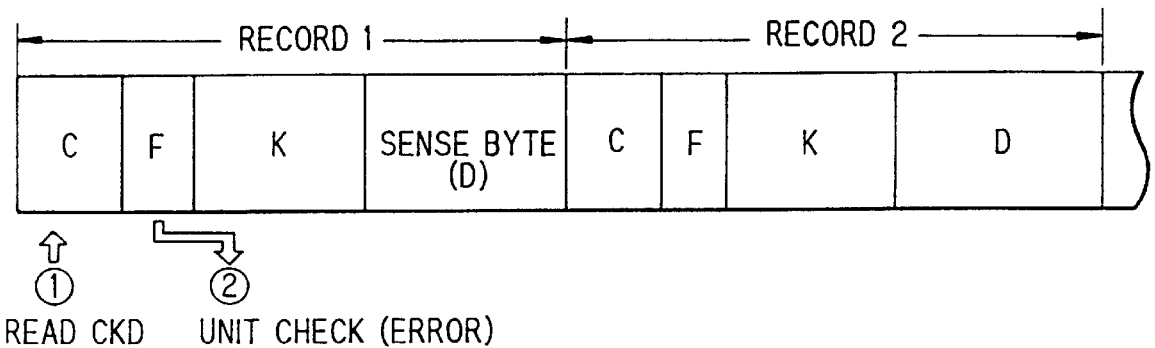
FIG. 16 is an explanatory view of a data reading operation executed in accordance with a command from a host apparatus.
Figure 17:
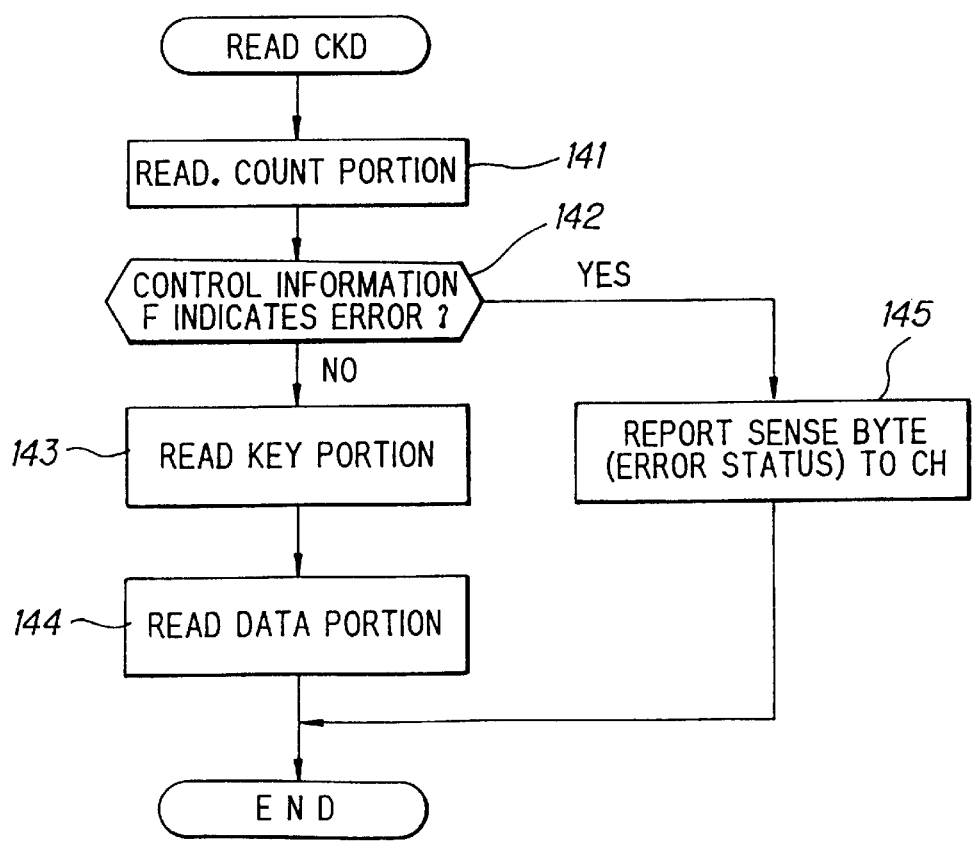
FIG. 17 is a flowchart of a data read process.

FIG. 16 is an explanatory view of a data reading operation, and FIG. 17 is a flowchart of a data read process. When a read CKD (Read Count Key Data) command is issued from the host apparatus 20 after the end of the search ID process, the channel adapter 31a (31b) reads the count portion from the head of the record which is searched for in the search ID process (step 141). The control information portion F is then read so as to judge whether or not the control information portion F is "00", in other words, whether or not sense information is written in the key portion or the data portion (step 142). If the control information portion F is "00", the key portion K is read and subsequently the data portion D is read (steps 143, 144), thereby ending the operation of reading one record. On the other hand, if the control information F is not "00" at the step 142, sense data is read, the error status is supplied to the host apparatus 20, and the sense data is reported to the host apparatus 20 (step 145), thereby ending the process.

If the first bit of the control information portion F is "1", it means that sense data is written in the data area, so that the sense data is read from the data area. If the second bit of the control information portion F is "1", it means that sense data is written in the key area, so that the sense data is read from the key area.

In the case of a read CD (Read Count Data) command, which does not include the operation of reading the key portion K, even if sense information is written in the key portion (the second bit of the control information portion F is "1"), the count portion C and the data portion D are read without causing any error. Similarly, in the case of a read CK (Read Count Key) command, which does not include the operation of reading the data portion D, even if sense information is written in the data portion D, the count portion C and the key portion K are read without causing any error.

In this way, even if the I/O subsystem (magnetic disk controlling apparatus) is operated by an asynchronous transfer system, the same operation as that in a synchronous transfer system in which a reading process is executed directly in the magnetic disk apparatus is guaranteed.

Figure 18:
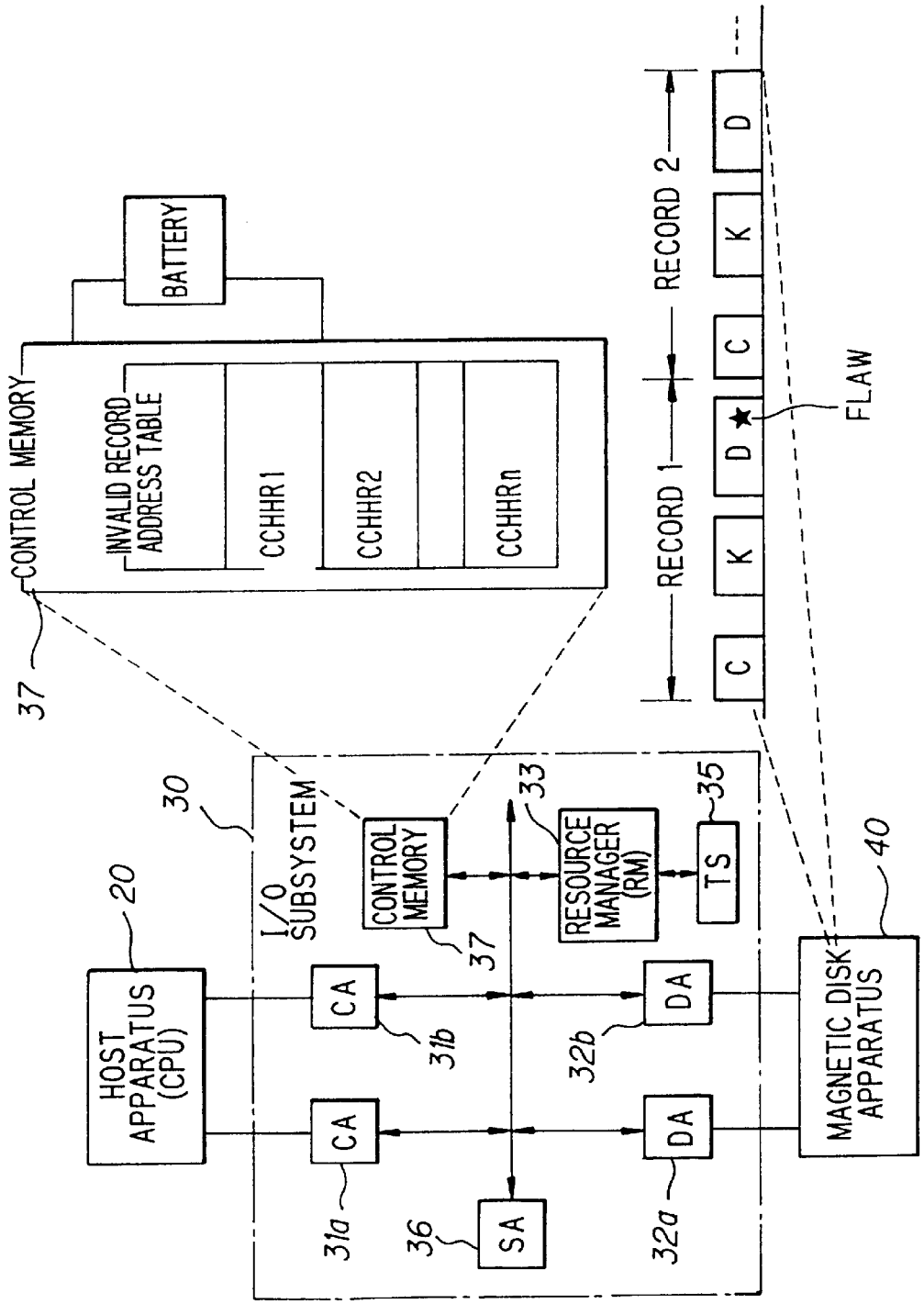
FIG. 18 shows the structure of an I/O subsystem which enables the guarantee of data at the time of a trouble in the head.

(c) Control over data writing.reading at the time of trouble in the head during writing (c-1) Entire structure FIG. 18 shows the structure of an I/O subsystem which realizes control over data writing reading when there is a problem in the head during writing. In FIG. 18, the reference numeral 20 denotes a CPU as a host apparatus, 30 an I/O subsystem such as a magnetic disk controlling apparatus, and 40 a magnetic disk apparatus as an I/O device in which data of a CKD format are written. In the I/O subsystem 30, the reference numerals 31a and 31b represent channel adapters (CA) each serving as an interface between the host apparatus 20 and the I/O subsystem 30, 32a, 32b device adapters (DA) each serving as an interface between the I/O subsystem 30 and the magnetic disk apparatus 40, 33 a resource manager (RM) for controlling the resource management as a whole and the entire processing operations, 35 a table storage portion (TS) for storing various tables, 36 a service adapter for detecting a problem caused in one of the units which are connected to each other by a bus, and 37 a non-volatile memory (containing a RAM backed up by a battery).

When the data of the CKD format is written at a predetermined address of the magnetic disk apparatus 40 and a problem is produced in the head after writing a part of the data (e.g., the key portion K), which makes it impossible to write the remaining portion (data portion D), the address CCHHR is stored and held in the control memory 37.

(c-2) Data guarantee process

Figure 19:
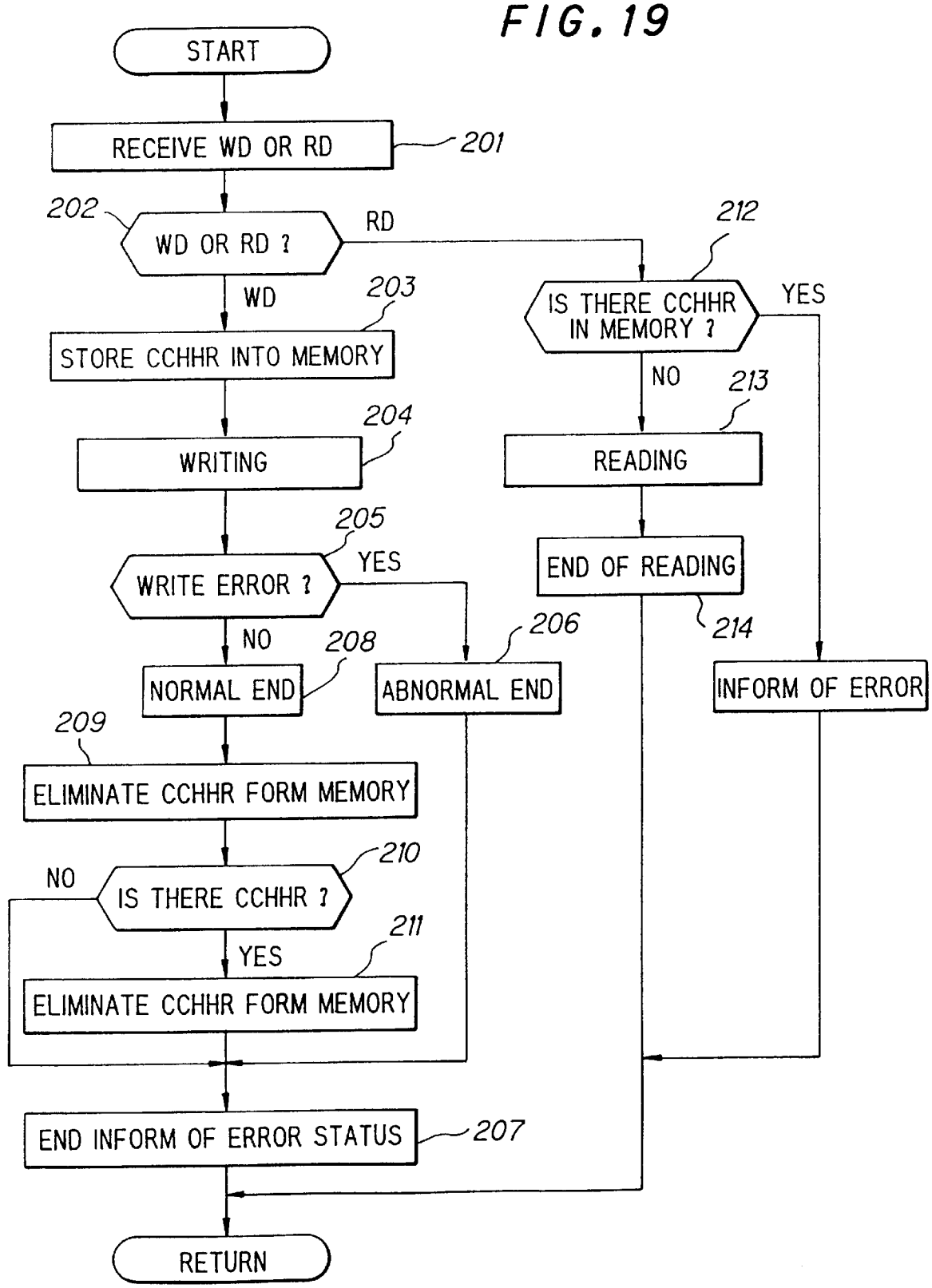
FIG. 19 is a flowchart of a data guarantee process.

A problem is sometimes produced in the head during the execution of a write key data command. For example, a problem may be produced in the head while the head is moving to the data area after the normal end of the writing operation in the preceding key area. If such trouble is caused, the magnetic disk apparatus contains the data a part of which are new and the rest thereof are old, which produces a problem in the guarantee of the data. FIG. 19 is a flowchart of a data guarantee process for guaranteeing the data by informing of an error when such a data is about to be read.

When the resource manager 33 receives a write command from the host apparatus 20 through the channel adapter 31a (31b) after the end of the positioning operations (seek operation, set sector operation and search ID operation), the resource manager 33 stores a write address CCHHR in the control memory 37 (steps 201 to 203).

The device adapter 32a (32b) then writes data of the CKD format into the magnetic disk apparatus 40 (step 204).

The writing operation is executed by ① instructing the count portion C to be written by the channel adapter 31a (31b), ② instructing the key portion K to be written after the normal end of the count portion C writing operation, ③ instructing the data portion D to be written after the normal end of the key portion K writing operation, and ④ informing the host apparatus 20 of the end of the writing operation after the normal end of the data portion D writing operation.

In such a writing operation, if it is impossible to write the data portion D due to a problem in the head caused while the head is moving after the normal end of the key portion K writing operation, a write error is produced. The device adapter 32a (32b) monitors whether or not a write error is produced (step 205), and if an error is caused, the device adapter 31a (32b) immediately stops writing (abnormal end: step 206) and informs the host apparatus 20 of the error status (step 207), thereby ending the writing operation. In this case, the write address CCHHR which is written in the control memory 37 is stored and held without being deleted.

On the other hand, if the writing operation is normally executed and finished (step 208), the device adapter 32a (32b) informs the resource manager 33 of the normal end. The resource manager 33 then eliminates the write address CCHHR from the control memory 37 (step 209). Thereafter, the resource manager 33 judges whether or not the address which agrees with the write address CCHHR is stored in another area of the control memory 37 (step 210), and if the answer is in the affirmative, the address is eliminated from the control memory 37 (step 211). By this operation, the address which is stored in the control memory 37 as an invalid data address because the data has not been normally written into the magnetic disk apparatus 40 due to a head trouble is deleted, and the data at this address is treated thereafter as valid data. This is the case in which the head temporarily becomes out of order but it becomes again operable.

The device adapter 32a (32b) then informs the host apparatus 20 of the end of the writing operation through the channel adapter 31a (31b), thereby ending the writing process.

When the resource manager 33 receives a read command from the host apparatus 20 through the channel adapter 31a (31b) after the end of the positioning operations, the resource manager 33 judges whether or not the read address CCHHR is stored in the control memory 37 (step 212). If the answer is NO, the resource manager 33 regards the record stored at the read address as a valid record and permits the channel adapter 31a (31b) and the device adapter 32a (32b) to read the record (step 213). The device adapter 32a (32b) then writes the record from the magnetic disk apparatus 40 and transfers the record to the host apparatus 20 through the channel adapter 31a (31b), thereby finishing the reading process (step 214). On the other hand, if the address which agrees with the read address CCHHR is stored in the control memory 37, the data stored at the read address is regarded as invalid data, and the resource manager 33 informs the host apparatus 20 of a data error, thereby ending the reading process without reading the data (step 215). The host apparatus 20 which has received the information of the data error, judges that there is an abnormality, and suspends the processing for the purpose of appropriate recovery.

According to this structure, even if only a part of data are normally updated and the rest thereof are not updated, the host apparatus 20 can prevent a risk of using invalid data without producing any problem in the guarantee of the data. In addition, since the control memory 37 is composed of a non-volatile storage means, it is possible to detect an access to invalid data and inform of an error even when the power switch is turned on again after power failure. Furthermore, even when a temporary problem is caused in the head and the data at a certain address becomes invalid, if the data at this address is normally updated, the address is eliminated from the control memory 37 and the data is treated as normal data thereafter.

(c-3) Modification

Figure 20:
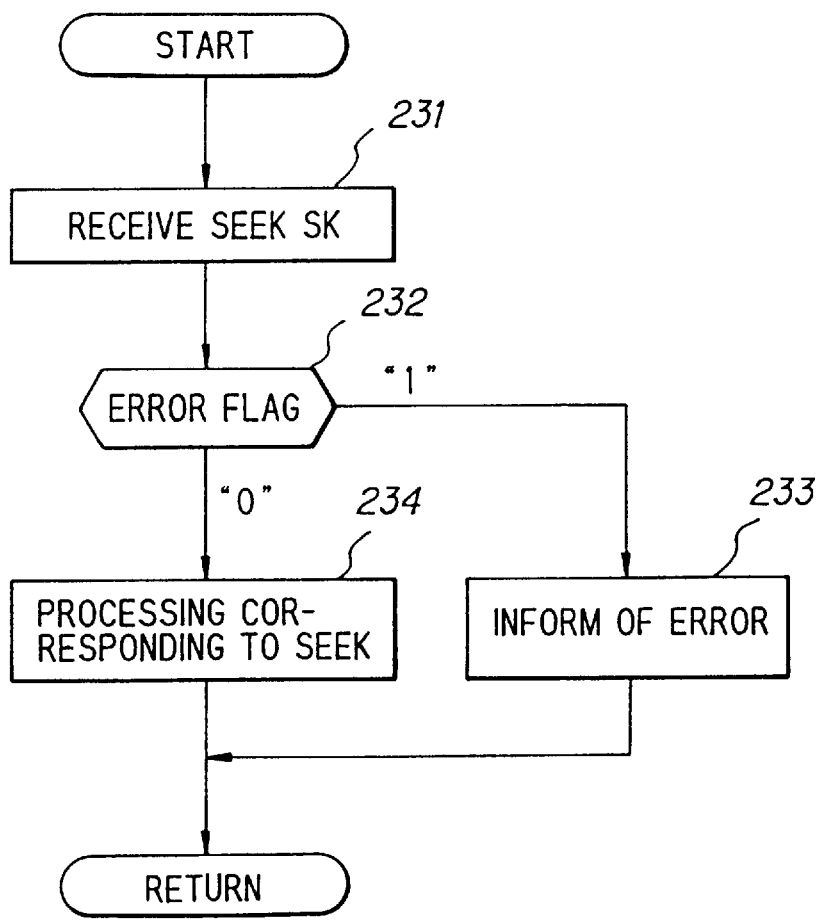
FIG. 20 is a flowchart of another data guarantee process.

In the embodiment described in (c-2), a data error is supplied to the host apparatus 20 when invalid data is accessed. It is also possible to store an error flag which indicates an abnormality in the magnetic disk apparatus 40 in the control memory 37, and to prohibit the entire magnetic disk apparatus 40 from being accessed by supplying a disk error when the error flag is set at the time of access. In this manner, it is possible to guarantee the data more completely in an abnormal head state in which a problem in the head is unstable (an abnormality is intermittently produced). FIG. 20 is a flowchart of such a process. When the resource manager 33 receives a seek command from the host apparatus 20 (step 231), the resource manager 33 judges whether or not the error flag is set (step 232). If the answer is YES, the resource manager 33 supplies a disk error to the host apparatus 20, thereby ending the process (step 233). On the other hand, if the answer is NO, the processing corresponding to the seek command is executed (step 234). After the positioning operations, the processing shown in FIG. 19 is executed.

(d) Dynamic path recombination control (d-1) Background

A recent large computer system is generally composed of a plurality of central processing units CPU. In such a system, common use of data and communication of data among a plurality of CPUs are necessary. For this purpose, I/O device subsystem including an external storage unit used in the system is required to be connected to a multiplicity of host interfaces. To meet this demand, the I/O subsystem is provided with a multiplicity of channel adapters CA, and the channel adapters CA and the central processing units CPU are connected by a multiplicity of paths. In such a system, access is sometimes concentrated on one channel adapter CA, so that the busy ratio of the channel adapter CA becomes high, which results in a slow response to the access and a lowering of the performance.

As a countermeasure, a dynamic path recombination system for increasing the performance of the system by lowering the busy ratio is proposed. In the dynamic path recombination system, which path and which path are connected to the same CPU is registered in advance. When a positioning operation (e.g., a search ID operation) of the head is finished and the CPU is informed of the end of operation, the resource manager RM judges which channel adapters CA are connected to the CPU and so controls a vacant channel adapter as to report the operation end to the CPU. In this manner, the dynamic path recombination system enables effective use of a plurality of paths (channel adapters). In such a conventional dynamic path recombination system, however, a vacant channel adapter CA in the plurality of channel adapters of the same group is used for interruption, and the busy ratio of the channel adapter CA is not taken into consideration, so that the performance improving effect is small.

(d-2) Entire structure

Figure 21:
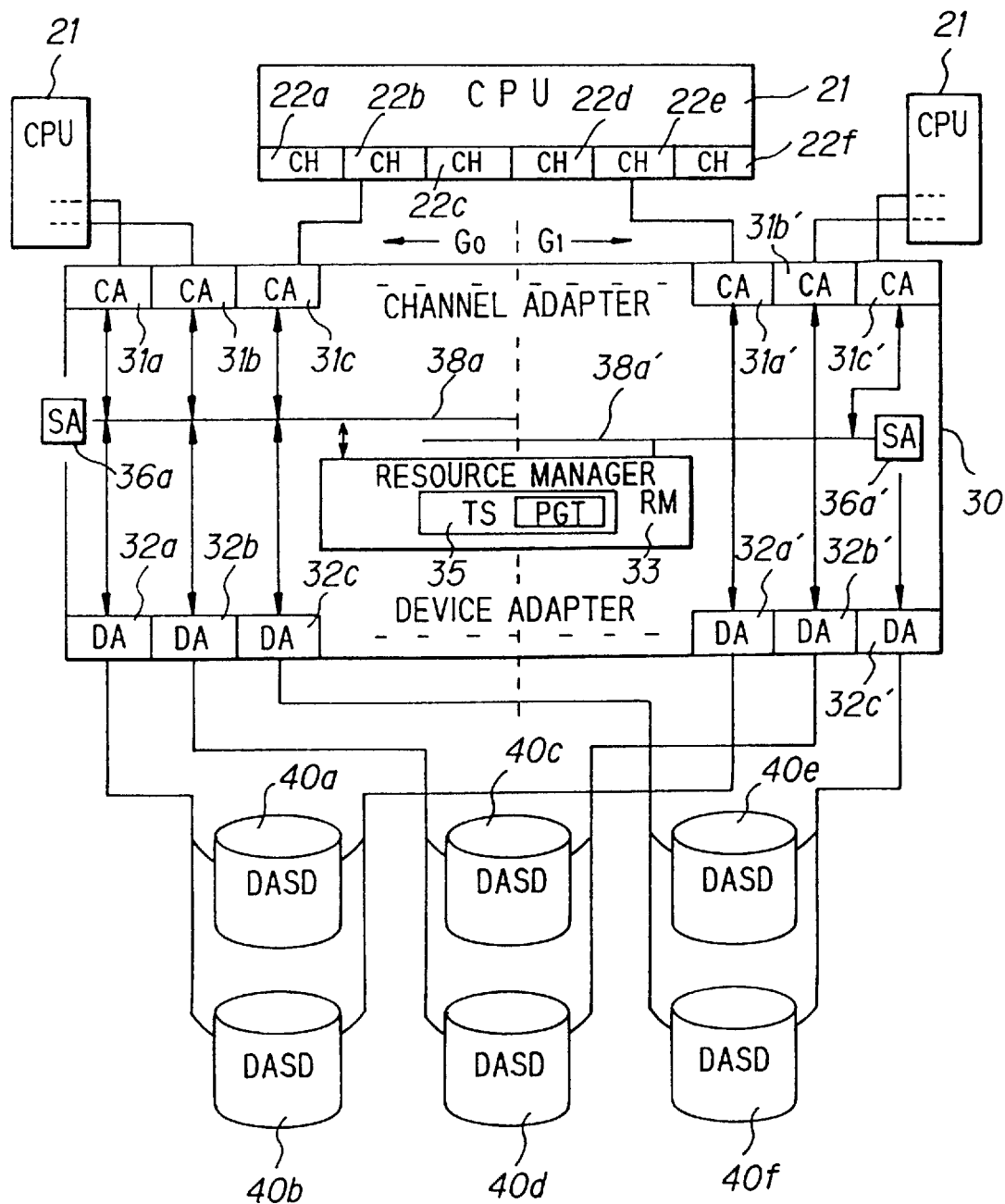
FIG. 21 shows the structure of an I/O subsystem which realizes a dynamic path recombination controlling method as an embodiment of a disk control method according to the present invention.

FIG. 21 shows the structure of an I/O subsystem which realizes a dynamic path recombination controlling method as an embodiment of a disk control method according to the present invention. The reference numeral 21 represents a host apparatus (CPU) provided with a plurality of channels 22a, 22b, 22c . . . , 30 an I/O subsystem as a magnetic disk controlling apparatus, and 40a to 40f magnetic disk apparatuses (DASD). In the I/O subsystem 30, the reference numerals 31a to 31c, 31a' to 31c' represent channel adapters (CA) each serving as an interface between the host apparatus CPU and the I/O subsystem 30, 32a to 32c, 32a' to 32c' device adapters (DA) each serving as an interface between the I/O subsystem 30 and the magnetic disk apparatus 40, 33 a resource manager (RM) for controlling the resource management as a whole and the entire processing operations, 35 a table storage portion (TS) for storing various tables, and 36a, 36a' service adapters for detecting a trouble caused in one of the units which are connected to each other by buses 38a, 38a'. Each bus has C-BUS, D-BUS and S-BUS (not shown). The C-BUS is a control bus through which each unit communicates a message and accesses control information, the D-BUS is a data transfer bus thorough which each unit supplies and receives data, and the S-BUS is a service bus through which service modules 36a, 36a' as a master control the state of each unit.

The I/O subsystem 30 has a duplicated structure which is symmetric with respect to the dotted center line. The resource manager RM and the table storage portion TS constitute a common module. The CPU 21 is appropriately connected to the channel adapters on a first controller side G0 and a second controller side G1, and each of the magnetic disk apparatuses 40a to 40f is accessible both from the first controller side G0 and from the second controller side G1. Therefore, even if trouble is caused in a channel adapter or a device adapter on one controller side, it is possible to access the magnetic disk apparatus through a channel adapter and a device adapter on the other side.

Figure 22:
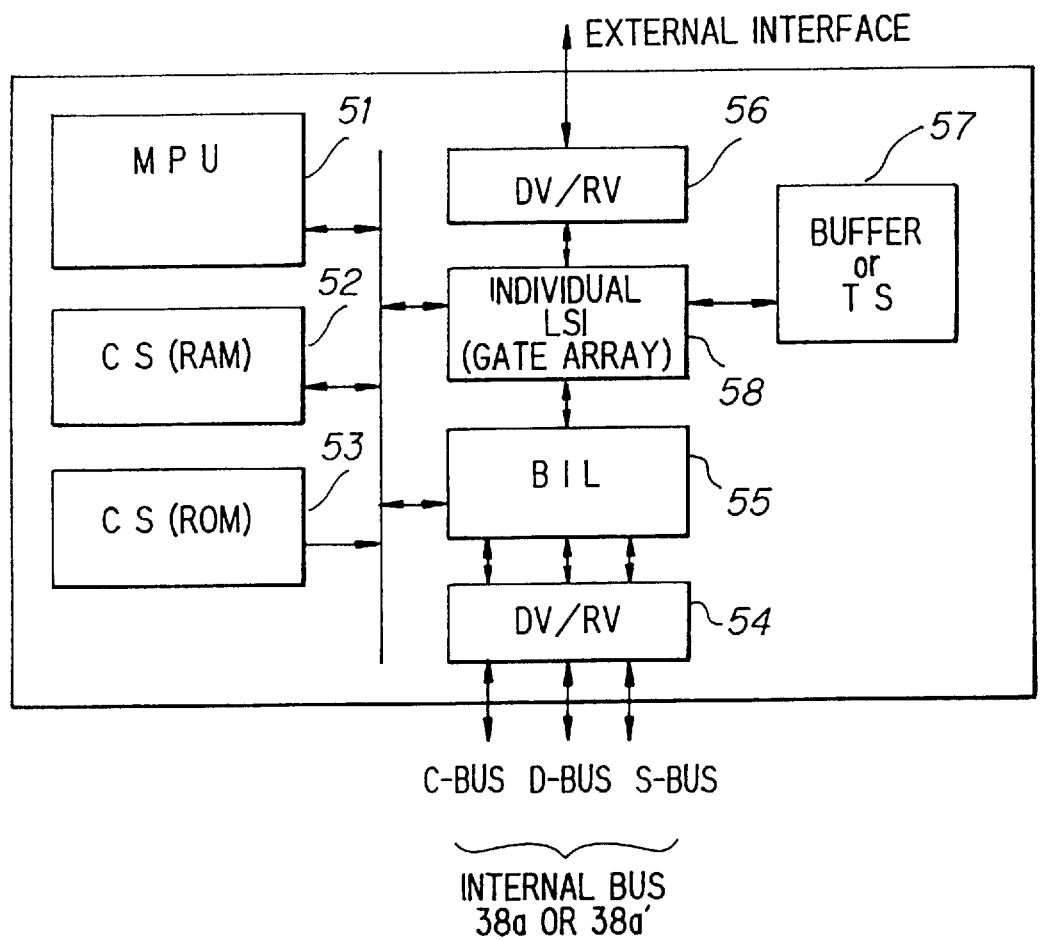
FIG. 22 shows the hardware structure of each unit in the I/O subsystem shown in FIG. 21.

Each of the channel adapters 31a to 31c', the device adapters 32a to 32c', the resource manager 33 and the service adapters 36a, 36a' is composed of a microprocessor and substantially has the structure shown in FIG. 22. In FIG. 22, the reference numeral 51 denotes a microprocessor (MPU), 52 a control storage portion (CS) having a RAM structure, 53 a control storage portion (CS) having a ROM structure, 54 a driver/receiver (DV/RV) which is connected to internal buses 38a, 38a', 55 a bus interface logic (BIL), 56 a driver/receiver (DV/RV) which is connected to an external interface, 57 a buffer or a table storage portion (TS) and 58 an individual LSI (gate array).

The table storage portion 35 which stores various tables stores a path group table PGT as a table related to dynamic path recombination. FIG. 23 is a schematic explanatory view of the path group table PGT. The channel adapter CA (path) connected to the host apparatus CPU is stored in correspondence with the host apparatus CPU. The busy ratio indicating the rate at which each channel adapter is used for a predetermined period of time, and the number of I/O processing times which is necessary for the calculation of the busy ratio are recorded in the path group table PGT.

(d-3) Dynamic path recombination control

Figure 24:
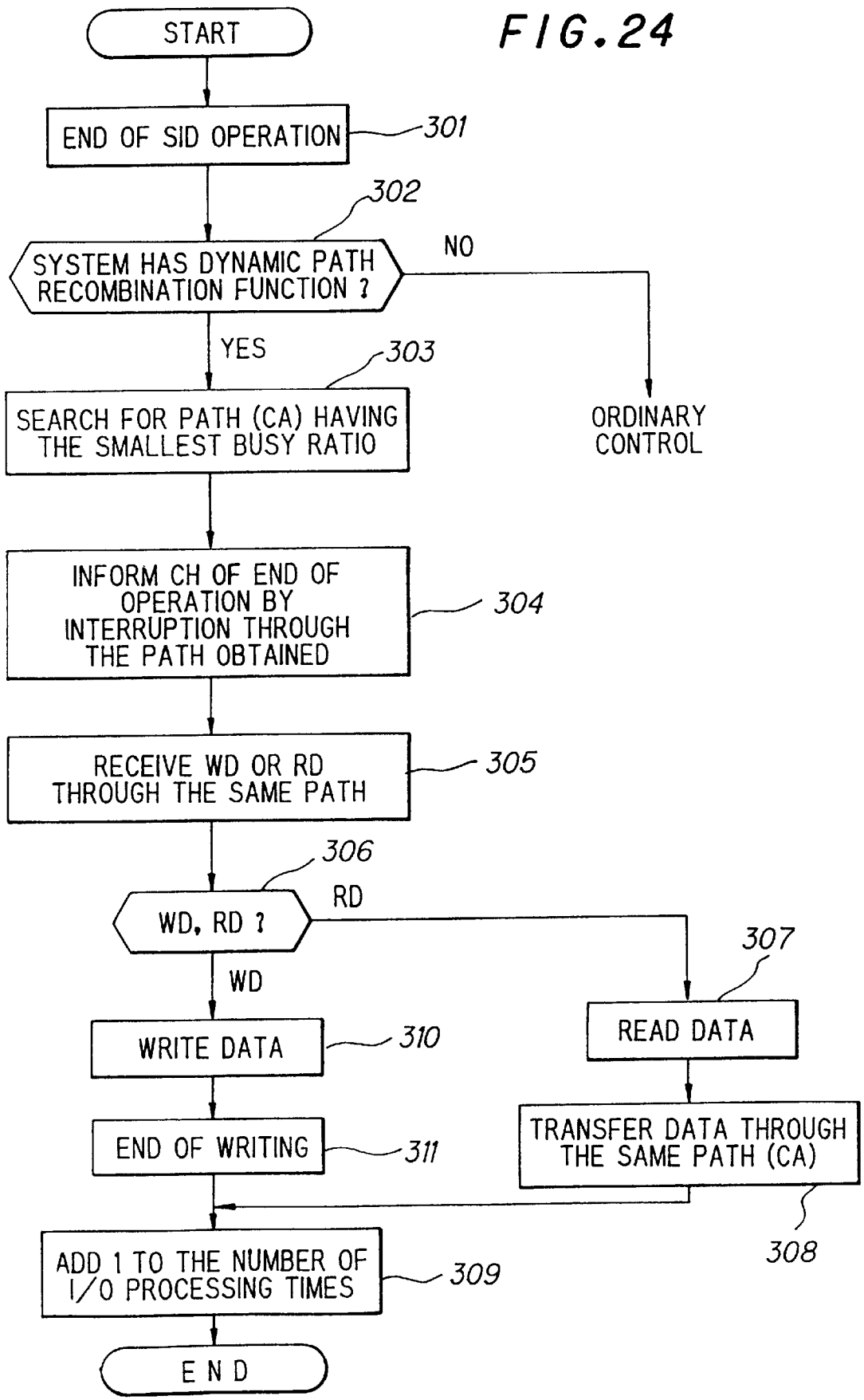
FIG. 24 is a flowchart of a dynamic path recombination control process according to the present invention.

FIG. 24 is a flowchart of a dynamic path recombination control process according to the present invention.

When the search ID operation is finished (step 301), the resource manager 33 judges whether or not the system has a dynamic path recombination control function (step 302), and if the answer is NO, the resource manager 33 executes not dynamic path recombination control but ordinary control. If the answer is YES, the resource manager 33 obtains the channel adapter CA having the smallest busy ratio in the same group as the channel adapter CA which has received the first request for access (seek command, set sector command, etc.) by reference to the path group table PGT (step 303), and informs the host apparatus 21 of the end of the search ID operation by interruption through the channel adapter CA obtained (step 304).

The host apparatus 21 then supplies a write command WD or a read command RD to the channel adapter CA through which it has received the interrupt (step 305). If it is the read command RD, the device adapter reads data from a predetermined magnetic disk apparatus and transfers the data to the host apparatus 21 through the channel adapter which has received the read command RD (steps 306 to 308). When the reading operation is finished, the resource manager 33 adds 1 to the number of I/O processing times of the channel adapter (step 309), thereby ending the processing.

On the other hand, if the command from the host apparatus 21 is the write command WD, the channel adapter writes data into the magnetic disk apparatus through the device adapter (steps 306, 310, 311). When the reading operation is finished, the resource manager 33 adds 1 to the number of I/O processing times of the channel adapter (step 309), thereby ending the processing.

Although 1 is added to the number of I/O processing times of the channel adapter through which data is transferred in this embodiment, it is possible to add 1 also to the number of I/O processing times of the channel adapter which has received the first seek command, or the number added may be other than 1.

Figure 25:
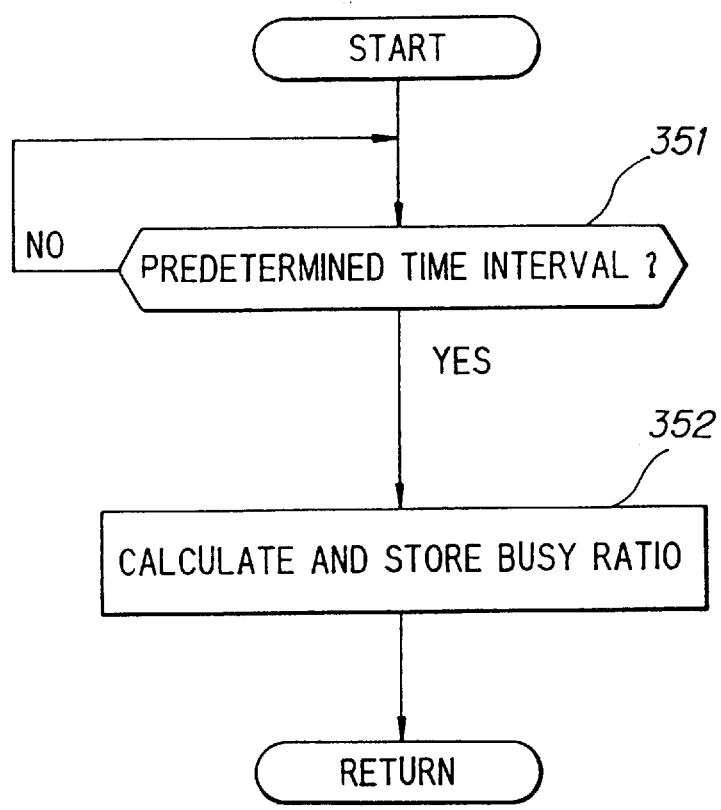
FIG. 25 is a flowchart of a busy ratio calculation process.

The resource manager 33 calculates the busy ratio at a regular interval of time from the following formula:

Busy ratio=(number of I/O processing times)/predetermined time interval, writes the calculated busy ratio in the field of the corresponding item (busy ratio) of the path group table PGT and simultaneously clears the number of I/O processing times to 0 (steps 351, 352), as shown in FIG. 25.

In this manner, since the busy ratio is calculated and data is transferred through the channel adapter in the same group that has the smallest busy ratio by dynamic path recombination control, efficient use of resources is enabled, the response time for access is shortened, and the performance of the system is increased.

(e) Recovery control over module having a problem

As shown in FIG. 21, the I/O subsystem (magnetic disk controlling apparatus) composed of modules is provided with modules (service adapters SA) 36a, 36a' for detecting a trouble caused in a module. The service adapter 36a detects trouble of a module and recovers the module on the first controller side G0, while the service adapter 36a' detects trouble of a module and recovers the module on the second controller side G1. As to a common module, one of the service adapters 36a, 36a' which has been initiated first informs the other service adapter that it takes charge of the common module, and detects a problem thereof and recovers the module.

Figure 26:
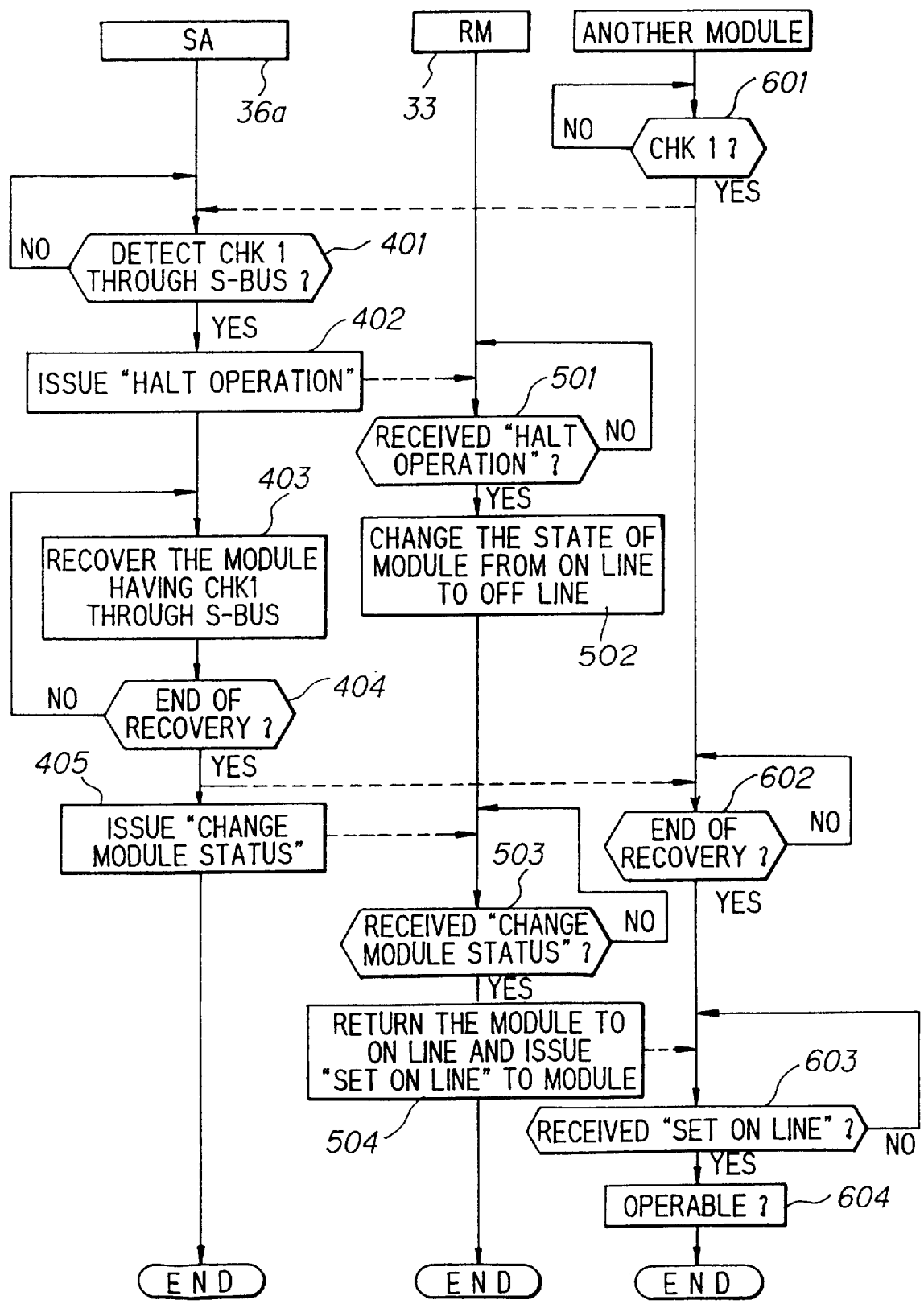
FIG. 26 is a flowchart of a recovery process at the normal time when a service adapter has no trouble.

FIG. 26 is a flowchart of a recovery process at the normal time when a service adapter has no trouble.

If a problem (CHECK1) is caused in a module (S 601), the service adapter 36a detects the trouble through the S-BUS (step 401). When the service adapter 36a recovers the module having the problem, it issues a command "HALT OPERATION" to the resource manager 33 so as to prohibit the use of the module which is being recovered (step 402). The resource manager 22 makes the module unoperable by issuing a command "OFF LINE" to the module (steps 501, 502). The command is issued to the module through the C-BUS.

After the service adapter 36a issues the command "HALT OPERATION", the service adapter 36a recovers the module having the trouble through the S-BUS (steps 403, 404), and the recovered module waits for permission to operate ("SET ON LINE") from the resource manager 33 (steps 602, 603). Since the module recovered by the resource manager 33 is in an off-line state, it is necessary to permit the module to operate in order to reuse the module.

When the recovered module becomes reusable, the service adapter 36a issues a command "CHANGE MODULE STATUS" to the resource manager 33 so as to inform the resource manager 33 that the recovery of the module has been finished and that the module is reusable (step 405).

When the resource manager 33 receives the command "CHANGE MODULE STATUS", it changes the state of the designated module from off line to on line and issues a command "SET ON LINE" to the module so as to permit the module to operate (steps 503, 504).

The module is made operable when it receives the command "SET ON LINE" (steps 603, 604).

If a problem is caused in the service adapter 36a before the end of the recovery process, or after the end of recovery and before issuing the command "CHANGE MODULE STATUS", the service adapter 36a cannot issue the command "CHANGE MODULE STATUS", so that the module cannot operate any more, which leads to an abnormality of the system such as system down in the worst case. Generally, the service adapter 36a having a problem is recovered by the other service adapter 36a' and thereafter the service adapter 36a is capable of ordinary a trouble detection and recovery processing. The recovered service adapter 36a, however, forgets the module to be recovered, or the task of issuing the command "CHANGE MODULE STATUS", which may lead to serious trouble such as system down in the worst case.

The following three methods are adopted as a countermeasure in the present invention.

In a first method, the service adapters 36a, 36a' periodically patrol so as to detect trouble in a module. According to this method, the service adapter 36a patrols again after it is recovered, so as to detect the trouble of the module during the patrol, and to recover the module and issue the command "CHANGE MODULE STATUS". In this way, even if the service adapter 36a forgets the module to be recovered or the issue of the command "CHANGE MODULE STATUS" due to its own trouble, the service adapter 36a can recover the module and issue the command "CHANGE MODULE STATUS" after the service adapter 36a is recovered.

The module having a problem is ordinarily recovered immediately after the trouble is detected.

In a second method, the resource manager 33 monitors the time elapsed since the reception of the command "HALT OPERATION", and when the time elapsed exceeds a preset time, the resource manager 33 inquires the service adapter 36a of the recovery of the module. According to this method, if the service adapter 36a has been recovered at the time of inquiry, the service adapter 36a recovers the module specified by the inquiry and thereafter issues the command "CHANGE MODULE STATUS".

In a third method, when the module having the trouble is recovered, the time elapsed thereafter is monitored, and when the time elapsed exceeds a preset time, the module requests the resource manager 33 to permit operation and inquires the service adapter 36a of the recovery of the module through the resource manager 33. According to this method, if the service adapter 36a has been recovered at the time of inquiry, the service adapter 36a recovers the module specified by the inquiry and thereafter issues the command "CHANGE MODULE STATUS". In this manner, the module becomes operable.

(e-1) First recovery method

Figure 27:
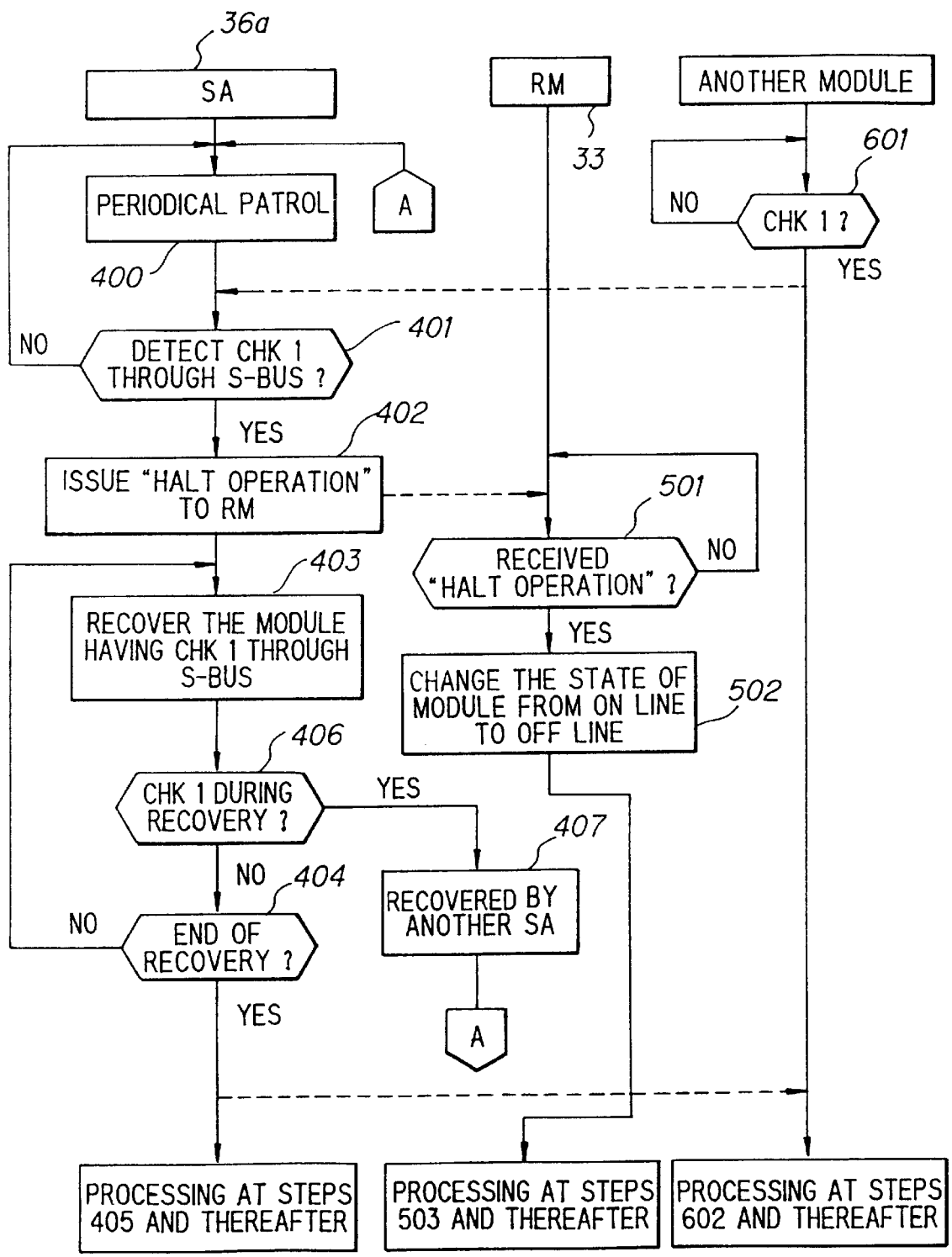
FIG. 27 is a flowchart of a first recovery process.

FIG. 27 is a flowchart of a first recovery process.

The service adapter 36a periodically patrols so as to detect a problem in a module (step 400). When a problem (CHECK1) is caused in a module (step 601), the service adapter 36a detects the trouble through the S-BUS (step 401). When the service adapter 36a detects the module having the trouble, it issues a command "HALT OPERATION" to the resource manager 33 so as to prohibit the use of the module which is being recovered (step 402). The resource manager 22 makes the module unoperable by issuing a command "OFF LINE" to the module (steps 501, 502). The command is issued to the module through the C-BUS.

After the service adapter 36a issues the command "HALT OPERATION", the service adapter 36a recovers the module having the trouble through the S-BUS (step 403). If the recovery is finished without causing trouble in the service adapter 36a (step 404), the recovered module waits for permission to operate ("SET ON LINE") from the resource manager 33 (steps 602, 603 in FIG. 26). Thereafter, the service adapter 36a, the resource manager 33 and the recovered module execute the same processing as that shown in FIG. 26.

On the other hand, if a problem is caused in the service adapter 36a during or before the recovery processing (step 406), the service adapter 36a is recovered by the other service adapter 36a' (step 407), and the process returns to the step 400 so as to execute periodical patrol for detecting trouble.

In other words, the service adapter 36a patrols again after it is recovered, detects the module having the trouble during patrol, recovers the module and issues the command "CHANGE MODULE STATUS" (step 405 in FIG. 26). As a result, even if the service adapter 36a forgets the module to be recovered or the issue of the command "CHANGE MODULE STATUS" due to its own trouble, the service adapter 36a can recover the module and issue the command "CHANGE MODULE STATUS" after the service adapter 36a is recovered.

(e-2) Second recovery method

Figure 28:
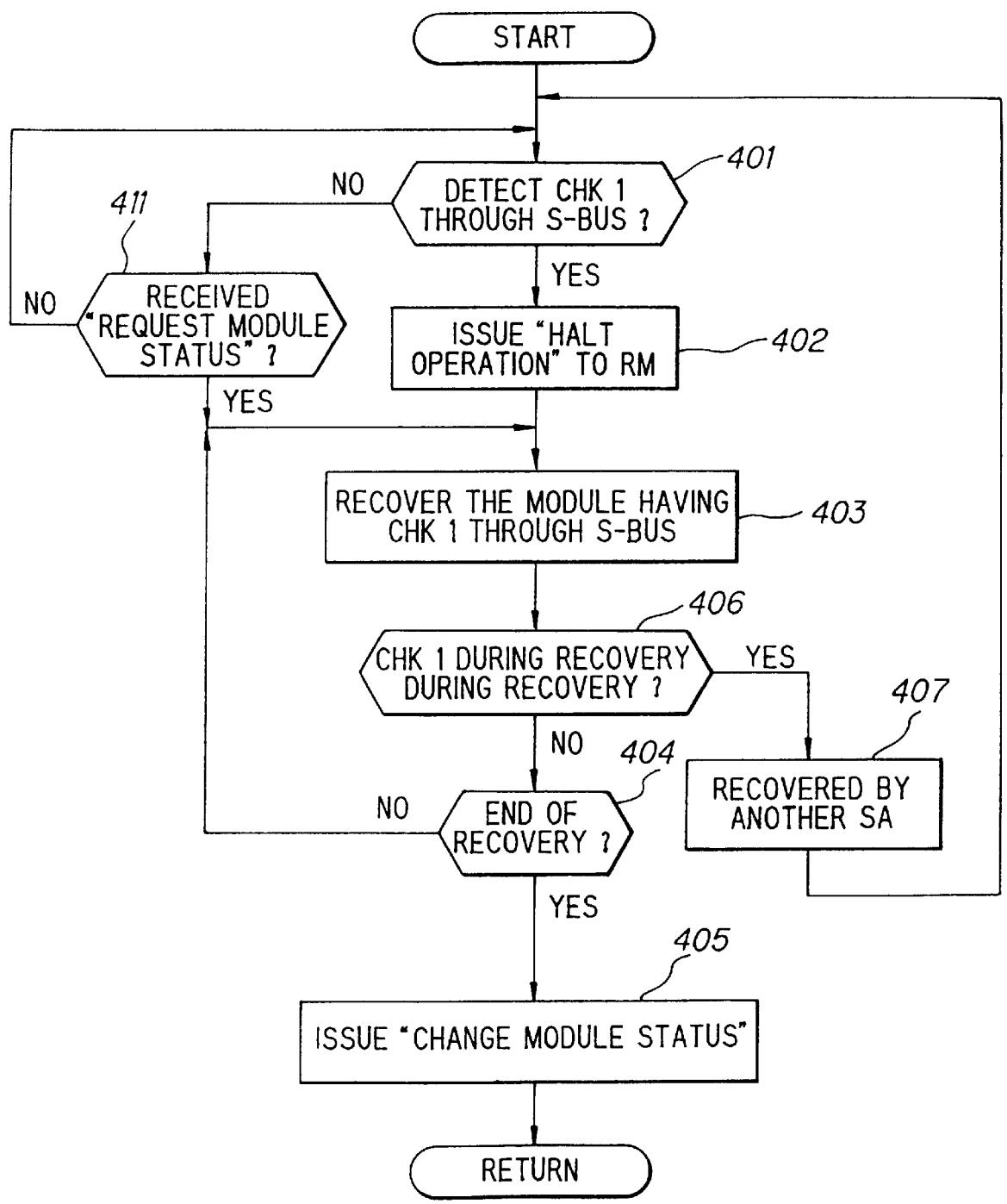
FIG. 28 is a flowchart of a processing by the service adapter in a second recovery method.
Figure 29:
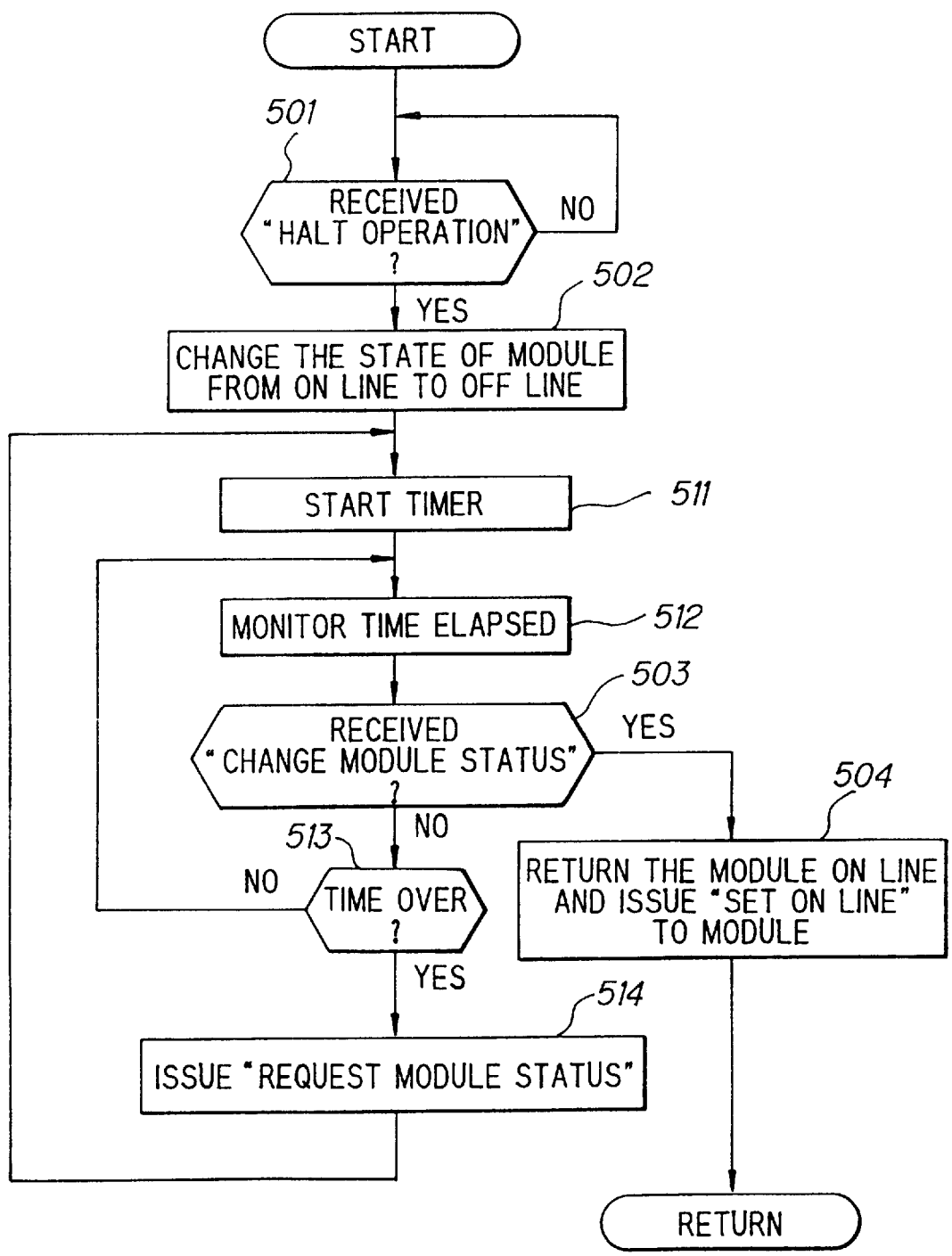
FIG. 29 is a flowchart of a processing by the resource manager in the second recovery method.

FIG. 28 is a flowchart of a processing by the service adapter in a second recovery method and FIG. 29 is a flow-chart of a processing by the resource manager in the second recovery method. The module having trouble is processed in the same way as shown in FIG. 26.

Processing by the service adapter

When trouble (CHECK1) is caused in a module, the service adapter 36a detects the trouble through the S-BUS (step 401). If no trouble is detected, it is judged whether or not the service adapter 36a has received a command "REQUEST MODULE STATUS" from the resource manager 33 (step 411). The steps 401 and 411 are constantly executed. The command "REQUEST MODULE STATUS" is issued from the resource manager 33 in order to inquire the service adapter 36a of the recovery of a module having a trouble.

When the service adapter 36a detects a module having a trouble, it issues a command "HALT OPERATION" to the resource manager 33 (step 402), and recovers the module having the trouble through the S-BUS (step 403). If the recovery is finished without causing trouble in the service adapter 36a (step 404), the service adapter 36a issues a command "CHANGE MODULE STATUS" to the resource manager 33 so as to inform the resource manager 33 that the recovery of the module has been finished and that the module is reusable (step 405).

On the other hand, if trouble is caused in the service adapter 36a before the end of the recovery processing, or after the end of the recovery and before issuing the command "CHANGE MODULE STATUS" (step 406), it is impossible to issue the command "CHANGE MODULE STATUS".

When trouble is caused in the service adapter 36a, the service adapter 36a is recovered by the other service adapter 36a' (step 407), and the process returns to the step 401 so as to execute the detection of trouble and check the reception of the command "REQUEST MODULE STATUS" (steps 401, 402).

The resource manager 33 monitors the time elapsed since the reception of the command "HALT OPERATION", and when the time elapsed exceeds a preset time, the resource manager 33 inquires the service adapter 36a of the recovery of the module by issuing the command "REQUEST MODULE STATUS", as will be described later. At this point in time, if the service adapter 36a has been recovered, the answer is YES at the step 411, and the service adapter 36a recovers the module specified by the inquiry and thereafter issues the command "CHANGE MODULE STATUS" (steps 403 to 405). As a result, even if the service adapter 36a forgets the module to be recovered or the issue of the command "CHANGE MODULE STATUS" due to its own trouble, the service adapter 36a can recover the module and issue the command "CHANGE MODULE STATUS" after the service adapter 36a is recovered.

Processing by the resource manager

When the resource manager 33 receives the command "HALT OPERATION" from the service adapter 36a and is informed of the module having a problem, the resource manager 33 changes the state of the module from on-line to off-line so as to make the module unoperable (steps 501, 502). The resource manager 33 then starts a timer so as to measure the time elapsed (steps 511, 512).

The resource manager 33 monitors whether or not the command "CHANGE MODULE STATUS" is supplied from the service adapter 36a (step 503), and if it receives the command "CHANGE MODULE STATUS", the resource manager 33 changes the state of the designated module from off line to one line, and issues a command "SET ON LINE" to the module so as to permit the module to operate (step 504). If the command "CHANGE MODULE STATUS" is not received, the resource manager 33 judges whether or not the time elapsed has exceeded the preset time (step 513), and if the answer is NO, the resource manager 33 executes the processing at the steps 512 and thereafter.

If a problem is caused in the service adapter 36a, it is impossible to receive the command "CHANGE MODULE STATUS" even if the time elapsed has exceeded the preset time. In this case, the answer is YES at the step 513, and the resource manager 33 inquires the service adapter 36a of the recovery of the module having the trouble (step 514), and executes the processing at the steps 511 and thereafter.

If the service adapter 36a has been recovered at the time of inquiry, the answer is YES at the step 411. The service adapter 36a recovers the module having the trouble and issues the command "CHANGE MODULE STATUS". As a result, the answer is YES at the step 503, and the resource manager 33 changes the state of the designated module from off line to on line and issues a command "SET ON LINE" to the module so as to permit the module to operate (step 504). If the service adapter 36a has not been recovered at the time of inquiry, the processing described above is repeated.

(e-3) Third recovery method

Figure 30:
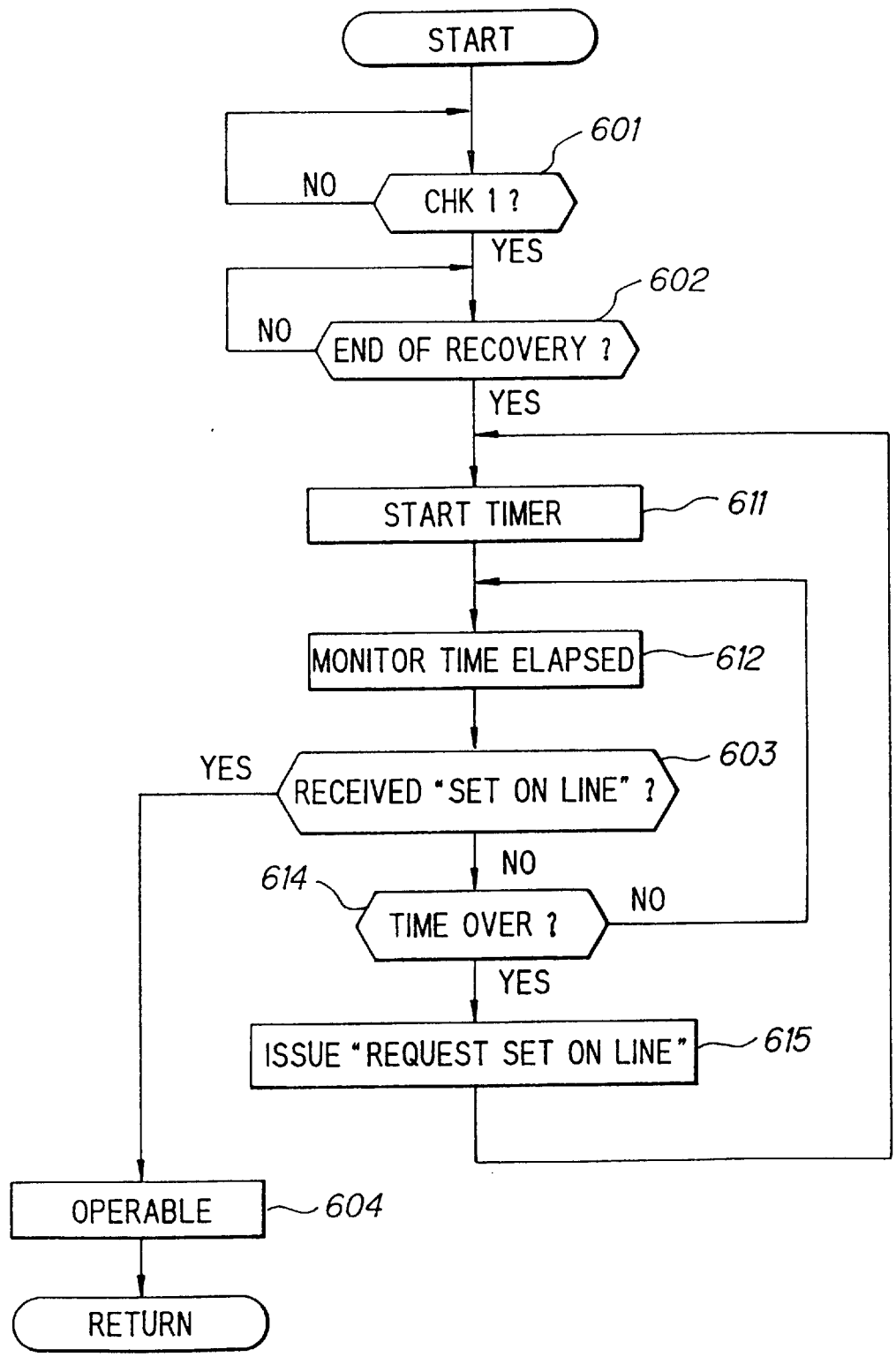
FIG. 30 is a flowchart of a processing by a module having a trouble in a third recovery method.

FIG. 30 is a flowchart of a processing by a module having trouble in a third recovery method. The processing by the service adapter 36a is the same as that shown in FIG. 28. The third recovery method is applicable when the service adapter 36a comes down due to trouble after the end of the recovery and before the issue of the command "CHANGE MODULE STATUS".

Processing of a module

When a module having a trouble is recovered by the service adapter 36a (steps 601, 602), the module starts a timer so as to measure the time elapsed thereafter (steps 611, 612). The module then judges whether or not the command "SET ON LINE" for permitting operation is supplied from the resource manager 33 and if the answer is YES, the module becomes operable (step 604), thereby finishing the process. On the other hand, if the module has not received the command "SET ON LINE", the module judges whether or not the time elapsed has exceeded the preset time (step 614), and if the answer is NO, the module executes the processing at the steps 612 and thereafter.

If trouble is caused in the service adapter 36a, the module cannot receive the command "SET ON LINE" even if the preset time is over. In this case, the answer is YES at the step 614, and the module issues a command "REQUEST SET ON LINE" to the resource manager 33 so as to request for permission of operation (step 615) and executes the processing at the steps 611 and thereafter.

When the resource manager 33 receives the command "REQUEST SET ON LINE", the resource manager 33 issues the command "REQUEST MODULE STATUS" to the service adapter 36a so as to inquire the service adapter 36a of the recovery of the module having the trouble, as will be described later. If the service adapter 36a has been recovered at the time of inquiry, the answer is YES at the step 411 (FIG. 28), and the service adapter 36a recovers the module having the trouble and issues the command "CHANGE MODULE STATUS". As a result, the resource manager 33 changes the state of the designated module from off line to on line and issues the command "SET ON LINE" to the module. The answer at the step 603 becomes YES, and the module becomes operable (step 604). If the service adapter 36a has not been recovered at the time of inquiry, the processing described above is repeated.

Processing by the resource manager

Figure 31:
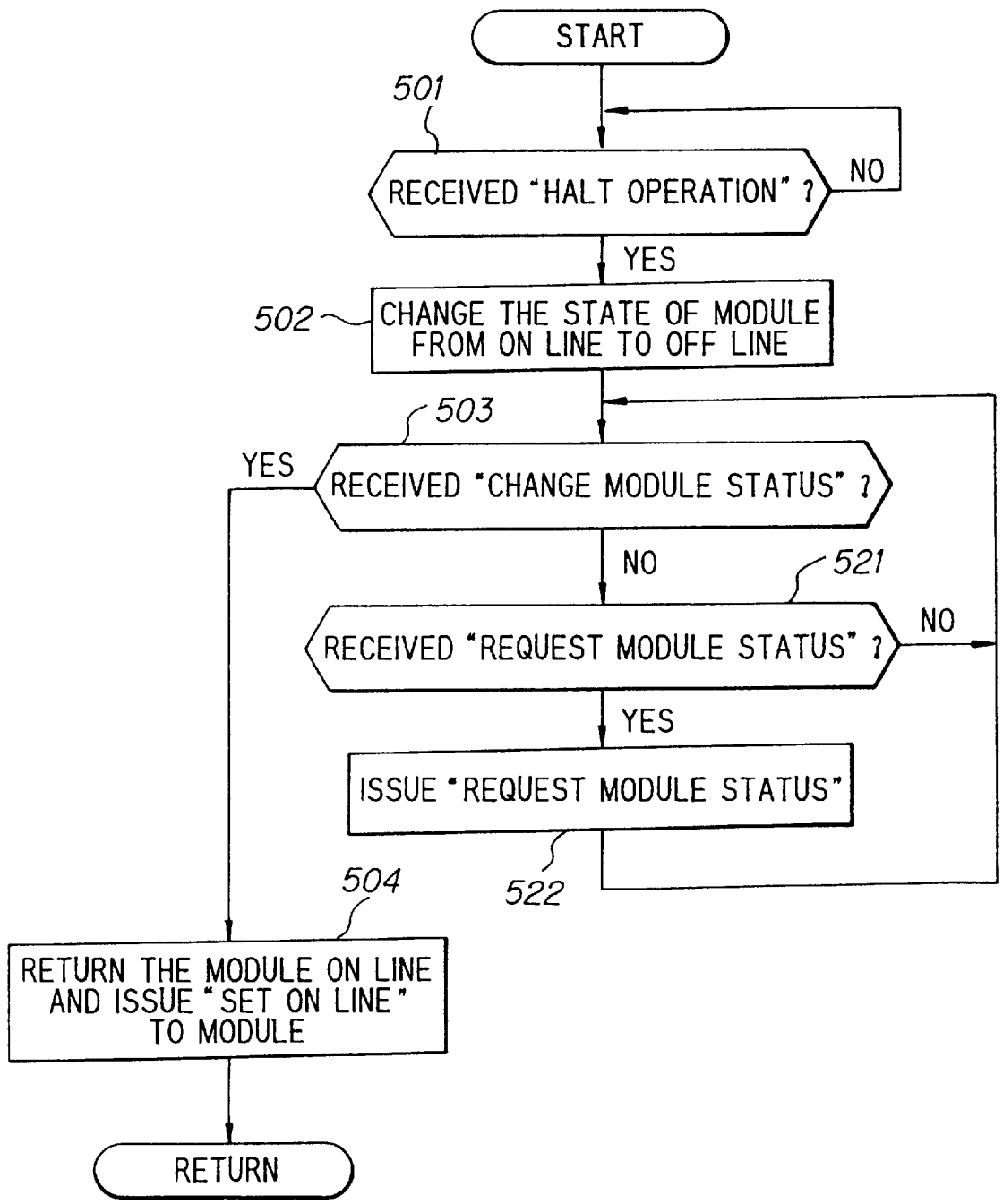
FIG. 31 is a flowchart of a processing by the resource manager in the third recovery method.

FIG. 31 is a flowchart of a processing by the resource manager in the third recovery method.

When the resource manager 33 receives the command "HALT OPERATION" from the service adapter 36a and is informed of the module having a trouble, the resource manager 33 changes the state of the module from on-line to off-line so as to make the module unoperable (steps 501, 502). The resource manager 33 then judges whether or not the command "CHANGE MODULE STATUS" is supplied from the service adapter 36a (step 503), and if it receives the command "CHANGE MODULE STATUS", the resource manager 33 changes the state of the designated module from off line to on line, and issues a command "SET ON LINE" to the module so as to permit the module to operate (step 504).

If the resource manager 33 has not received the command "CHANGE MODULE STATUS", judgement is made as to whether or not the resource manager 33 has received the command "REQUEST MODULE STATUS" from the module (step 521), and if the answer is in the negative, the process returns to the step 503. On the other hand, if the resource manager 33 has received the command "REQUEST MODULE STATUS" from the module, the resource manager 33 issues the command "REQUEST MODULE STATUS" to the service adapter 36a so as to inquire the service adapter 36a of the recovery of the module having the trouble (step 522), and executes the processing at the steps 503 and thereafter.

If the service adapter 36a has been recovered at the time of inquiry, the answer is YES at the step 411 (see FIG. 28), and the service adapter 36a recovers the module having the trouble and issues the command "CHANGE MODULE STATUS". As a result, the answer is YES at the step 503, and the resource manager 33 changes the state of the designated module from off line to on line and issues a command "SET ON LINE" to the module so as to permit the module to operate (step 504). If the service adapter 36a has not been recovered at the time of inquiry, the processing described above is repeated.

Figure 32:
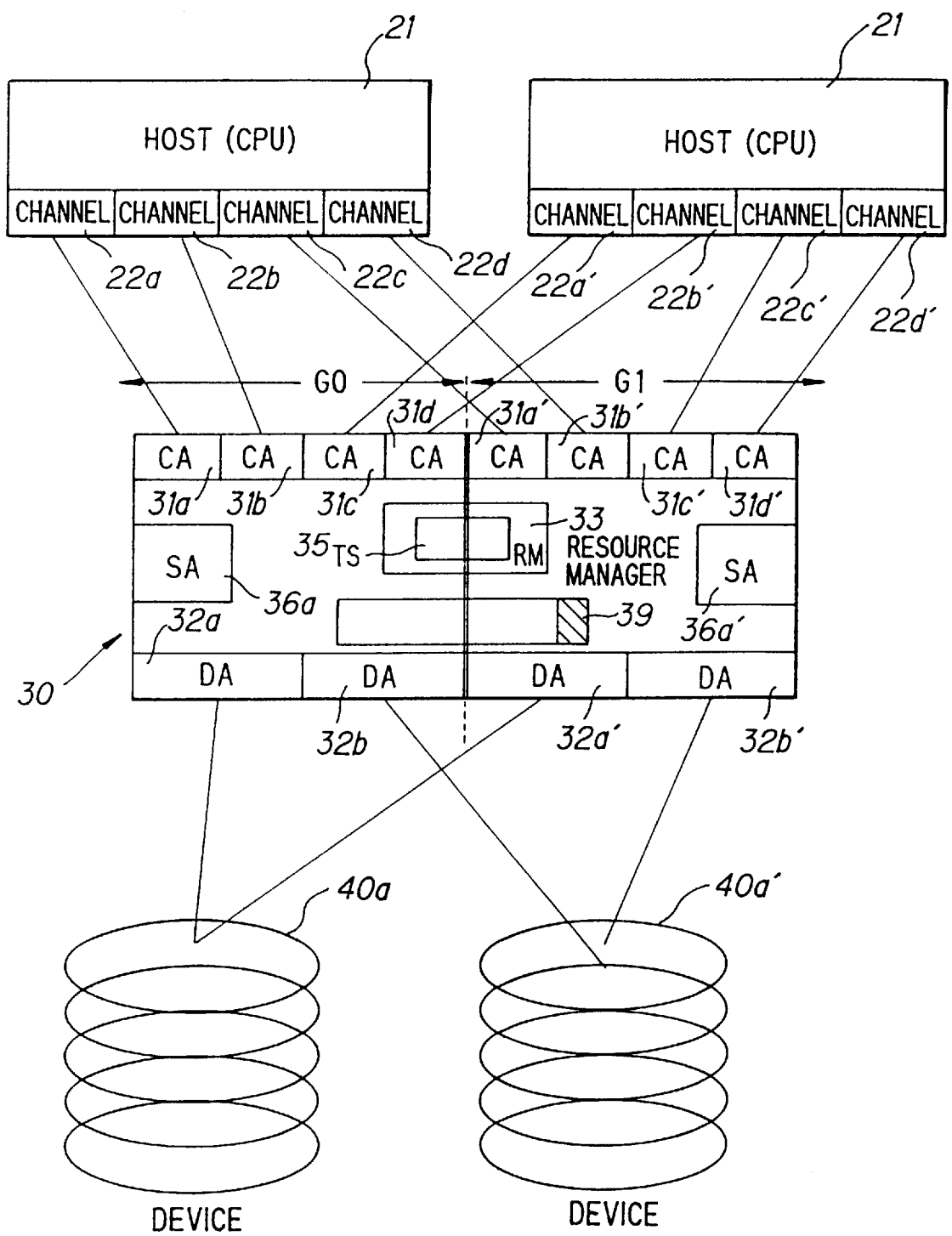
FIG. 32 shows the structure of a computer system for controlling the information of a trouble to a host apparatus and recovery of a module having a trouble.

(f) Control over the information of a problem to a host apparatus and the recovery of a module having a trouble (f-1) Entire structure FIG. 32 shows the structure of a computer system for controlling the information of a problem to a host apparatus and the recovery of a module having trouble. The same reference numerals are provided for the functional elements which are the same as those shown in FIG. 21. Internal buses are omitted in FIG. 32. The reference numeral 21 represents a CPU, 30 an I/O subsystem such as a magnetic disk controlling apparatus, and 40a, 40a' magnetic disk apparatuses (DEV) as I/O devices. In the I/O subsystem 30, the reference numerals 31a to 31d' represent channel adapters (CA), 32a to 32b' device adapters (DA), 33 a resource manager (RM), 35 a table storage portion (TS), 36a and 36a' service adapters (SA), and 39 a memory.

The table storage portion 35 stores various tables such as a path group table PGT for indicating the path group for each I/O device (magnetic disk apparatus) and a physical structure table PST.

The path group table GPT stores channel adapters (paths) which are accessible to a device in correspondence with each device, as shown in FIG. 33. In the path group table GPT shown in FIG. 33, the path group for a device DEV0 is composed of channel adapters CA0, CA2, CA5 and CAn. The path group table GPT is set in the table storage portion 35 in accordance with a command "SET PATH GROUP" from the CPU.

Figure 34:
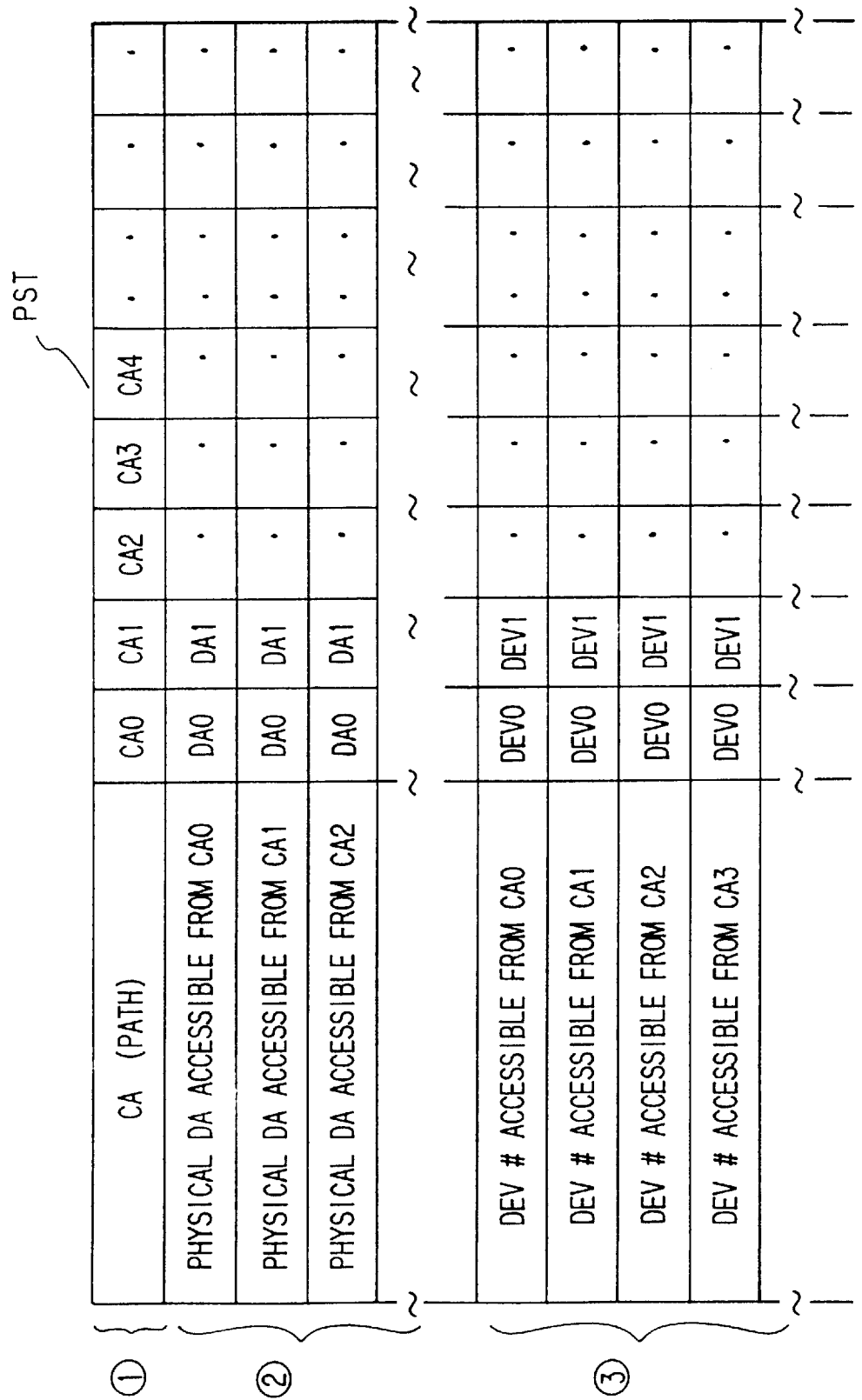
FIG. 34 is an explanatory view of a physical structure table.

The physical structure table PST shows the physical structure of the I/O subsystem and as shown in FIG. 34, stores ① channel adapters (CAi, i=0, 1, 3, . . . ) which constitute the I/O subsystem, ② device adapters which are accessible from each channel adapter CAi, ③ I/O devices which are accessible from each channel adapter CAi, etc.

Each CPU 21 stores an administrative table ADT shown in FIG. 35 which stores ① the structure of channels which are controlled by the CPU 21, ② the I/O devices which are accessible to each channel CHi (i=0, 1, 2, . . . ), and ③ the channel adapters (path group table) which are accessible to each I/O device.

(f-2) Schematic explanation of control over the information of a problem to a host apparatus and the recovery of a module having trouble A problem includes:
① a loss of a part of structural information;
② a problem in an inaccessible hardware in a path from a host apparatus;
③ a problem in an inaccessible hardware within an I/O subsystem;
④ a recoverable trouble; and
⑤ trouble in a host apparatus.

① The loss of a part of structural information means that a part of the path group table GPT stored in the table storage portion 35 of the I/O subsystem is lost. If such a trouble is caused, when the channel is separated from the I/O subsystem in accordance with a request for retry at the time of access sequence (disconnect) and connected again (reconnect), it is not clear through which channel adapter (path) the channel is reconnected, and a serious trouble called MIH (Missing Interrupt) is caused in the system.

When such a problem is caused, the I/O subsystem 30 reports the path group information to the host apparatus so as to make the host apparatus recover the path group table. The host apparatus judges whether or not the contents of the path group table agree with the path group table held in the administrative table ADT of the host apparatus. If the answer is NO, the host group judges that a part of the path group table is lost due to a problem and supplies a command "SET PATH GROUP ID" to the I/O subsystem 30 so as to recover the path group table GPT. If the answer is YES, it means that the CPU itself has eliminated the path, and since it is no trouble, the CPU does not issue the command "SET PATH GROUP ID".

② The trouble in an inaccessible hardware in a path from a host apparatus is an unrecoverable trouble which is caused in a channel adapter (path). In the case of such trouble, the path in which the trouble is caused and a path which can replace the path having the trouble from the point of view of a physical structure are reported to the host apparatus, and the path having the trouble is rapidly separated. If there is a replacement path which is operable, it is rapidly incorporated into the system and an error message is displayed by the console.

③ The trouble in an inaccessible hardware within an I/O subsystem is an unrecoverable trouble caused in an internal path. There are two cases: ③' wherein the I/O subsystem is unoperable because there is no replacement path within the I/O subsystem; and ③" wherein the I/O subsystem is operable because there is a replacement path. The case ③' occurs, for example, when all the device adapters on one of the control sides G0, G1 become out of order, and the case ③" occurs when a part of the device adapters on one of the control sides G0, G1 become out of order.

If such a problem is caused, the path having trouble is reported to the host apparatus so as to execute error log and separation of the inaccessible path and display an error message by the console.

④ The recoverable trouble is trouble detected by the diagnosis of the memory 39 or the like and recovered by the service adapter 36a (36a') (initialization of the memory 39). In the case of such trouble, the contents of the problem are reported to the host apparatus so as to execute error log.

⑤ The trouble in a host apparatus is caused due to the host apparatus. In this case, the contents of the trouble and the channel number are reported to the host apparatus so as to recover the host apparatus on the basis of the information.

(f-3) Information of trouble and recovery process

A problem is detected by (1) internal diagnosis, (2) a patrol by the service adapters 36a, 36a', or (3) the fact that the expected response is not supplied from the host apparatus. When such a problem is detected, it is reported to the resource manager 33, whereby the resource manager 33 recognizes the trouble. (4) When a part of the internal structural information (e.g., path group table) is eliminated by system reset, the resource manager 33 also recognizes it as trouble. A command "SYSTEM RESET" is ordinarily issued when the system is initialized, and it is rarely issued during the operation of the system. The command "SYSTEM RESET" is issued only to a specific path which constitutes the path group during the operation of the system either when the path is separated due to a problem in accordance with the command "SYSTEM RESET" from the CPU or when it seems as if a command "SYSTEM RESET" were issued due to trouble between a channel and a channel adapter. In the former case, there is no trouble, but in the latter case, a part of the internal information is improperly lost. Therefore, when a part of the internal information is eliminated by system reset, the resource manager 33 temporarily recognizes it as a problem (system reset error).

The detection methods (1) and (2) can detect the troubles ②, ③ and ④, the detection method (3) can detect the trouble ⑤, and the detection method (4) can detect the trouble ①.

Figure 36:
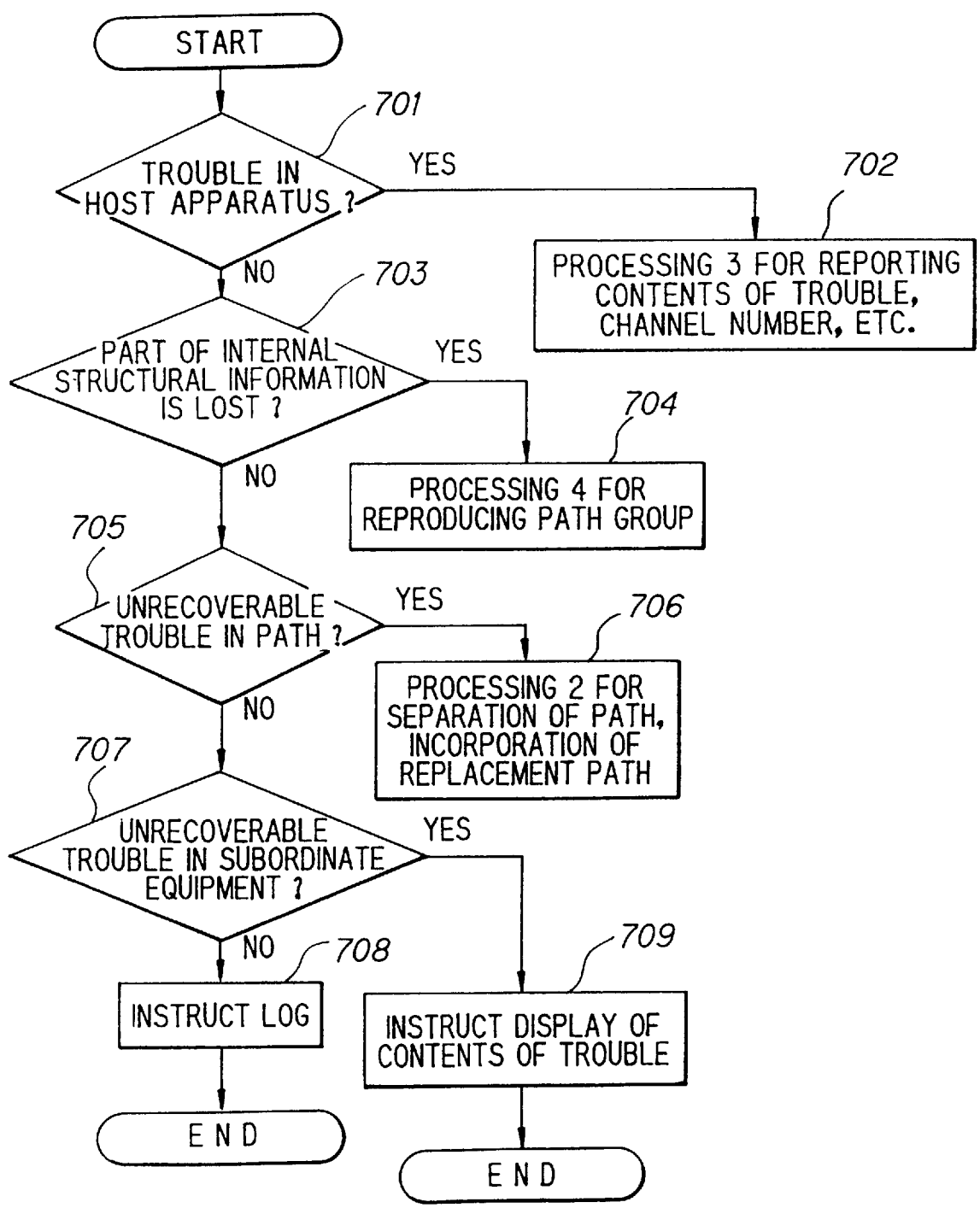
FIG. 36 is a schematic flowchart of a processing at the time of a trouble.

FIG. 36 is a schematic flowchart of a processing by the resource manager at the time of a problem.

When the resource manager 33 recognizes a problem, it judges which of the troubles ① to ⑤ it is. It is first judged whether or not the trouble is the trouble ⑤ in the host apparatus (step 701), and if the answer is YES, a processing 3 (which will be described later) for informing the host apparatus of the trouble information (contents of the trouble, channel number, etc.) is executed (step 702).

If the answer is NO, whether or not a part of the internal structural information is lost (there is step system reset error) is judged (step 703). If the trouble is ① the system reset error, a processing 1 (which will be described later) for reproducing the path group is executed (step 704).

If the answer is NO, whether or not the trouble is ② the unrecoverable trouble in a path is judged (step 705). If the answer is YES, a processing 2 (which will be described later) necessary for separating the path, incorporating a replacement path, or the like is executed (step 706).

If the answer is NO at the step 705, whether or not it is the unrecoverable trouble within an I/O subsystem is judged (step 707). If the trouble is ④ the recoverable trouble, trouble information (contents of the trouble, instruction of logging (LOG), etc.) is supplied to the host apparatus (step 708). On the other hand, if the trouble is ③ the unrecoverable trouble, trouble information (contents of the trouble, instruction to the console to display the contents of the trouble, etc.) is supplied to the host apparatus (step 709).

(f-4) Structure of problem information

Figure 37:
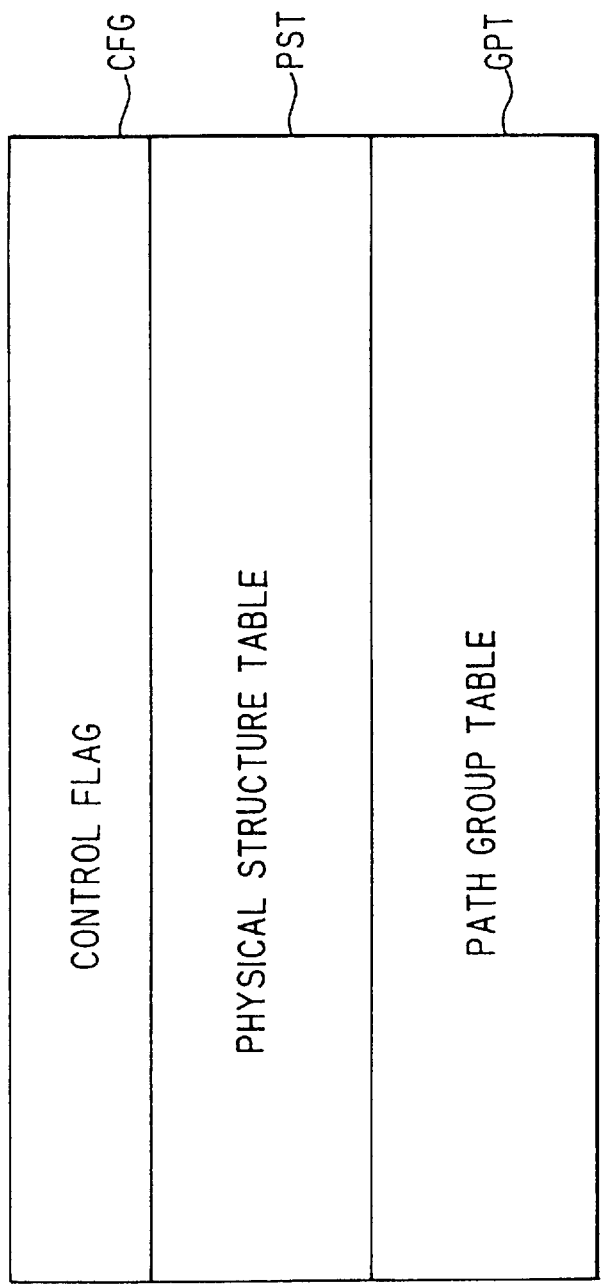
FIG. 37 is an explanatory view of trouble information.

The problem information supplied to the host apparatus is composed of a control flag CFG, the physical structure table PST, and the path group table GPT, as shown in FIG. 37. The control flag CFG is composed of one byte and indicates the recovery method such as log request and display request, and the contents of a problem, as shown in FIG. 38. An appropriate bit is set on in accordance with the recovery method and the contents of a problem is supplied to the host apparatus.

The physical structure table PST is composed of the physical structure PST1 (FIG. 34) before trouble is caused, a device adapter which becomes inaccessible from each channel due to the trouble, and a portion PST2 which specifies the device which is inaccessible from each channel, as shown in FIG. 39. The portion PST2 can specify the portion having trouble.

The path group table GPT is composed of a path group table GPT1 before a problem is caused and a path group table GPT2 after the trouble (system reset error) is caused, as shown in FIG. 40.

(f-5) Processing 1 (Processing for the case in which part of internal structural information is lost)

Figure 41:
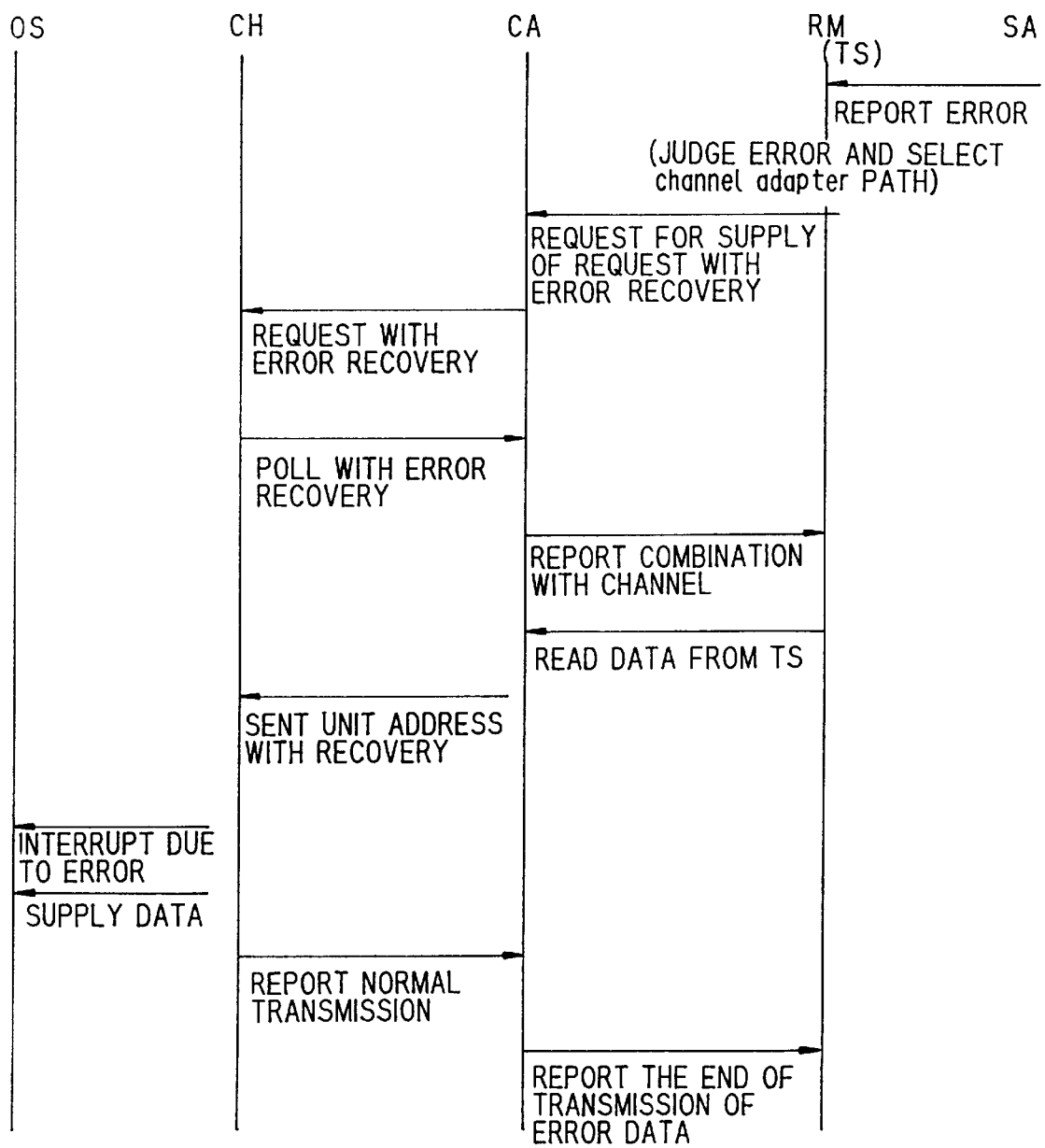
FIG. 41 is an explanatory view of a processing for the case in which a part of internal structural information is lost.

FIG. 41 is an explanatory view of a processing 1 for the case in which a part of internal structural information (e.g., path group table) is lost.

When the resource manager RM 33 receives a request for system reset from a specific path which constitutes the path group, and the other paths still constitute the group, the resource manager RM 33 judges it to be system reset due to a problem, and creates the path group table GPT 1 before a problem is caused and the path group table GPT2 after the trouble occurs (see FIG. 40). The resource manager 33 then selects a path (channel adapter CA) other than the path which is assumed to have trouble (the path from which the request for system reset is supplied), and supplies trouble information to the host apparatus (channel CH) through the selected channel adapter.

The trouble information is supplied to the channel CH in the following manner. The resource manager RM first requires the channel adapter CA to supply a command "REQUEST WITH ERROR RECOVERY". The channel adapter CA then supplies a "REQUEST WITH ERROR RECOVERY" frame to the channel CH and waits for response.

The channel CH which has received the "REQUEST WITH ERROR RECOVERY" frame supplies a command "POLL WITH ERROR RECOVERY" which permits the transmission of trouble information including the recovery method as a response. The channel adapter CA reports the response to the resource manager RM. The channel adapter CA then reads the trouble information which is to be transmitted to the channel CH from the table storage portion TS controlled by the resource manager RM and supplies the trouble information in a "SEND UNIT ADDRESS WITH ERROR RECOVERY" frame. The trouble information includes the control flag CFG, path group tables GPT1, GPT2 before and after the trouble is caused, the physical structure table PST indicating the path having the trouble, and a unit address.

The channel CH which has received the trouble information supplies the trouble information to the CPU (operating system: OS) by interruption and reports the normal reception to the channel adapter CA and requires the I/O subsystem (magnetic disk controlling apparatus) to be separated.

Figure 42:
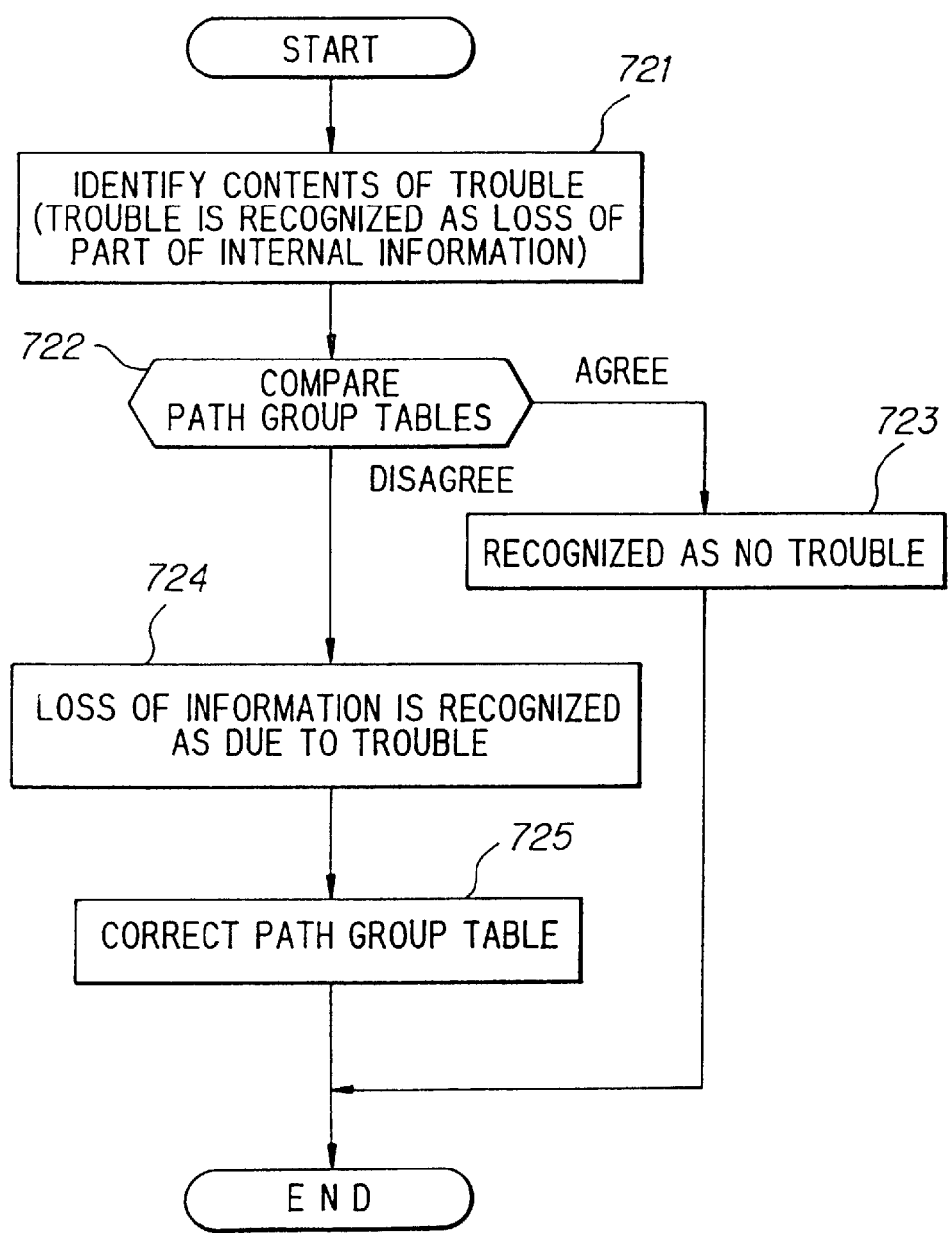
FIG. 42 is a flowchart of a processing for the case in which a part of internal structural information is lost.

Thereafter, the OS executes a recovery process in accordance with the flow shown in FIG. 42. The OS recognizes that the trouble is a loss of a path of the path group by reference to the control flag CFG contained in the trouble information supplied from the channel CH (step 721). The OS then compares the path group table stored in the administrative table ADT within the OS with the path group table GPT2 supplied from the channel CH (step 722). If both path group tables agree, the OS recognizes that the loss is the elimination of a part of the path group table GPT within the I/O subsystem executed in accordance with the command "SYSTEM RESET" issued by the OS itself and that there is no trouble (step 723), thereby ending the recovery process.

On the other hand if the path group table stored in the administrative table ADT does not agree with the path group table GPT2, the OS recognizes that a part of the path group table GPT within the I/O subsystem is eliminated due to a trouble between the channel and the channel adapter (step 724), and a command "SET PATH GROUP ID" is supplied to the I/O subsystem through the channel so as to incorporate the eliminated path into the path group GPT, thereby recovering the right path group table (step 725).

(f-6) Processing 2 (Processing for the case in which an unrecoverable trouble in a path is caused)

Figure 43:
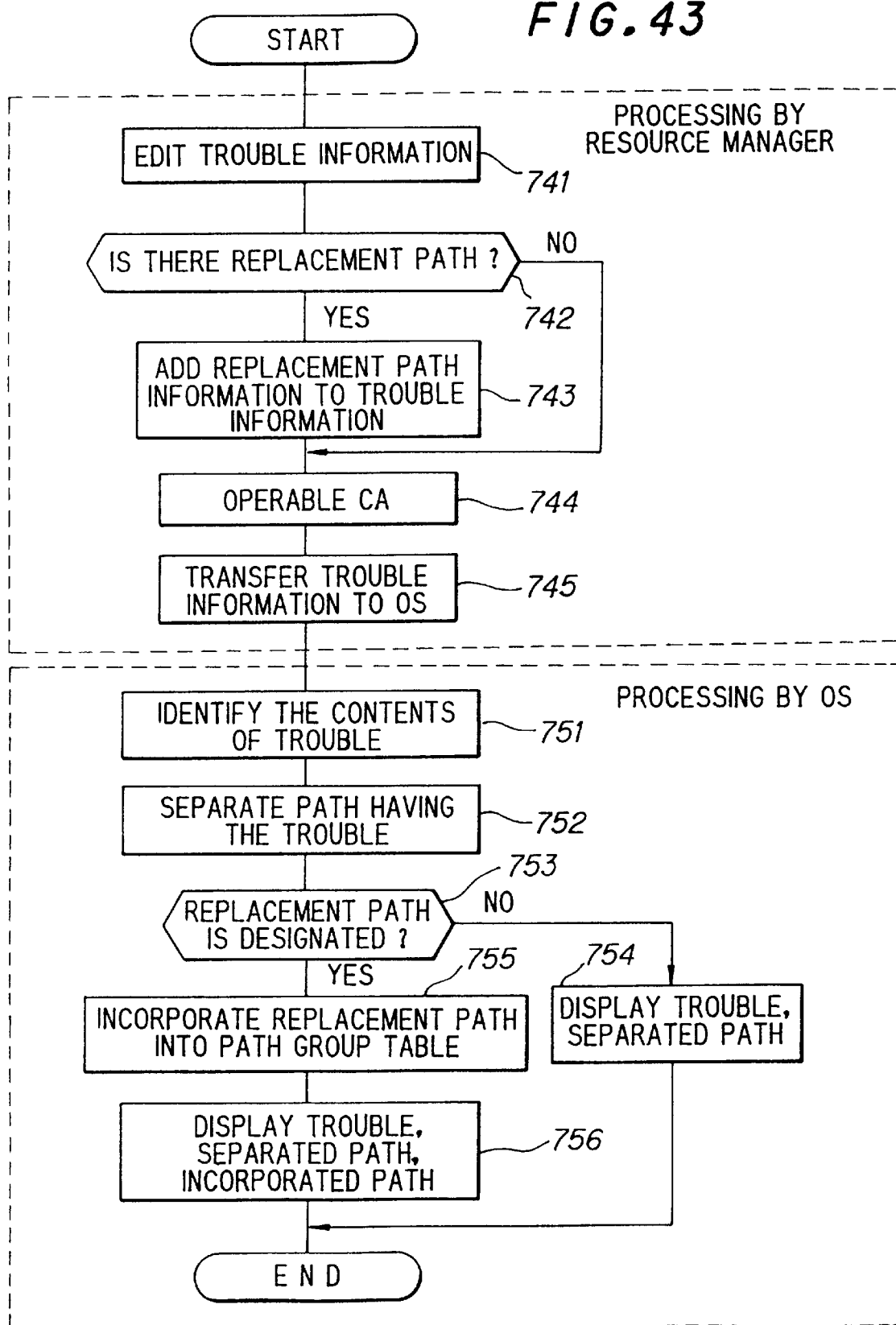
FIG. 43 is a flowchart of a processing for the case in which an unrecoverable trouble in a path is caused.

FIG. 43 is a flowchart of a processing for the case in which an unrecoverable trouble in a path is caused.

When trouble in an inaccessible hardware is caused in a path (channel adapter) from a host apparatus, the resource manager 33 edits trouble information including the physical structure tables PST1, PST2 of the I/O subsystem, and the contents of the trouble (control flag CFG) (step 741). Judgement is then made as to whether or not there is a physical path which can replace the path having the trouble (step 742). If the answer is YES, the replacement path is contained in the trouble information (step 743).

The resource manager 33 then selects an operable channel adapter CA (step 744), and supplies the trouble information to the channel CH in accordance with the flow shown in FIG. 41. The channel CH supplies the trouble information received to the OS by interruption (step 745).

The OS recognizes the trouble as an unrecoverable trouble in a path by reference to the trouble information (step 751). The OS then judges whether or not the path having the trouble is in use, and if the answer is YES, the path is separated (the channel adapter CA is eliminated from the path group table) so as to stop access through the path (step 752).

The OS then judges whether or not a replacement path is designated (step 753), and if the answer is NO, the contents of the trouble and the separated path are displayed on a display unit of the console, thereby ending the recovery process (step 754).

If a replacement path is designated, the OS registers the replacement path in the path group table of the OS and supplies a command "SET PATH GROUP ID" for incorporating the replacement path into the path group table GPT within the I/O subsystem through the channel (step 755). Thereafter, access using the replacement path is possible.

The contents of the trouble, the separated path and the incorporated replacement path are displayed on the display unit of the console, thereby ending the recovery process (step 756).

(f-7) Processing 3 (Processing for the case in which a problem is caused in a host apparatus)

Figure 44:
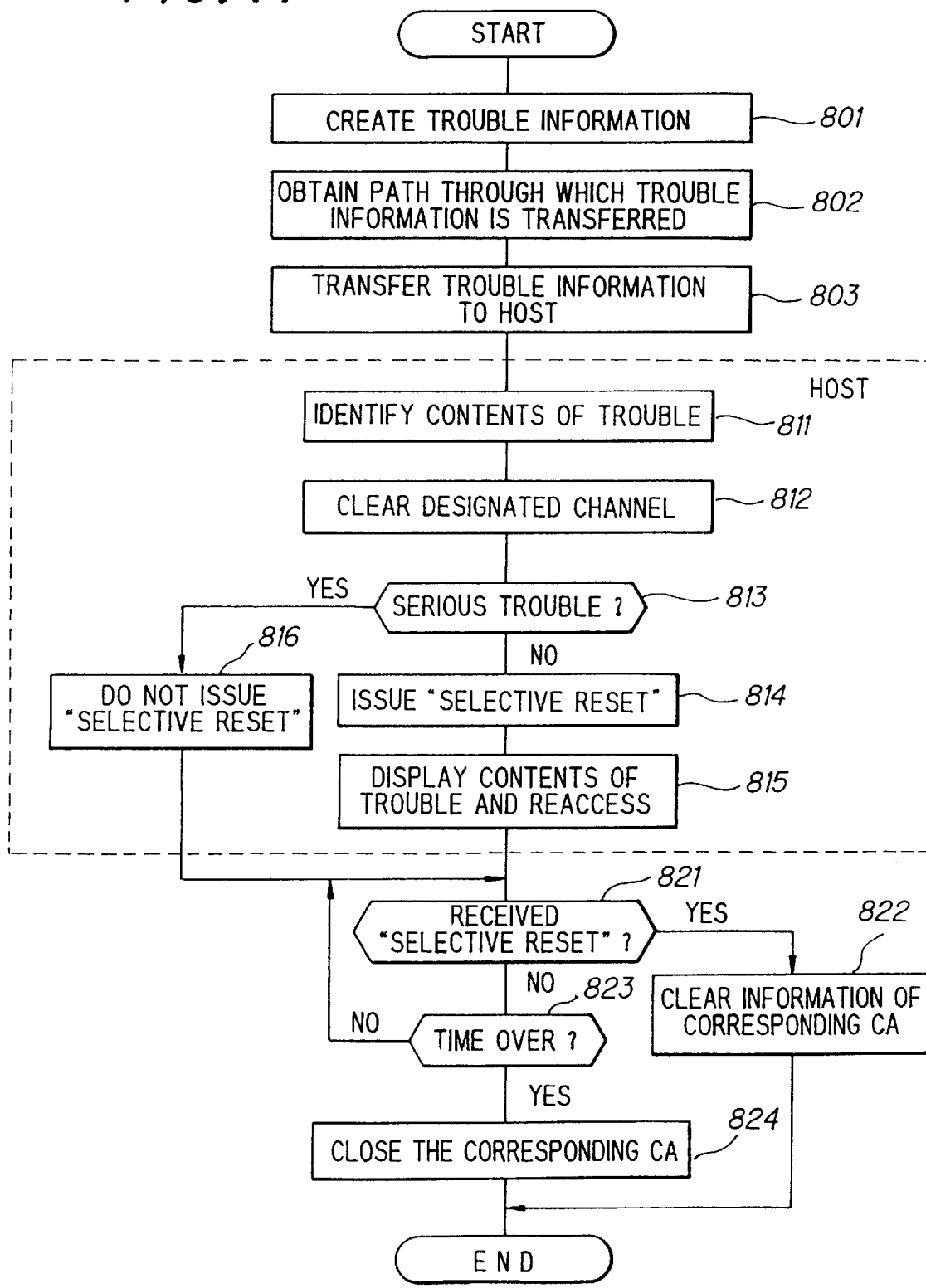
FIG. 44 is a flowchart of a processing for the case in which a trouble is caused in a host apparatus.

FIG. 44 is flowchart of a processing for the case in which a problem is caused in a host apparatus.

When the resource manager 33 detects a problem in the host apparatus, the resource manager 33 creates trouble information including the number of the channel having the trouble (step 801) and obtains a channel adapter CA which is connected to a channel in the same host apparatus (step 802). The resource manager 33 transfers the trouble information to the channel through the channel adapter CA obtained in accordance with the flow shown in FIG. 41, and the channel supplies the trouble information received to the host apparatus (step 803).

The host apparatus which has received the problem information recognizes the trouble as trouble in a channel by reference to the trouble information (step 811), and clears the internal information of the channel designated by the channel number (step 812). Judgement is then made as to whether or not the trouble is serious (step 813), and if the trouble is not serious, the host apparatus issues a command "SELECTIVE RESET" to the I/O subsystem (step 814), and after displaying the contents of the trouble by the console, access is started again (step 815). However, if a problem is frequently caused in the designated channel, the host apparatus recognizes it as a serious problem and does not issue the command "SELECTIVE RESET" (step 816).

When the resource manager 33 receives the command "SELECTIVE RESET", the resource manager 33 resets the internal information of the channel adapter which is connected to the channel having the trouble (steps 821, 822). If the command "SELECTIVE RESET" is not supplied in a predetermined time (e.g., several seconds) after the transfer of the trouble information (step 823), the resource manager 33 instructs the corresponding channel adapter to be closed (step 824). Since a channel adapter generally has two ports, only one port having the trouble is closed.

As described above, according to the present invention, it is possible to execute the same functions in an asynchronous transfer system as those in a synchronous transfer system.

Even if a read error is caused by a flaw or the like produced in the data area or the key area of the magnetic disk apparatus, a data searching operation in the area other than the area having the flaw is possible without causing an error.

In addition, even if only a part of data of a CKD format are normally updated and the rest thereof are not updated, there is no problem in the guarantee of the data.

According to the present invention, in a dynamic path recombination system, efficient use of resources is enabled with the busy ratio taken into consideration, the response time for access is shortened, and the performance of the system is increased.

According to the present invention, even if a problem is caused in a service adapter, it is possible to safely recover the module having trouble after the service adapter is recovered, and to start the I/O subsystem.

Furthermore, according to the present invention, it is possible to recover a host apparatus having a problem rapidly and by the host apparatus itself without influencing access which has no relation to the trouble by positively informing the host apparatus of ① the contents of the trouble by an I/O subsystem, ② the recovery method and ③ an operable path in the I/O subsystem.

As many apparently widely different embodiments of the present invention can be made without departing from the spirit and scope thereof, it is to be understood that the invention is not limited to the specific embodiments thereof except as defined in the appended claims.

What is claimed is:

1. A disk controlling apparatus provided between a host apparatus and a disk apparatus, comprising:
    a plurality of channel adapters each serving as an interface between said host apparatus and said disk controlling apparatus;
    a plurality of device adapters each serving as an interface between said disk controlling apparatus and said disk apparatus, wherein said plurality of channel adapters and said plurality of device adapters each define a unit;
    a resource manager for controlling the resource management as a whole and the processing operations; and
    a service adapter for detecting a problem caused in one of the units which are connected to each other by a bus; wherein said service adapter including:
        a means for periodically patrolling so as to detect whether or not a problem is caused in a unit; and
        a recovery means for recovering the unit having a problem when said problem is detected.

2. A disk controlling apparatus provided between a host apparatus and a disk apparatus, comprising:
    a plurality of channel adapters each serving as an interface between said host apparatus and said disk controlling apparatus;
    a plurality of device adapters each serving as an interface between said disk controlling apparatus and said disk apparatus, wherein said plurality of channel adapters and said plurality of device adapters each define a unit;

a resource manager for controlling the resource management as a whole and the processing operations; and a service adapter for detecting a problem caused in one of the units which are connected to each other by a bus; said service adapter including:
- a means for informing said resource manager of a problem in a unit when said problem is detected;
- a means for recovering said unit having the problem when said problem is detected or when an inquiry is received from said resource manager; and
- a means for informing said resource manager of the end of recovery when the recovery is finished;

said resource manager including:
- a means for making said unit having the problem inoperable when said problem is informed of by said service adapter;
- a means for sending said unit a notification which means the unit becomes operable when the information on the end of recovery is received; and
- a means for inquiring said service adapter of the recovery of said unit having the problem in accordance with the request from said unit having the trouble;

and said unit having the problem including:
- a means for monitoring the time elapsed since said recovery; and
- a means for requesting said notification to said resource manager when said notification is not supplied to said unit when a preset time is over.

3. A disk controlling apparatus provided between a host apparatus and a disk apparatus, comprising:

a plurality of channel adapters each serving as an interface between said host apparatus and said disk controlling apparatus;

a plurality of device adapters each serving as an interface between said disk controlling apparatus and said disk apparatus, wherein said plurality of channel adapters and said plurality of device adapters each define a unit;

a resource manager for controlling the resource management as a whole and the processing operations; and a service adapter for detecting a problem caused in one of the units which are connected to each other by a bus; wherein said resource manager including:
- a means for creating problem information including the contents of the problem and a recovery method when said problem is detected by internal diagnosis or patrol by said service adapter; and
- a means for reporting said problem information to said host apparatus;
- wherein said host apparatus performs processing for recovering the unit having a problem on the basis of said recovery method or said contents of said problem.

4. A disk controlling apparatus provided between a host apparatus and a disk apparatus, comprising:

a plurality of channel adapters each serving as an interface between said host apparatus and said disk controlling apparatus;

a plurality of device adapters each serving as an interface between said disk controlling apparatus and said disk apparatus, wherein said plurality of channel adapters and said plurality of device adapters each define a unit;

a resource manager for controlling the resource management as a whole and the processing operations; and a service adapter for detecting a problem caused in one of the units which are connected to each other by a bus; said service adapter including:
- a means for informing said resource manager of a problem in a unit when said problem is detected;
- a means for recovering said unit having the problem when said problem is detected or when an inquiry is received from said resource manager; and
- a means for informing said resource manager of the end of recovery when the recovery is finished;

said resource manager including:
- a means for making said unit having the problem inoperable when said problem is informed of by said service adapter;
- a means for making said unit having the problem operable when the information on the end of recovery is received;
- a means for monitoring the time elapsed since said problem is informed of; and
- a means for inquiring said service adapter of the recovery of said unit having the problem when said information on the end of recovery is not supplied to said resource manager when a present time is over.

* * * * *